(12) United States Patent
Wookey

(10) Patent No.: US 8,719,814 B2
(45) Date of Patent: *May 6, 2014

(54) APPARATUS AND METHOD FOR MONITORING SOFTWARE INSTALLATION PERFORMANCE

(75) Inventor: Michael J. Wookey, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 13/154,123

(22) Filed: Jun. 6, 2011

(65) Prior Publication Data

US 2012/0144386 A1   Jun. 7, 2012

Related U.S. Application Data

(63) Continuation of application No. 13/083,382, filed on Apr. 8, 2011, now Pat. No. 8,631,400, and a continuation of application No. 11/862,987, filed on Sep. 27, 2007, now abandoned.

(60) Provisional application No. 60/890,171, filed on Feb. 15, 2007.

(51) Int. Cl.
  *G06F 9/445*   (2006.01)
  *G06F 9/44*   (2006.01)
  *G06F 11/00*   (2006.01)

(52) U.S. Cl.
  USPC .............................. 717/175; 717/169; 714/25

(58) Field of Classification Search
  USPC ........................................................ 717/175
  See application file for complete search history.

(56) References Cited

U.S. PATENT DOCUMENTS

| | | | |
|---|---|---|---|
| 6,117,187 A | 9/2000 | Staelin | |
| 6,202,207 B1 | 3/2001 | Donohue | |
| 6,349,137 B1 | 2/2002 | Hunt et al. | |
| 6,381,742 B2 | 4/2002 | Forbes et al. | |
| 6,542,167 B1 | 4/2003 | Darlet et al. | |
| 6,675,382 B1 | 1/2004 | Foster | |
| 6,698,018 B1 | 2/2004 | Zimniewicz et al. | |
| 6,832,373 B2 | 12/2004 | O'Neill | |
| 6,883,168 B1 | 4/2005 | James et al. | |
| 6,938,250 B2 | 8/2005 | Cohen et al. | |

(Continued)

OTHER PUBLICATIONS

Amendment and Response to Non-Final Office Action regarding U.S. Appl. No. 13/103,820, Dec. 18, 2012.

(Continued)

*Primary Examiner* — Don Wong
*Assistant Examiner* — Marina Lee
(74) *Attorney, Agent, or Firm* — Polsinelli PC

(57) ABSTRACT

A virtual installation map, and method involving installing a software functionality using the same, the virtual installation map including a first software installation map including a plurality of software elements representative of a related software file, the software elements also including at least one dependency to another software element. The virtual installation map further including a second software installation map also including a second plurality of software elements representative of related software file along with related dependencies. The first and second software installation maps may be hosted in separate databases and may relate to software products provided by different vendors. One or both software installation maps may include a pointer or other reference to the other installation map thereby providing a virtual installation map, in one example.

18 Claims, 25 Drawing Sheets

(56) References Cited

U.S. PATENT DOCUMENTS

| | | | |
|---|---|---|---|
| 6,954,928 | B2 | 10/2005 | Allsop et al. |
| 6,976,221 | B2 | 12/2005 | Darlet et al. |
| 7,058,942 | B2 | 6/2006 | Bourke-Dunphy et al. |
| 7,076,496 | B1 | 7/2006 | Ruizandrade |
| 7,313,792 | B2 | 12/2007 | Buban et al. |
| 7,478,093 | B2 | 1/2009 | Moulckers et al. |
| 7,503,042 | B2 * | 3/2009 | Henrickson et al. .......... 717/175 |
| 7,526,468 | B2 | 4/2009 | Vincent et al. |
| 7,694,291 | B2 | 4/2010 | Chen et al. |
| 7,752,158 | B2 | 7/2010 | Wookey |
| 7,761,395 | B2 | 7/2010 | Wookey et al. |
| 7,839,816 | B2 | 11/2010 | Hall |
| 7,861,231 | B2 | 12/2010 | Rangarajan et al. |
| 7,865,874 | B2 | 1/2011 | Wookey |
| 7,870,539 | B2 | 1/2011 | Wookey |
| 7,971,202 | B2 | 6/2011 | Bell et al. |
| 7,987,459 | B2 | 7/2011 | Chow et al. |
| 8,185,872 | B2 | 5/2012 | Harmsen et al. |
| 8,387,038 | B2 | 2/2013 | Wheeler et al. |
| 2001/0037289 | A1 | 11/2001 | Mayr et al. |
| 2002/0087949 | A1 | 7/2002 | Golender et al. |
| 2002/0188941 | A1 | 12/2002 | Cicciarelli et al. |
| 2002/0188942 | A1 | 12/2002 | Bryan et al. |
| 2003/0028870 | A1 | 2/2003 | Weisman et al. |
| 2003/0122871 | A1 | 7/2003 | Darlet et al. |
| 2003/0172368 | A1 | 9/2003 | Alumbaugh et al. |
| 2003/0182656 | A1 | 9/2003 | Leathers et al. |
| 2003/0220944 | A1 | 11/2003 | Schottland et al. |
| 2003/0233385 | A1 | 12/2003 | Srinivasa et al. |
| 2003/0233645 | A1 | 12/2003 | Cohen et al. |
| 2004/0003266 | A1 | 1/2004 | Moshir et al. |
| 2004/0019888 | A1 | 1/2004 | Jain et al. |
| 2004/0054991 | A1 * | 3/2004 | Harres .......... 717/131 |
| 2004/0117783 | A1 | 6/2004 | Kaminsky et al. |
| 2004/0181790 | A1 | 9/2004 | Herrick |
| 2004/0250247 | A1 | 12/2004 | Deeths et al. |
| 2004/0255291 | A1 | 12/2004 | Sierer et al. |
| 2005/0055686 | A1 | 3/2005 | Buban et al. |
| 2005/0125525 | A1 | 6/2005 | Zhou et al. |
| 2005/0132337 | A1 * | 6/2005 | Wedel et al. .......... 717/128 |
| 2005/0132350 | A1 | 6/2005 | Markley et al. |
| 2005/0144616 | A1 | 6/2005 | Hammond et al. |
| 2005/0155031 | A1 | 7/2005 | Wang |
| 2005/0188258 | A1 | 8/2005 | Zweifel et al. |
| 2005/0210285 | A1 | 9/2005 | Williams |
| 2005/0223374 | A1 | 10/2005 | Wishart et al. |
| 2005/0268282 | A1 | 12/2005 | Laird |
| 2005/0289535 | A1 | 12/2005 | Murray et al. |
| 2006/0070063 | A1 | 3/2006 | Takashige et al. |
| 2006/0080656 | A1 | 4/2006 | Cain et al. |
| 2006/0101457 | A1 | 5/2006 | Zweifel et al. |
| 2006/0140144 | A1 | 6/2006 | Bruner et al. |
| 2006/0212865 | A1 | 9/2006 | Vincent et al. |
| 2007/0006222 | A1 | 1/2007 | Maier et al. |
| 2007/0074197 | A1 | 3/2007 | Buckley et al. |
| 2007/0101197 | A1 | 5/2007 | Moore et al. |
| 2007/0169079 | A1 | 7/2007 | Keller et al. |
| 2007/0220510 | A1 | 9/2007 | Bell et al. |
| 2007/0240134 | A1 | 10/2007 | Buragohain et al. |
| 2007/0240147 | A1 | 10/2007 | Bernabeu-Auban et al. |
| 2007/0277167 | A1 | 11/2007 | Smith et al. |
| 2007/0300215 | A1 | 12/2007 | Bardsley |
| 2008/0040714 | A1 | 2/2008 | Wheeler et al. |
| 2008/0046708 | A1 | 2/2008 | Fitzgerald et al. |
| 2008/0077592 | A1 | 3/2008 | Brodie et al. |
| 2008/0098387 | A1 * | 4/2008 | Lo et al. .......... 717/174 |
| 2008/0127164 | A1 | 5/2008 | Duffield et al. |
| 2008/0140732 | A1 | 6/2008 | Wilson et al. |
| 2008/0148248 | A1 | 6/2008 | Volkmer et al. |
| 2008/0301646 | A1 | 12/2008 | Gupta |
| 2009/0328023 | A1 | 12/2009 | Bestland et al. |
| 2011/0225461 | A1 * | 9/2011 | Wookey .......... 714/38.1 |
| 2012/0151469 | A1 | 6/2012 | Wookey |

OTHER PUBLICATIONS

Amendment and Response to Non-Final Office Action regarding, U.S. Appl. No. 13/162,429, Mar. 6, 2013.

Amendment and Response to Non-Final Office Action regarding, U.S. Appl. No. 13/083,382, Nov. 23, 2012.

Amendment and Response to Non-Final Office Action regarding, U.S. Appl. No. 13/111,340, Mar. 6, 2013.

Gucer et al., "Deployment Guide Series: IBM Tivoli Application Dependency Discovery Manager V7.1", IBM Aug. 2008.

Non-Final Office Action regarding U.S. Appl. No. 13/152,088, Jan. 18, 2013.

Non-Final Office Action regarding U.S. Appl. No. 13/083,382, Jul. 23, 2012.

Non-Final Office Action regarding U.S. Appl. No. 13/103,820, Sep. 18, 2012.

Non-Final Office Action regarding U.S. Appl. No. 13/111,340, Dec. 7, 2012.

Non-Final Office Action regarding U.S. Appl. No. 13/114,715, Dec. 21, 2012.

Non-Final Office Action regarding U.S. Appl. No. 13/116,902, Dec. 21, 2012.

Non-Final Office Action regarding U.S. Appl. No. 13/149,353, Mar. 15, 2013.

Non-Final Office Action regarding U.S. Appl. No. 13/162,429, Dec. 6, 2012.

Non-Final Office Action regarding U.S. Appl. No. 13/171,189, Dec. 24, 2012.

Amendment and Response to Non-Final Office Action regarding U.S. Appl. No. 13/171,189, Mar. 25, 2013.

Notice of Allowance regarding U.S. Appl. No. 13/162,429, Mar. 19, 2012.

Non-Final Office Action regarding U.S. Appl. No. 13/100,982, Mar. 25, 2013.

Final Office Action regarding U.S. Appl. No. 13/083,382, Mar. 22, 2013.

Amendment and Response to Non-Final Office Action regarding U.S. Appl. No. 13/152,088, Apr. 18, 2013.

Amendment and Response to Non-Final Office Action regarding U.S. Appl. No. 13/114,715, Apr. 22, 2013.

Final Office Action regarding U.S. Appl. No. 13/103,820, May 13, 2013.

Non-Final Office Action regarding U.S. Appl. No. 13/154,123, May 23, 2013.

Non-Final Office Action regarding U.S. Appl. No. 13/159,231, May 29, 2013.

Amendment and Response to Non-Final Office Action regarding U.S. Appl. No. 13/149,353, Jun. 17, 2013.

Non-Final Office Action regarding U.S. Appl. No. 13/157,091, Jun. 20, 2013.

Final Office Action regarding U.S. Appl. No. 13/111,340, Jun. 21, 2013.

Amendment and Response to Final Office Action regarding U.S. Appl. No. 13/083,382, Jun. 24, 2013.

Amendment and Response to Final Office Action regarding U.S. Appl. No. 13/100,982, Jun. 25, 2013.

Notice of Allowance regarding U.S. Appl. No. 13/162,429, Jul. 5, 2013.

Final Office Action regarding U.S. Appl. No. 13/116,902, Jul. 8, 2013.

Notice of Allowance regarding U.S. Appl. No. 13/152,088, Jul. 17, 2013.

Final Office Action regarding U.S. Appl. No. 13/171,189, Jul. 18, 2013.

Non-Final Office Action regarding U.S. Appl. No. 13/083,382, Jul. 18, 2013.

Final Office Action regarding U.S. Appl. No. 13/100,982, Aug. 7, 2013.

Final Office Action regarding U.S. Appl. No. 13/149,353, Aug. 9, 2013.

Final Office Action regarding U.S. Appl. No. 13/114,715, Aug. 13, 2013.

(56) References Cited

OTHER PUBLICATIONS

Response to Non-Final Office Action regarding U.S. Appl. No. 13/159,231, Aug. 29, 2013.
Notice of Allowance regarding U.S. Appl. No. 13/103,820, Sep. 3, 2013.
Response to Non-Final Office Action regarding U.S. Appl. No. 13/157,091, Sep. 20, 2013.
Response to Final Office Action regarding U.S. Appl. No. 13/111,340, Sep. 23, 2013.
Notice of Allowance regarding U.S. Appl. No. 13/159,231, Sep. 30, 2013.
Response to Non-Final Office Action regarding U.S. Appl. No. 13/083,382, Oct. 17, 2013.
Response to Final Office Action regarding U.S. Appl. No. 13/171,189, Oct. 17, 2013.
Response to Final Office Action regarding U.S. Appl. No. 13/149,353, Nov. 9, 2013.
Response to Final Office Action regarding U.S. Appl. No. 13/114,715, Nov. 13, 2013.
Notice of Allowance regarding U.S. Appl. No. 13/083,382, Nov. 8, 2013.
Notice of Allowance regarding U.S. Appl. No. 13/116,902, Nov. 8, 2013.
Notice of Allowance regarding U.S. Appl. No. 13/171,189, Nov. 18, 2013.
Notice of Allowance regarding U.S. Appl. No. 13/114,715, Nov. 22, 2013.
Notice of Allowance regarding U.S. Appl. No. 13/157,091, Dec. 6, 2013.
Notice of Allowance regarding U.S. Appl. No. 13/149,353, Dec. 11, 2013.
Notice of Allowance regarding U.S. Appl. No. 13/100,982, Jan. 16, 2014.

* cited by examiner

APPARATUS AND METHOD FOR MONITORING SOFTWARE INSTALLATION PERFORMANCE

CROSS-REFERENCE TO RELATED APPLICATIONS

This application is a continuation of and claims priority to U.S. patent application Ser. No. 13/083,382 entitled "APPARATUS AND METHOD FOR GENERATING A SOFTWARE DEPENDENCY MAP", naming Michael J. Wookey as inventor and filed on Apr. 8, 2011, the entirety of which is hereby incorporated by reference herein, which is a continuation of abandoned U.S. patent application Ser. No. 11/862,987 entitled "APPARATUS AND METHOD FOR GENERATING A SOFTWARE DEPENDENCY MAP", naming Michael J. Wookey as inventor and filed on Sep. 27, 2007, the entirety of which is hereby incorporated by reference herein, which claims priority under 35 U.S.C. §119(e) to provisional patent application 60/890,171 titled "SYSTEM AND METHOD FOR DEPLOYING AND MANAGING SOFTWARE," filed on Feb. 15, 2007, which is hereby incorporated by reference herein.

FIELD OF THE INVENTION

This invention relates, in general, to software deployment, and more particularly to the installation of enterprise-wide software applications based on customer-preferred installation parameters.

BACKGROUND

In order to run a software application on a computer, it usually requires the execution of an installation program to install the software onto the computer's hard drive or other storage medium. Depending on the size and complexity of the software, the installation program can be quite complicated. An installation program typically manages the installation of multiple files to one or more directories within a file system of the storage medium. Often, existing configuration files are edited in order for the computer's operating system to become aware of the new software. Further, some of the edited configuration files are accessed by other applications. Such changes to a computer's environment may cause problems, such that a newly installed application may not work correctly, or possibly worse, a previously installed application may begin to malfunction. Such problems become a much larger concern when an application is installed on numerous computers across an entire company, sometimes referred to as an enterprise computing environment.

Due to such problems, the deployment and installation of software applications in an enterprise computing environment is a major challenge for the software industry. A significant percentage of all software installations fail in some manner. A software installation failure can be defined as some type of error that exists after the installation of the software. Errors can exist in both the newly installed application as well as in some previously installed application. Such errors include installation time errors, run time errors, performance errors and compatibility errors. An installation time error occurs during the installation of the software itself. Installation errors may result from an incorrectly linked software component, which would have been defined by an actual human, poorly written computer code that has not considered the current configuration of the client system or number of other scenarios. Such an error may prevent the software application from being installed successfully. In such examples, only a portion of the required files are installed, resulting in a partial installation which is incapable of running correctly. Efforts are then required to back out the partial installation to return the computer back to its previous state.

The next type of installation failure is known as a run time error. A run time error is an error that occurs during execution of the software, but often occurs while initially launching the application. One type of run time error may result in a failure to launch the software, with no warning or error messages stating the problem. In result, nothing happens when the software is attempted to execute. Often times one or more cryptic error or warning messages are displayed as to why the application has failed to launch correctly. Other types of run time errors may occur while using the application. Under various scenarios, such as an incorrect version of some software component in the client system, the application may simply stop working during execution of one or more features within the software.

Performance errors reflect problems that allow the application to load and run successfully, but at some reduced level of performance. For example, in a typical installation of Apache Software Foundation™ Apache 5.5 Web Server (hereinafter "Apache 5.5"), the software's ability to resolve one page of Hyper Text Markup Language (hereinafter "HTML") code and display the output on a webpage may take 5 milliseconds. In a performance hindered installation of Apache 5.5, resolving and displaying a web page may take a full second, causing a drastic reduction in Internet browsing performance.

The last type of installation error involves compatibility problems with other applications. Compatibility problems may allow the newly installed application to run properly, but one or more previously installed applications may fail to work correctly after the new installation. Such errors are often the result from a common file or group of files shared between multiple software applications. For example, the parameters in a given configuration file may be accessed by one or more applications. Such a configuration file may contain parameters required by the software. A newly installed application may alter the parameters in such a way that a previously installed application may be expecting certain parameters to have remained unchanged. In another example, one or more software applications may depend upon the existence of a software service that resides on a computer. For example, many applications require TCP/IP connectivity services, which is the standard communication protocol used by computers to communicate over the Internet. Installation of a new application may replace TCP/IP version 6.2 with 7.0. However, previously installed applications may be incompatible with TCP/IP version 7.0, causing the existing applications to experience errors.

The reasons for such software installation errors vary. Some errors are the result of the installation tools that install software onto a computer. Normally, software is delivered to users as a compact disc ("CD") or digital versatile disc ("DVD") or other form of removable storage media. A user would place the disk into the computer's optical drive and follow the instructions for installation. These instructions are human defined tools that physically install the files onto a storage medium. The tools are prone to errors during installation for a variety of reasons. Installation errors may also result from the way software applications are constructed and packaged, rather than the installation tools that apply the software onto a computer system. Installation tools are human created, which allows for the possibility of human-generated errors. The packaging and construction of software are also defined by humans. As a result, the packaging of software may be prone to installation errors as well.

Software is normally constructed of multiple packages. Each package usually has one or more pieces of functionality within the entire software application. Each piece of functionality will further contain numerous individual files containing software code. An individual software file comes in the form of differing types of functionality. For example, a software file could be a shared library file, configuration file, executable file, etc. A shared library is a human understandable listing of variables, functions or procedures that define how certain functions of a software application work. It would also be accessible by one or more other files, hence the reason it is called a "shared" library. A configuration file may also be in human understandable language. Its function is to define variables that are used throughout the software application. For example, one entry in a configuration file might specify that the default installation path for the software is /bin/usr/apps. This variable could be changed by editing the file at any time. An executable file differs in that it is not readily understandable by humans. The executable file is a compilation of one or more files, containing software code, that have been compiled to create a binary file understandable to a computer directly.

In an example of the delineation of functionality between software packages, an accounting application may contain a package that controls accounts receivable. Another package may control the functionality for accounts payable. Such package-based presentation of a software application is the result of the way software applications are written. Software packages are usually written by numerous software programmers. In order to manage the efforts of each programmer, their tasks are divided into small pieces of functionality where each functional piece can communicate with each other. The division of such functional pieces often results in packages. For example, a software application may comprise 57 packages, with each package comprising hundreds of individual files. One group of software programmers might be tasked with writing the accounts receivable portion and its associated files, with another group responsible for the accounts payable portion and its associated files. Knowing how to divide the functionality between each software package is as much an art as it is computer science.

The division of functionality between packages is the result of compromises. On one side, the more packages that an application comprises, the greater the ability to divide functionality between each package, resulting in a more compact and compartmentalized design. For example, if a software application contains 20 packages, the amount of functionality required in each package is far more than if the same application had 200 packages. On the other side of the compromise, the smaller the number of packages, the easier it is for a system administrator to grasp the division of functionality. Typically, a system administrator is the person or persons within an enterprise that is responsible for installing and maintaining software applications in the enterprise environment. When installing a software application comprised of individual packages the administrator executes an initial installation script that begins the installation process. Depending on the specific software application and its complexity, an installation script may pose one or more questions to the administrator. Such questions might involve where to physically install the software within the computer's file system, what optional features or services are desired, or the privilege level for installing the software. Conventionally, the software installation process is script driven. Installation scripts set forth the above types of questions and record the answers for later use during the installation. For example, if a script asks where to install an application, the provided answer would then be used during installation to install the application in the desired location in the file system.

One way that an administrator is able to reduce the amount of interaction required during an installation is to modify the installation scripts to remove the questions and enter the answers directly into the script. Hence, when the installation script is executed, no questions are asked, as the answers are already provided.

Along with the compromises mentioned above, there are additional problems which continue to escalate over the life cycle of a typical application. These problems are mostly centered on a concept sometimes referred to as "software drift." Once a software application and its division of functionality between packages is defined, it becomes familiar to the system administrators who install and maintain the application. If the division of functionality between packages changes in the future (i.e., it "drifts") whether from the fixing of software bugs, functionality improvements or additions, etc., this may cause difficulty for the system administrators who were already familiar with the previous delineation of packages. Hence, software drift can create a growing conflict between the needs of the administrators and the preferences of the software developers as versions of a software application incrementally change. For example, when a software application is originally created, the original definition of the individual packages within the application likely involved a compromise between the functional interaction between the individual files that make up the package and something comprehendible by system administrators. However, as software versions increase, it is likely that the delineation between the packages will change which in turn increases the complexity of the installation as well as the potential for various installation errors.

To address these problems, packaging formats for software are continually evolving. However, each change tends to represent minor or incremental improvements over the prior approach that only address the results of the inherent problems rather than the inherent problems of software packaging. Much of the hesitation to change how software is packaged is due to the unwillingness of software vendors to change the way software development projects are designed. A software application is a self-contained entity that can be delivered on a CD/DVD-Rom. Rarely would this application have any relationships to any other software application. This is one of the major problems with the current method for software packaging. All of the decisions and software dependencies are made at the time of the software creation. Hence, the developers are aware of the various computing system configurations and generally attempt to account for them, but they know little about the uniqueness of the particular computing systems the software is installed on.

There are a number of software packaging formats in use today, many of which date back to the 1980s when the current problems of software packaging originated. FIG. 1 is a block diagram illustrating the general components in a conventional computer software package. There are five major components to a basic software application 100. The core software inventory 110 is the main component that contains the actual files of the software application 100. These files are organized into packages. The core software inventory 110 is the eventual compilation of bits to be installed onto a computing system. One or more of these files are often stored in a compressed format.

Functional relationships with other packages 120 are the second major component of a basic software application 100.

A functional relationship is a requirement, by the software to be installed, that something else must exist before installation of the software application to run properly. For example, a functional relationship may require that an additional software application or service be installed before the new software application can be installed. In order to install Apache 5.5, for example, TCP/IP services should be installed on the system. In other examples, a functional relationship may require that certain services be installed concurrently with the software to be installed, or that certain software or services not be present on the computing system due to incompatibilities between certain software applications and services.

Finally, in yet another example, a functional relationship may require that one or more software applications or services be de-installed before installation of the new software because the new software may replace one or more packages.

The package manifest 130 is the third component in the basic software package 100. The package manifest 130 involves a list of all of the files with the packages that make up the basic software application 100. Thus, the manifest lists all of the files in the core software inventory 110. The manifest is often used for validation purposes in order to confirm that each and every file required for installation is accounted for within the software inventory core.

A pre-installation script 140 is the next component in the basic software package 100. This script describes what needs to be validated prior to the installation of a software application. Generally speaking, a script is a software file that sequentially lists steps that are to be executed. For example, a script may list steps for creating a new directory, moving files into it from another location, validating the size of the files as being within a threshold range and sending an email if the files are outside the threshold range. There are numerous scripting languages that exist for writing scripts, such as: pert, python, tcl, etc. As mentioned above, there can often be numerous dependencies that exist between the software to be installed and other software or services that may be needed, etc. Other validation requirements may be included in a pre-installation script 140 aside from dependencies. For example, the pre-installation script may look to determine if there is enough disk space to install the software application. Another example is whether there is enough memory available to run the application effectively. Further, the pre-installation scripts may also serve the purpose of asking a system administrator questions regarding the installation. Examples of such questions were discussed above.

A post-installation script 150 is the final component in the basic software package 100. Similar to the pre-installation script mentioned above, the post-installation script 150 describes what needs to be performed after installation of the software application 100 has been completed. An example of such a script entry may be that the computing system needs to be rebooted in order for new startup processes to be loaded or old ones to be deleted. In another embodiment, the post-installation script 150 may require de-fragmentation of the hard drive, depending on the nature of the installation and where the files are store on the hard drive.

FIG. 2 is a block diagram that illustrates the functional relationships between the packages that comprise Software Application A. Software application A (200) comprises packages 1-5 (210-250). Each package encapsulates a group of one or more functions required to install the application. Coming out of each package are a number of straight lines connected to other packages. These lines 205 illustrate the functional relationships that exist between packages. For example, package 1 (210) has an interrelationship with packages 2 (220), 3 (230) and 5 (250). Hence, it is not possible to install package 1 (210) without the inclusion of packages 2, 3 and 5 as each of these packages interrelate to one another. For example, package 1 may provide the function of accounts receivable within an accounting software application. Since accounts payable (e.g., package 2 (220)) is an essential part of the software application, it would not be possible to install package 1 without also installing package 2. Further, package 2 (220) also has a functional relationship 205 to other packages. Packages 3, 4 and 5 (230, 240 and 250) also have functional relationships 205 to other packages. In this example, there are only five packages, which are quite manageable for a system administrator. However, if those five packages are extracted down to the granular level (not shown for simplicity), there may be thousands of files with thousands of functional relationships between the files. A typical system administrator would be greatly challenged to comprehend the hierarchy and functional relationships of so many files.

Much of the recent development of software packaging has focused on improvements in three core components of the basic software package, namely functional relationships on external application, pre-installation and post-installation scripts. Software vendors are putting forth much effort on making improvements to the pre-installation and post-installation scripts and their descriptions. One of the original challenges to software vendors was that these scripts were not well validated and could not adjust to specific installation needs. One attempt at addressing this challenge is by writing scripts with meta languages, such as XML. This may allow for a more syntactical runtime verification of these scripts. An example of such XML-based install scripts is the Debian packaging format used by many recent versions of the Linux™ operating system.

Management and validation of functional relationships is the other core component where much effort is being placed on improvements to the basic software application. The generation of functional relationships are human defined. This means that software developers have to determine which functional relationships are required before installation of a software application. As such, the creation of functional relationship within software is prone to human errors since they are artificially created during development and do not necessarily correspond to the unique functional relationships that may occur during installation. In other words, conventional functional relationship creation occurs at a point in time before the installation of a software application. Hence, these functional relationship are generic in that they exist for all computing system configurations without any ability to change depending on the uniqueness of each computing system environment. Another problem that can exist from the human declaration of functional relationships are circular relationships between individual software files that cannot be resolved because the relationships are created based on artificial constraints. A circular relationship occurs when two software files or functional blocks of software code are both declared to relate to each other. As a solution, developers are creating automated validators that help define functional relationships. Such validators can then be used validate the functional relationships in a software package.

As described above, there are inherent problems with the way that software is conventionally packaged and installed on computing systems today.

SUMMARY

Aspects of the present invention provide a novel approach to packaging and installing software. In order to streamline the software installation process, system administrators should be provided the opportunity to install the minimal components and features they need. With conventional packaging techniques, this ability is strained. Conventionally, software applications are divided into distinct packages of functionality. Each package usually includes more functionality than is needed for a custom installation. However, there is limited ability to pick and choose the functions desired. As a result, installed software applications often include more functionality than desired. As such, additional disk space and other finite computing resources are wasted. Further, system administrators often resort to manual deletion of unneeded functionality which can further reduce the stability of their systems. Other problems with conventional software packaging and installation techniques result in many failed installations. Installations may fail in a number of ways as described in Section II. Implementations conforming to aspects of the present invention or those set forth in the related applications succeed in reducing the number of software installation errors by learning from the mistakes of previously failed attempts and customizing installation routines to circumvent such failures. Various implementations of the present invention may also recognize that the way to address these problems is not to incrementally improve the existing approaches to software packaging where dependencies are created during the development cycle. Instead, aspects of the present invention revolve around delaying the time for dependency creation to the time of each individual install.

These and other aspects of implementations of the present invention are set forth in greater detail below.

DETAILED DESCRIPTION

Figure 1:
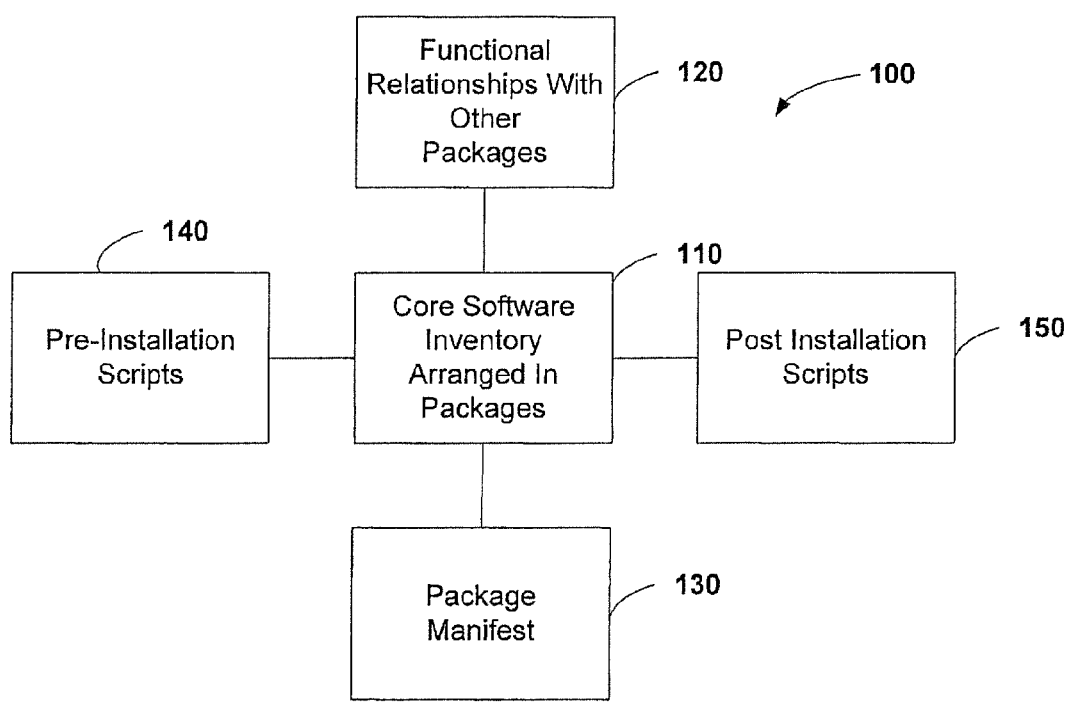
FIG. 1 (prior art) is a block diagram illustrating the general components in a conventional computer software package.

This detailed description of various implementations of the invention claimed in this or the related applications is subdivided into six major sections: section I ("Introduction"); section II ("Removing the Need for Software Packaging"); section III ("Software Dependency Maps"); section IV ("Software Dependency Routes"); section V ("Enriching the Dependency Map by Monitoring Software Installations and Performance"); and, section VI ("Software Installation Simulation and Intelligent Software De-installation"). The first section provides an introduction and a description of some of the overarching concepts of a dependency map and related implementations set forth herein. A dependency map involves a collection of software elements, which each include a reference to some type of software file, and the dependency relationship between the software elements. The dependency map provides the vehicle by which a software application may be installed at some target computer. Finally, the introduction provides a description of a service provider that generates and hosts a software dependency map for use by a client for installation.

The second section provides a detailed description of a method for installing software that begins at the file level rather than the package level. If individual software files are removed from the constraints of conventional packages and related at a more granular level, the inherent problems caused by packages may be alleviated. In addition, section II discusses how to install and manage software from the file level as well as the dependencies that exist down at a granular level. Absent features of various implementations set forth herein, such a granular level could make a system administrator's ability to grasp the additional number of pieces and their dependencies exceedingly difficult. For example, with the traditional approach to software packages, a software application may comprise 57 interrelated functional packages. This number of packages and their relationships are typical of a conventional software application. Functional relationships at the package level are readily ascertained and managed by a system administrator. However, aspects of the present invention define a software application at the individual file level with perhaps thousands of files, making it potentially more difficult for a system administrator to ascertain all of the file level interaction and manage the same. To remedy such a potential problem, aspects of the present invention involve a method of using a dependency map to determine which software files are needed to install a software application. Lastly, section two sets forth methods for managing pre-installation and post-installation conditions by adding such pre-installation and post-installation conditions as attributes to individual software files in a dependency map.

The third section provides additional details of software dependency maps and various possible particular implementations. Thus, the third section builds on the dependency map descriptions set forth in the introduction. All software files depend upon or are dependent on one or more other software files. A dependency map, in one particular configuration, is a memory resident dynamic model of the relationships between each software file of a given software application and other applications, while also accounting for the operating systems in which they reside. Over time, a given dependency map may grow in size as software applications or features thereof are added to the map, or may shrink when applications or features thereof are removed. The dependency map may also include a weighting system that reflects a confidence factor between software element dependencies. For example, if software file A is known to depend upon the presence of software file B, a confidence factor may be built into this dependency. The factor may exist in the form of a percentage of installations that have been successful based on this dependency as related to the total attempts. So, if 85 out of 100 attempts at installing a software application using the dependency between A and B, were successful, that dependency may have a confidence factor of 85%.

The third section also discusses various aspects of a client agent that interacts with a remotely hosted dependency map at various level. For example, in one implementation a dependency map is hosted by a remote service provider and a local computer hosts a client agent capable of communication with the service provider's map. Installing a software application on a client computer involves the client agent requesting the map at the service provider. The intellectual property contained in a software dependency map is often a trade secret and is kept confidential by its owners. Further, the amount of data contained in such a map could be enormous. In result, hosting the entirety of the map on each individual computer while possible, may be undesirable. Hence, aspects of the present invention involve placing a client-based software agent on each computer that is capable of accessing and querying only relevant portions of the remotely hosted dependency map to install a particular software application.

The fourth section provides a detailed description of the dependency route portion of the dependency map. A dependency route involves a list (or "path" in the context of a map) of software files needed to install a software application. Almost all software applications may be installed in different ways. For example, the same software application may be installed to achieve the fastest run time, the highest reliability, the highest security, etc. Each configuration will most likely change the software files required for installation. Hence, a dependency route involves a pathway in the map, between every file needed to install a software application under the conditions chosen by a user. As software file dependencies have confidence factors, so do individual dependency routes. For example, if 79 out of 100 installations used a specific dependency route for installing application A on operating system B, the confidence factor for that route would be 79%. Whereas a different dependency route that installs the same software on the same operating system may be successful 150 out of 172 attempts, resulting in a higher confidence factor of 87%. There are likely to be multiple possible routes through the map for any particular software installation configuration.

The fifth section provides a detailed description of methods for monitoring software installations based on a given dependency route as well as methods for analyzing software performance of a given installation. Client-side monitoring agents may be used on each computer to monitor the performance of a given dependency route. Such performance data may be uploaded to the central service provider that hosts the dependency map. Over time, the service provider for the dependency map collects performance data for each application using different dependency routes. Such data may be implemented into the dependency map as a means of further adding to confidence weightings of particular dependency routes.

The sixth section provides a detailed description of methods for simulating a software installation based on a given dependency route without actually installing the software. Such a simulation can forecast the ramifications of an installation on a computer by provisioning a virtual operating system and the list of currently installed software on the computer. By using such a simulation, potential installation time or run time errors can be flagged before the actual installation is performed. Section six also discusses the use of intelligent backup of an installation. By knowing the steps and ordering of a route taken to install an application, the same application can be backed-out along the same route. Through use of the dependency map and the dependency route used, an installation can be removed by knowing the list and ordering of software files that need to be removed. In contrast, convention de-installation techniques are converging in that they move forward in time trying to merge back to a state that resembles the previously stored state.

In summary, sections one through six teach various methods for replacing the conventional software application packaging approach by removing the functional packages from each application. Individual files that comprise software packages are extracted and placed into a dependency map. Dependencies between each file, or software elements, are further added into the dependency map. Customized dependency routes are further added into the dependency map, allowing for true installation-time customization of software applications. Lastly, methods are set forth for simulating software installations, measuring and increasing performance of installed applications, and intelligent software de-installation routines. There are other inventive features set forth in further detail below.

I. Introduction

Figure 3:
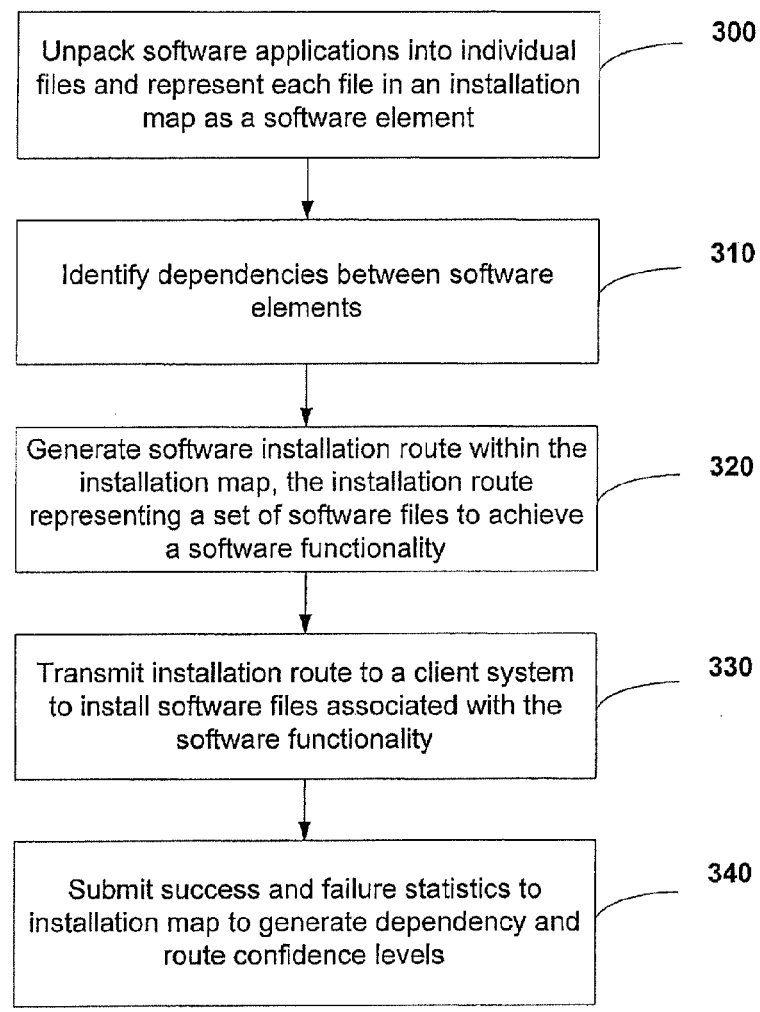
FIG. 3 is a flow diagram illustrating a method for installing an application involving the operation of unpacking a software application, generating a file-level dependency map, and using the map to install an application.

One feature that various implementations set forth herein build upon or leverage in some way is the dependency map. A dependency map, also at times referred to herein as an "installation map", involves a set of software elements and dependency relationships between the software elements. Each software element is extracted from some particular software application that may be installed on a computer. To achieve this, a conventional software package is "unpacked" to extract the various files that make-up the various packages of a software application. The various files are added to a dependency map, and form one attribute of a software element. The files or the software elements are analyzed to determine their dependency relationships with other software elements, and these dependency relationships are further added to the map. From the map, dependency or "installation" routes may be derived. A dependency route involves a list of software elements corresponding to a particular installation, which routes are leveraged to facilitate installation of a software application on a target computer. FIG. 3 is a flow diagram, discussed throughout this section, illustrating a method for installing an application, the operations involving unpacking a software application, generating a file-level dependency map, and using the map to install an application.

In one particular embodiment set forth herein, a method and various related features are described in the context of a service provider model where the service provider generates and hosts the dependency map and is involved in updating, etc. In such a context, installations are performed at client devices. However, a service provider model is simply one possible arrangement for deploying and using a dependency map. Such additional systems are further described throughout this application. As alluded to above, one inventive concept set forth herein involves the transformation of software from high-level packages to low-level individual files for the purpose of installation amongst others. In the service provider context, the service provider transforms the software (e.g., unpacking the software packages and defining a dependency map setting forth the file-level dependencies both within the software application and to external software application), hosts the dependency map, and provides knowledge to end-users on how best to install software hosted with the model, amongst other functions.

In one possible arrangement, a dependency map hosted and generated by a service provider is available as a fee-based service. Such a fee could be based on a per-request basis, annual maintenance fee basis with unlimited installation requests, or other fee arrangements.

In a service provider configuration, the service provider provides the infrastructure (e.g., servers, storage, functional modules, etc.) to generate and hosts the software dependency map. The generation and management of the dependency map is further described in Sections II and III and other places throughout this document. In one fundamental respect, a dependency map is a logical collection of each individual file from one or more software applications added to the map and a dependency relationship between the files. The server-side computing components include modules (as described with respect to FIGS. 7, 10 and others) that are configured to disassemble a software application's packages into their individual files and represent each file in the map as software elements (operation 300, FIG. 3). In one embodiment, a software element is a representation of an individual file that is part of a software application. Further, a software element stores a plurality of attributes to describe each file represented by the element. One attribute is a pointer (such as a network address, attached memory address, database pointer, etc) to the physical location of the represented file. Additional attributes represent dependency relationships, confidence factors, timestamps, versioning, etc which are discussed through out this application.

Figure 11:
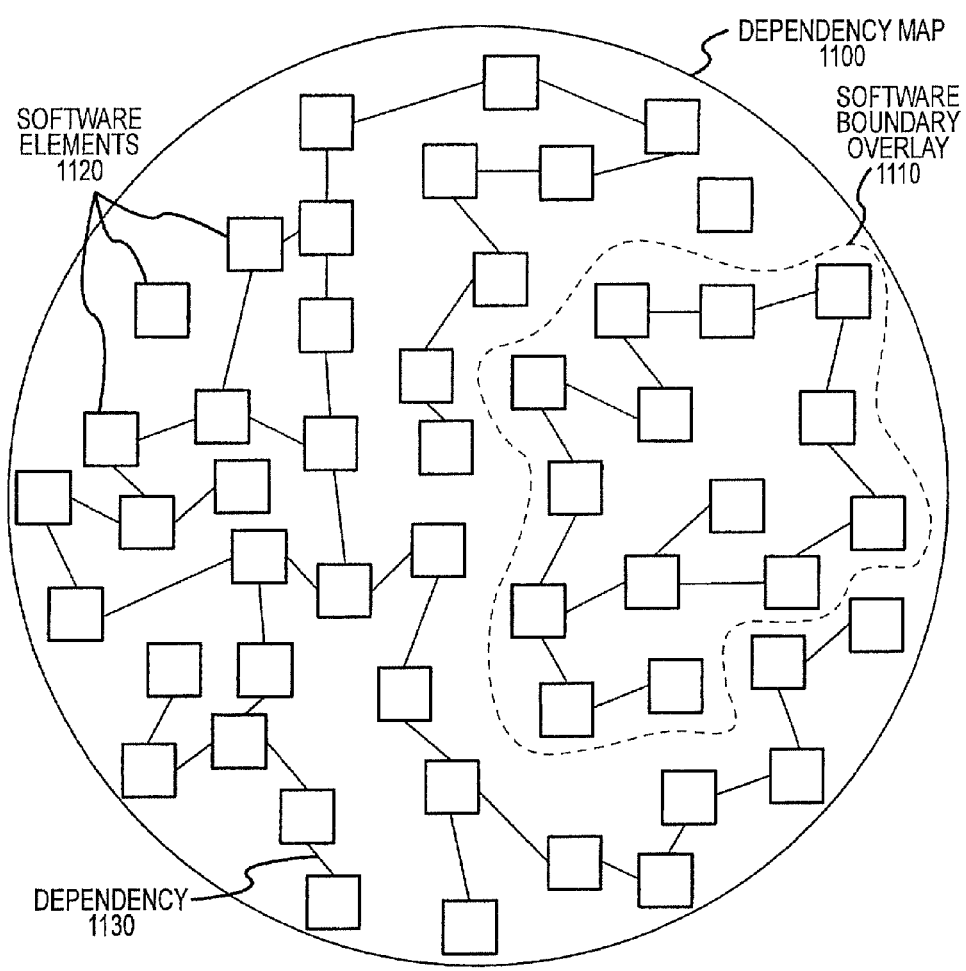
FIG. 11 is a block diagram illustrating an example of a dependency map with a software boundary overlay.

As will be further described below in Section III, each software element in the map has at least one dependency relationship with another software element. Generally speaking, a dependency relationship indicates that the file represented by the software element is depended upon or depends upon at least one other file represented by another software element. The reason for dependencies between software elements is to allow a collection of individual software elements to work together to form a functional software application. For example, a specific software element may be an executable file that is dependent upon execution parameters stored in a library file that is shared by additional software elements. If the executable file did not have a dependency on the shared library file, the executable file would be unable to run successfully. In order to resolve the dependencies between each software element in the dependency map, additional modules coupled to the dependency map, are configured to resolve and represent these dependencies within the map (operation 310, FIG. 3). These processes are further described with respect to FIG. 9 and elsewhere. Operations 300 and 310 of FIG. 3 are repeated for each software application hosted by the dependency map. As a result, the dependency map may represent a plurality of software applications that are each represented at the file level by individual software elements, along with the dependencies that exist between each element. It is possible that a dependency map may include millions of software elements and dependencies. FIG. 11 illustrates a graphical example of a dependency map.

In one particular embodiment, the infrastructure and contents of a software dependency map are organized and stored in a scalable database (e.g., relational, object-oriented, etc.). Such a database contains multiple tables with each one representing software elements and their attributes, dependencies, and their attributes, between elements, software boundary overlays, dependency route overlays and their attributes, route calculation overlays and their attributes and other components configured to create the infrastructure of a software dependency map. As described below, the actual software files represented by software elements may be stored in a second database. The software elements maintain a pointer to the physical database location of the files they represent. As such, the database providing the infrastructure of the software dependency map may communicate with the database storing the actual software files represented by the dependency map.

Figure 13:
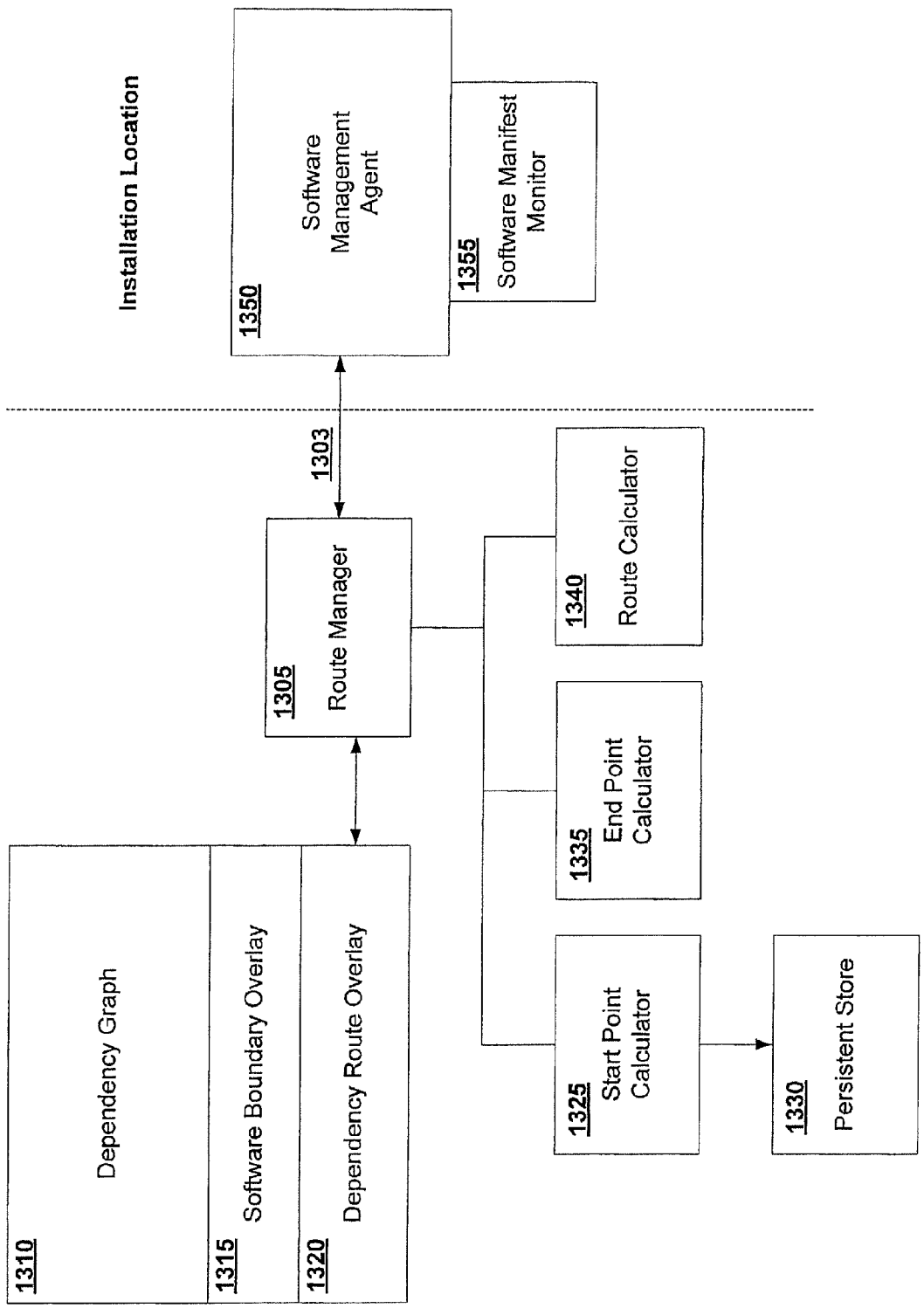
FIG. 13 is a block diagram illustrating components involved in dependency route calculation.
Figure 15:
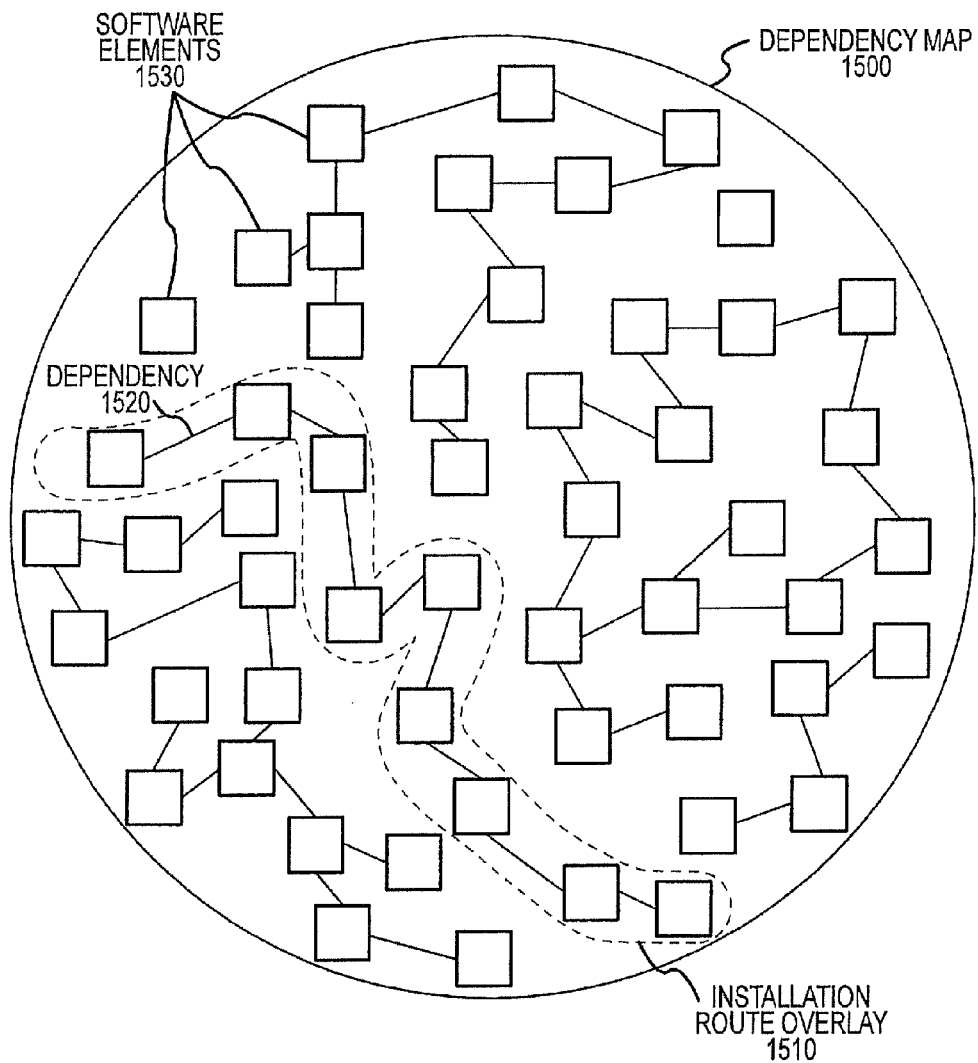
FIG. 15 is a block diagram illustrating an example of a dependency route overlay.

Once a dependency map is created, specific dependency routes may be implemented throughout the map. A dependency route is a collection of software elements having dependencies with at least one other software element, wherein the elements each represent an individual file forming part of a software application that will be installed on a target computer or computers based on specific requirements and configuration parameters. The route may be considered a pathway through the dependency map between a first collection of software elements that are related to a current state of the software resident on the target computer to a second collection of software elements that will allow the addition of a new software application, upgrade or reconfiguration of a current software application. FIG. 15 provides a graphical example of a dependency route running through an example dependency map. The dependency map is coupled to a route manager (as shown in FIG. 13) that is configured to analyze the software elements that comprise a software application and generate specific software dependency routes that may be used to install the application on a client machine (operation 320, FIG. 3). Once a client communicates their installation requests to the service provider or whatever computing system is provided to host the dependency map, the route manager determines one or more dependency routes that may accomplish the specific needs of the client. The dependency routes are then transmitted to the client for installation (operation 330).

Once a client has decided on their installation needs, they have many options on how to proceed. First, they may install the software based on one of the dependency routes provided by the dependency map. Secondly, the client may run a simulation (as described in Section VI) of the chosen dependency route to determine if the route would result in a successful installation. Based on the success of the simulation, the client may chose to install the route or request an alternate route from the dependency map. Lastly, the client may take a snapshot of their current system. A snapshot is a detailed description of the current software inventory and system configuration of a computing system. Multiple snapshots may be taken that represent the current state of the computing system at differing periods of time. If errors occur during the installation, the client may request to uninstall or back-out the installation (as described in Section VI) in order to place the client machine in the same position before the installation commenced (i.e., at the snapshot). This approach differs from conventional back-out methods that move forward to place the machine in the previous configuration. Whereas, the inventive approach moves backwards in order to place the machine in its previous configuration, resulting in a substantially identical mirror of the machine's previous state.

Lastly, client machines are capable of communicating the success or failure of installations back to the service provider (operation 340). Such information may be used to implement a weighting system on the confidence of dependency routes and individual dependencies between software elements.

II. Removing the Need for Software Packaging

Figure 2:
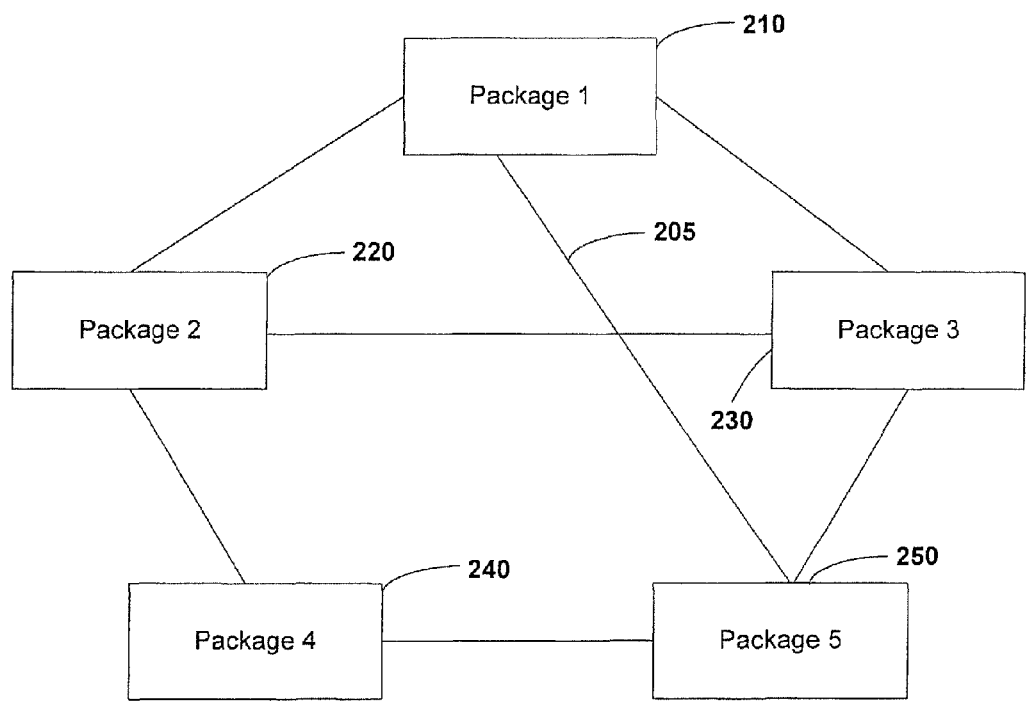
FIG. 2 (prior art) is a block diagram that illustrates the functional relationships between a set of packages for an example software application A.

A purpose for combining a software application into packages is to allow system administrators to grasp the interrelationships between each functional package of the application. The smaller the number of packages, the easier it is to grasp their interrelationships. As stated above, conventional software packages are not represented at the granular level of individual files because a typical system administrator would find it exceedingly difficult to grasp the vast number of individual files and the complex dependencies that exist between them. Hence, this is one of the reasons that conventional software is represented at a higher package level as previously described with respect to FIG. 2 and elsewhere, particularly in the Background section.

File level dependency mapping set forth in accordance with aspects of the present invention is useful for custom installations, besides other advantages. In many software installations, not all files of a software application are required. However, based on the way conventional software is packaged, additional files are usually installed that will not be needed by the current configuration. In most software installations, many of the individual files are part of the core of the application. These core files are required no matter what installation parameters or options are chosen. However, the remaining non-core files in an application may be configuration-dependent in that they are only needed under certain circumstances. For example, Apache 5.5 may have 50 files devoted to a certain type of security feature that an administrator may chose to forego. Another 20 files may be "help" files that describe how to run and conFIG, a web server. The decision to install these files should be optional. However, conventional software packaging often makes optional file installation difficult. Further, knowledge of which files are needed for each of the above examples would be difficult or impossible for an administrator to ascertain as there may not be available information describing which files correspond to which features.

Besides making custom installations difficult or impossible, as set out above, conventional software packaging is also a cause of installation failures. Aspects of the present invention thus involve a solution that removes the need for software packages, allowing it to be organized at the granular file level, and also providing a way to facilitate installation from the root file level.

Once the artificial constraints created by software packages are removed, focus can be placed on the individual software elements representing each file and their relationships with one another (i.e. dependencies). However, software element dependencies are often not absolute. In other words, a dependency between element A and element B may not always need to exist. There are examples where such a dependency is needed and others where it is not needed. For example, if an administrator wishes to install a software package based on "the most reliable version", element A may not depend on element B. However, if an administrator wishes to install the same software package based on "the latest version", element A may indeed depend on element B. Under this example, the dependency between element A and B is not absolute.

Another factor that affects whether a dependency exists are that certain dependencies can create "circular relationships" that should be resolved (i.e., redirecting or adding a dependency to another element to remove the circular relationship or provide a link to a software element outside the circle). If an absolute dependency exists within a "circular relationship", this can make resolution of such a relationship difficult. An absolute dependency is where A will always depend on B no matter what the circumstance. An example of a circular relationships would be A depends on B which depends on C which depends on A. In this example, if the dependency between C and A is absolute (i.e., always exists), there would be no way to resolve this circular relationship since C always depends on A and A depends on B which depends on C. If however, the absolute dependency between C and A were only necessary due to a certain symbol that could also be met by D, than the circular relationship could be resolved by redirecting C to depend on D instead of A.

Yet another factor is that there are other parameters other than pure positive dependencies. There may be stated incompatibilities between elements and there may be replacement relationships where a new element with similar functionality might replace it. For example, in a specific software application, package A may have a stated dependency on package libCORE. The software developer responsible for packaging this software may have defined this dependency because package A contains an executable command called "ps". In order to execute "ps", the memchk command is needed. In this example, memchk is stored in the library definitions of libC which is further a part of package libCORE. It may be possible that memchk also exists in a different set of library definitions called libgtk which is part of package GTKlibs. In this case GTKlibs is a replacement dependency for package A, even though package libCORE also includes the same memchk element needed by "ps". The reason a software developer chose a stated dependency on libCORE instead of GTKlibs may be that GTKlibs is part of a different software application which may not be installed on the computer. However, if the software application that includes the GTKlibs package is present, the dependency from package A may be changed from libCORE to GTKlibs, in implementations conforming to aspects of the invention.

Figure 4:
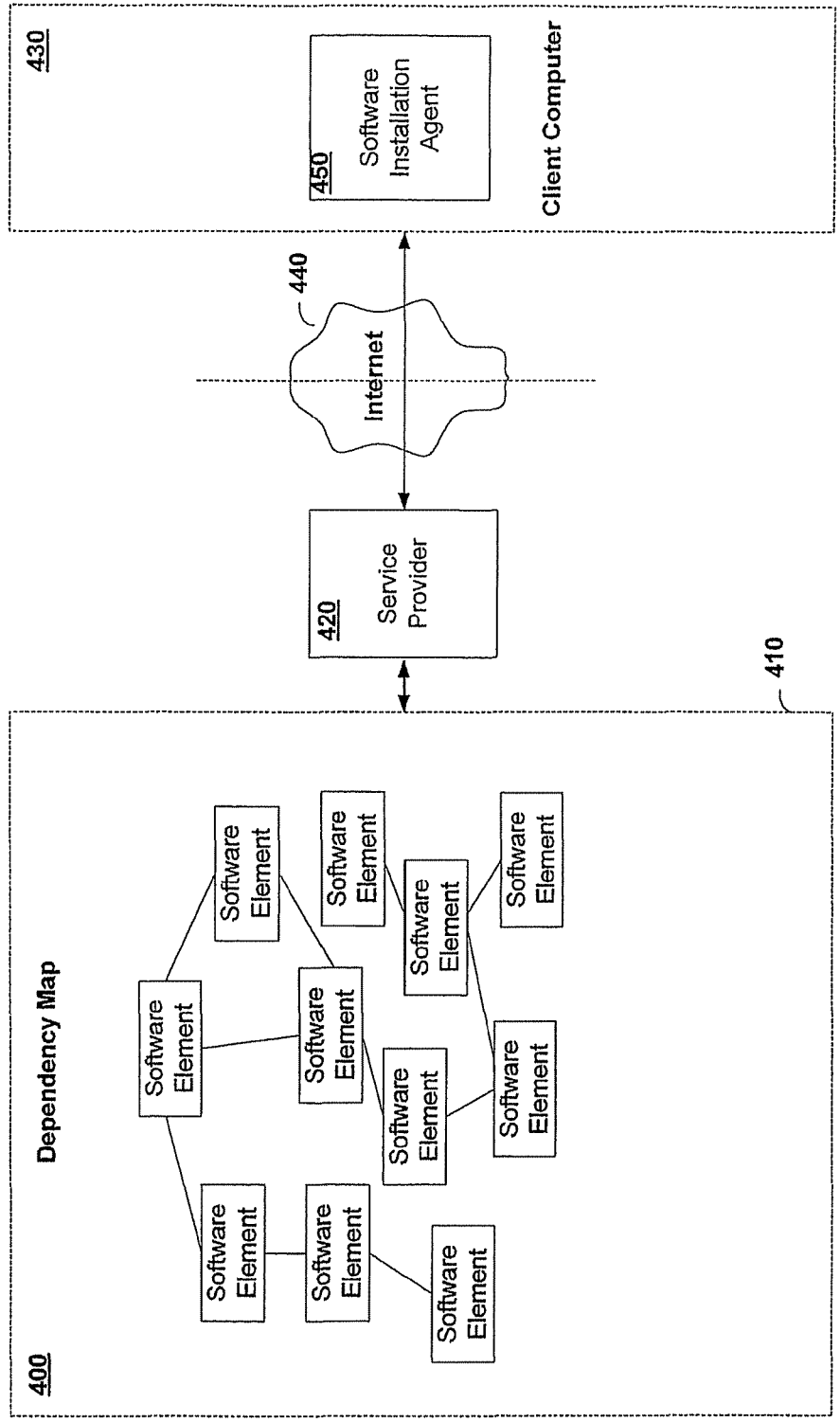
FIG. 4 is a block diagram depicting one example of a client-server arrangement that may be used in some implementations set forth herein, the arrangement involving a dependency map hosted at a server-side configuration and available to client-side system administrators when installing software.

One particular implementation involves a server-side dependency map that provides software application information at the software element level rather than the package level. FIG. 4 is a block diagram depicting one example of client-server architecture where the dependency map 400 is hosted by a database 410 in communication with a server-side computing arrangement (service provider 420) and available to client-side computers 430 to install a software application.

In the example set out in FIG. 4, the one or more client computers 430 would seek access to the service provider's dependency map 400 and the installation routes that may be derived therefrom. In one embodiment, client computers 430 communicate with the service provider 420 via the Internet 440. In another embodiment, client computers 430 may communicate with the service provider 420 via a local or enterprise-wide network (not shown). To facilitate communications between clients 430 and the service provider 420, a client-side software installation agent 450 may reside on each client computing system where software installations are desired. This software agent 450 is able to communicate with the service provider 420 to make installation requests as well as receive installation instructions, besides other functions. Further, the software elements (or related files) needed to fulfill an installation request may be transmitted from the service provider 420 to the client 430 over the Internet, local, enterprise-wide networks, or other removable storage media (e.g., the root level file may be recorded on optical disc, etc.)

The entity responsible for hosting a dependency map is not limited to a service provider as previously mentioned. A dependency map host may come in many forms. However, in one embodiment, the map is hosted by a third party service provider with no formal relationships with individual software vendors. The third party hosts a dependency map that may represent software from one or more software vendors. In another embodiment, the entity hosting the dependency map may be an actual software vendor, such that the dependency map represents software applications specific to the vendor. Further, the vendor-hosted dependency map may also represent software applications from other vendors. In another embodiment, the dependency map entity may be a company that hosts a dependency map for the software applications used in the company's enterprise-wide software environment. Such a dependency map would likely include software from many different software vendors.

Figure 5:
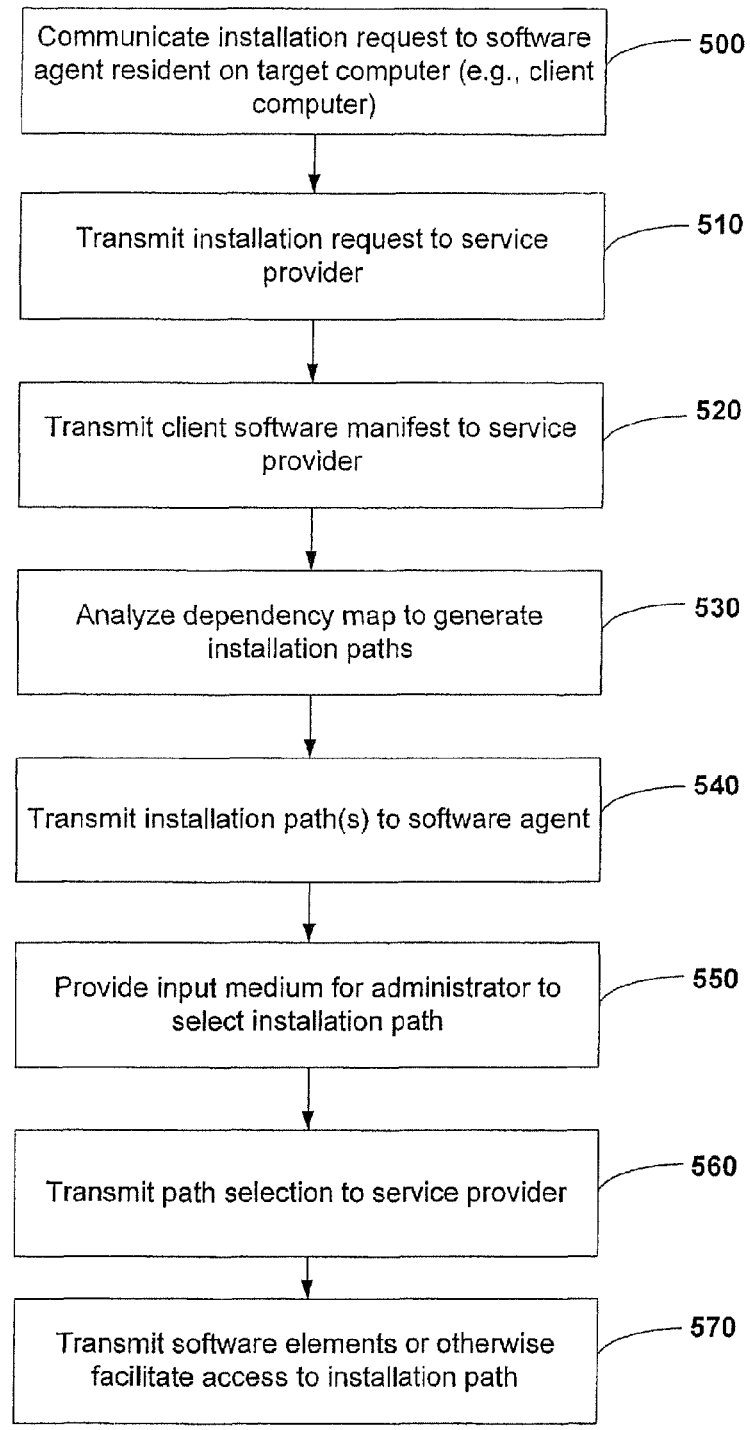
FIG. 5 is a flow diagram of aspects of a particular method of performing a software installation.

FIG. 5 is a flow diagram of aspects of a particular method of performing a software installation. Referring to FIGS. 4 and 5, when a system administrator responsible for maintaining a client computing system wishes to install a software application with certain requirements, the request is communicated to the software agent 450 installed on the client computing system (operation 500). An example of an installation request may set out installation parameters: a) install Apache 5.5; b) use the securest version possible; c) run on Sun Microsystems™ Solaris™ 9.1 operating system. The software agent installed on the client communicates the request to the service provider 420 (operation 510).

The software agent also communicates, either as part of the installation request or separately, the client's software manifest to the service provider (operation 520). A client software manifest is a listing of some and likely all the software applications installed on the client as well as the individual files that comprise each application. It is also possible to provide an arrangement where the software manifest is transmitted to the service provider whenever there is a software change, allowing the service provider to maintain a current client manifest. Further, the manifest may be maintained at the software agent 450, with the service provider 420 accessing the manifest as part of the installation path determination (see discussion of operation 530 below).

With knowledge of the client manifest, the dependency map 400 is analyzed to generate one or more installation paths commensurate with the installation request (operation 530). The installation paths are then communicated, to the software agent 450 (operation 540). Once each installation path is received by the software agent 450, the system administrator may review each path and determine which installation path to use or the system may be configured to automatically install the new software using one of the paths (operation 550). Next, the selected dependency route is communicated, via the software agent 450, back to the service provider 420 (operation 560). Lastly, in an implementation where the service provider hosts the software files, the service provider streams the files to the client based on the chosen installation path (operation 570). It is also possible that the client system will have the files needed for the software application resident on the files system. In such an arrangement, the software agent is configured to receive the dependency route and manage the installation of the file already resident on the client system. It is also possible for the software agent 450 to obtain files identified by the installation through various other possible mediums.

Two features of a conventional software package based installation that a dependency map driven installation may eliminate are pre-installation and post-installation scripts. As previously discussed with reference to FIG. 1, pre-installation scripts describe what needs to be validated prior to the installation of a software application. Post-installation scripts, on the other hand, describe what needs to occur after installation of the software application. When using conventional package-based installation methods, the pre-installation and post-installation scripts are separate entities from the pre-determined group of packages. Yet, the scripts are generated at the time of software development, resulting in generic requirements without knowledge of the unique computing system configurations the software will eventually be installed. In stark contrast, when performing an installation using a dependency map, the collection of required of software files is generated at the time of the installation as a function of current computing system features, rendering pre-created installation scripts unnecessary. Eliminating the necessity of pre- and post-installation scripts also illuminates one advantage of certain configurations falling within aspects of the present invention. Namely, removing the constraints of the installation scripts, along with other features of various implementations set forth herein, facilitates file-level customized installation of a software application.

Aspects of the present invention may further involve integrating pre- and post-conditions or requirements of an installation into each software element as additional attributes. Conventional pre-installation and post-installation scripts are created for and bound to a specific conventional software package. Each script describes conditions or requirements of both the entirety of a given package as well as the files in the package. As such, these scripts are package-centric (i.e., they describe conditions for the entirety of the package.) To circumvent the problem with package-centric scripts, the pre- and post-condition attributes of each software element are specific to each particular element. Pre- and post-installation attributes are extracted from the original installation scripts 140 and 150 as described with respect to FIG. 1. The service provider is able to analyze each condition from the original installation scripts and create an attribute to a software element any time the original script references the file represented by the attribute. For example, if the original installation script states that file A has a stated dependency on file B, the service provider would add this requirement, as an attribute, into the software element representing file A. Therefore, the software element representing file would have an attribute stating that it is dependent upon element B.

The pre- and post-condition attributes of software elements may be described as being compartmentalized as opposed to the conventional package-centric scripts. For example, an attribute of software element A may state a dependency on element B. This dependency is confined to software element A, allowing the attribute to be element-centric. Whereas, conventional pre- and post-installation scripts have a one to many relationship between all files in the package with no compartmentalization. Hence, in a conventional packaging script, the dependency from A to B is always defined even if element A is not needed in the installation. Whereas, the dependency attribute of A is only declared if A is included in the dependency route being installed. As a result, only the pre- and post-conditions defined by elements in the dependency route are needed, as opposed to every condition being defined in the convention scripting approach.

After the service provider builds the list of all software elements required for an installation, the pre- and post-conditions built into each software element can be summarized to create a type of hybrid pre-installation and post-installation script containing a mere subset of all the conditions from the original pre- and post-installation scripts. This technique differs from conventional installation scripts through its ability for creation after the dependency route is defined. Hence, the scripts are customized specifically for the installation and the current configuration existing on the client system. Such a technique offers a flexible way of managing the pre- and post-installation scripting as the implicit ordering of the software elements based on dependencies matches the exact order of execution required by the pre- and post-conditions built into each software element.

III. Software Dependency Maps

As already discussed at some length, aspects of the present invention involve the generation and use of a software dependency map with element level dependencies, amongst other things, to facilitate the installation of new software. Further aspects of the present invention involve the removal of software packaging from software installations, allowing for software to be represented at the individual file or software element level of granularity. The constantly changing nature and intricacies of file level dependencies makes manual monitoring and use in installation by a system administrator exceedingly difficult if not impossible. Hence, a service provider hosts the information needed (i.e., knowledge base) to install and organize software at the element level. As introduced above, the collection of software elements and their dependencies is referred to herein as a software dependency map. The size and arrangement of the map is a function of the number of software applications mapped and the number of files and dependencies within each mapped application. Accordingly, a dependency map may represent any number of operating systems and software applications encompassing literally millions of individual software elements. Moreover, the map is constantly changing as installation information arrives from software agents residing at various client locations as well as new software and/or operating systems are unpackaged and added to the map.

Figure 6:
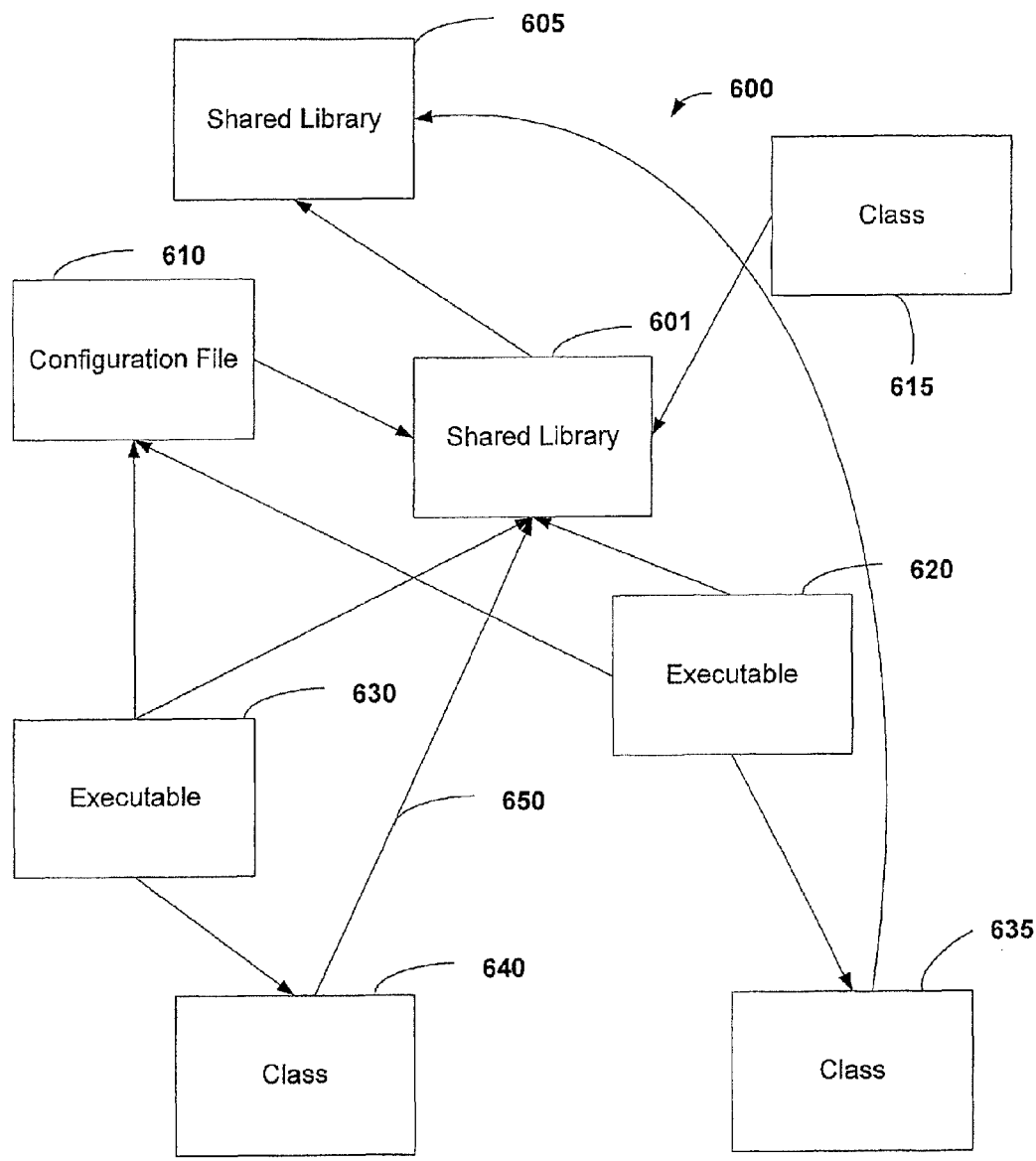
FIG. 6 is a block diagram illustrating a portion of a software dependency map.

FIG. 6 is a block diagram illustrating a portion of a software dependency map. The lowest level of granularity in this map 600 is a software element (605, 610, 615, etc.). A software element is a representation of an individual file, such as a configuration file, an executable file or a library file. The software element includes one or more attributes, one of which may be a pointer to the physical location of the file it represents. In one embodiment, this attribute may point to a memory address within a software warehouse (described further in Section IV). Every software element has some dependency on another element; otherwise, the element would not be needed as nothing else depends on it being present. Accordingly, in another embodiment an additional attribute of a software element is a dependency attribute identifying dependencies associated with the software element. FIG. 6 comprises a plurality of software elements each of which has at least one dependency (illustrated by arrows 650) (e.g., between the blocks) on another software element. Each software element, depicted by a block, represents a type of file. In this example, configuration files, executables files, shared library files and class files are shown. Within FIG. 6, shared library file 601 is dependent upon shared library file 605, configuration file 610 depends upon shared library file 601, executable file 630 depends upon configuration file 610, and so on.

In an example from FIG. 6, class file 640 is dependent on shared library file 601. The actual dependency may be that within class file 640, function "GetDependencyMap" may be called. The location of this function exists in shared library file 601. Therefore, if class file 640 did not have a dependency on shared library file 601, class file 640 would be unable to call function "GetDependencyMap". In another example, executable file 630 depends upon configuration file 610. Configuration file 610 may declare "TimeOutCounter" with a value of 50 milliseconds. During execution of executable file 630, the value of "TimeOutCounter" is used to determine how long to wait before ending execution if no response is received from another executable file. If configuration file 610 were not present, executable file 630 would be unable to execute properly since no value would be presented as to when to end execution.

Figure 7:
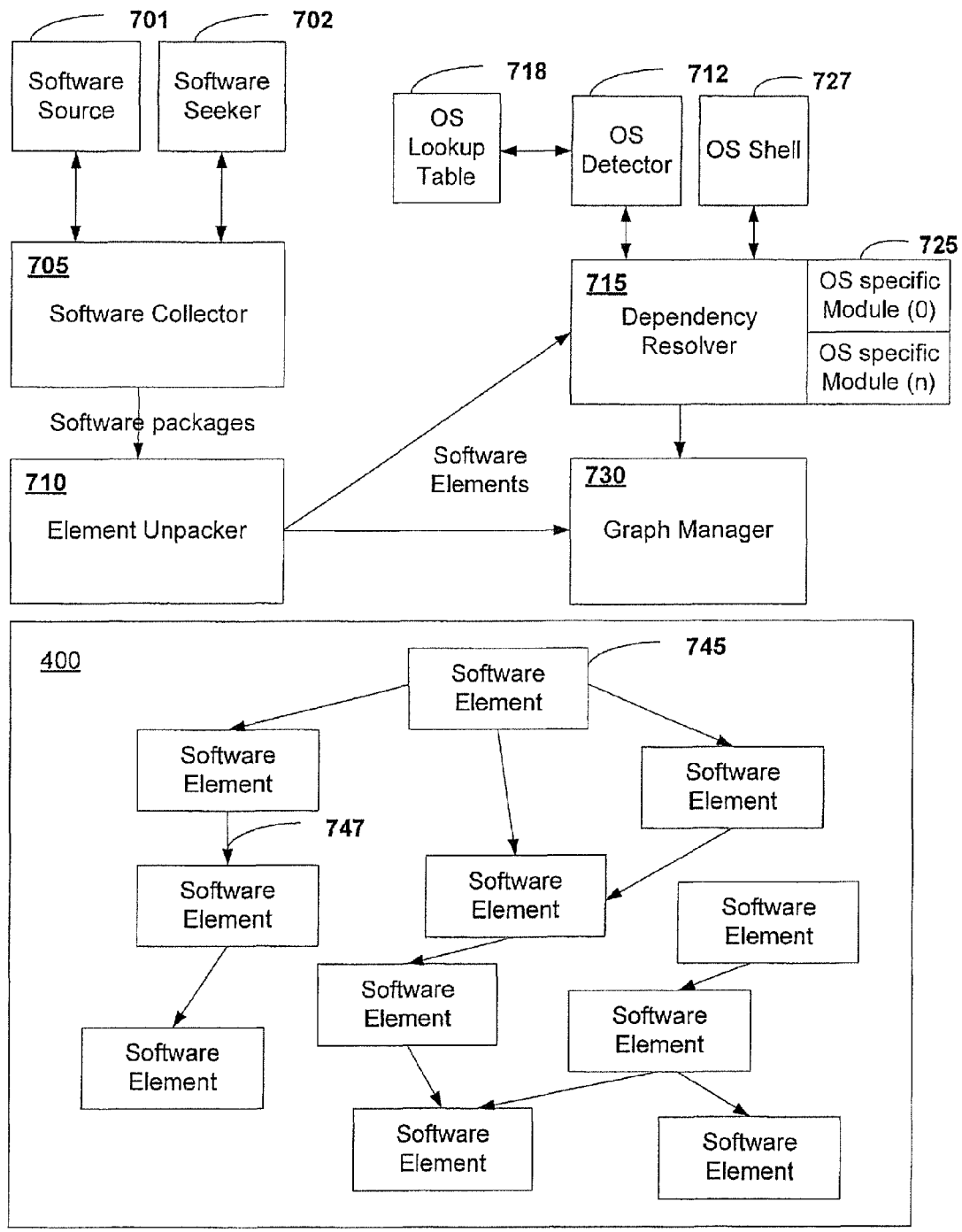
FIG. 7 is a block diagram illustrating dependency map generator modules that are involved in building and/or refreshing a software dependency map.
Figure 8:
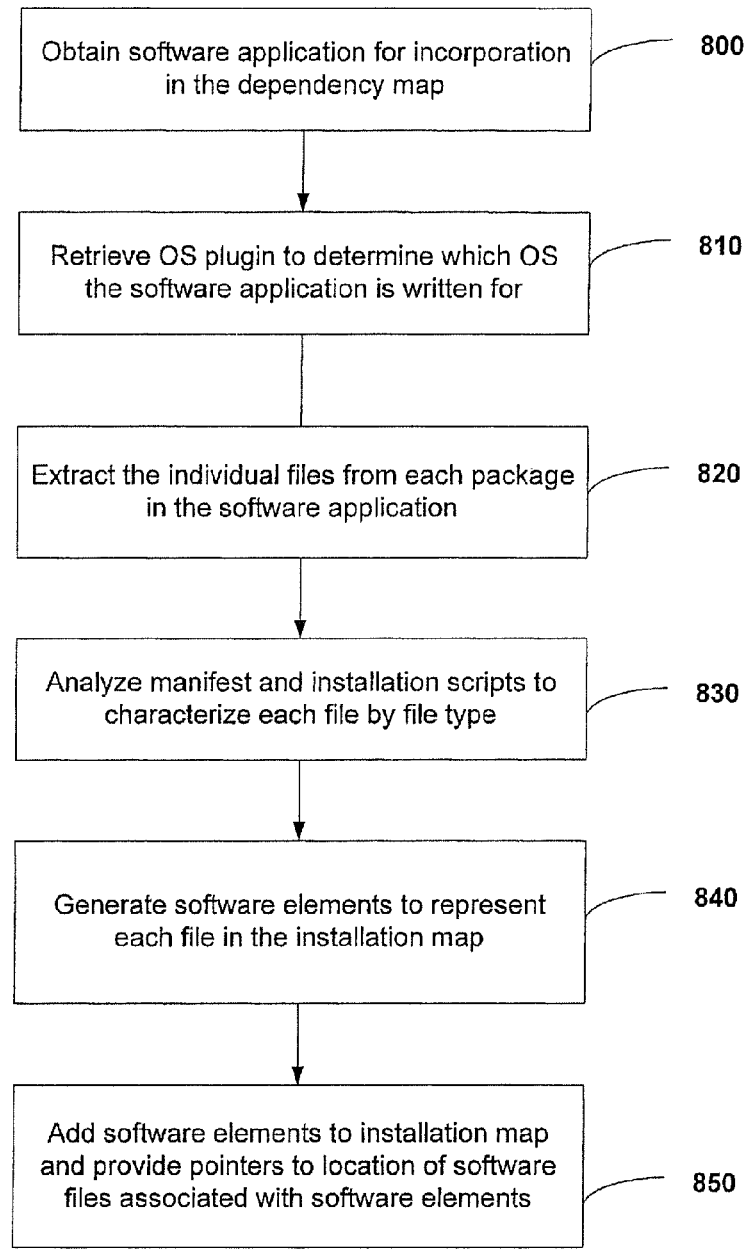
FIG. 8 is a flow diagram illustrating aspects of one particular method of generating a dependency map.

FIG. 7 is a block diagram illustrating various dependency map generator modules involved in building and/or refreshing a software dependency map 400. In concurrence with FIG. 7, FIG. 8 is a flow diagram illustrating the operations involved in converting a package-based software application into a collection of software elements and generating a dependency map. The method of FIG. 8 is discussed with reference to the dependency map generator module of FIG. 7; however, other processing configurations may be implemented to perform the operations set out in FIG. 8.

Particularly referring to FIG. 7, a software collector 705 is configured to collect software applications that will be unpacked and added to the dependency map 400 (operation 800). In one embodiment, the software collector 705 interacts with sources of software 701, such as vendor websites or other software repositories. In another embodiment, the software collector 705 may receive destinations for software applications through the assistance of one or more software seekers 702. Generally speaking, a software seeker 702 is a module configured to search the Internet for software applications and additional information useful for downloading applications. In one configuration, a software seeker is instructed to locate a particular software application. Once the particular software application is located by the software seeker, the destination is relayed to the software collector 705. The software seeker may also include additional information on downloading the software such as an FTP or http user name and password that may be required to download the software. With the provided information from the software seeker 702, the software collector 705 downloads the software application from the software source 701.

Once a software application has been retrieved by the software collector 705, it is forwarded to an element unpacker 710. The element unpacker 710 has two primary responsibilities. First, the element unpacker 710 determines which operating system (hereafter "OS") the application has been written for. With the exception of interpretive languages, software applications are written for a specific OS. Hence, the process of extracting or unpacking software elements from an application involves knowledge of which OS the application is written for. Secondly, the element unpacker 710 unpacks the software application from the package level to the file level. As previously described above, conventional software applications have one or more functional groupings or "collections" of files known as packages. Unpacking a software package involves a process of extracting the individual files from each package.

Referring now to the OS determination, the element unpacker 710 determines which OS the software is written for. This determination is made through the assistance of an OS Detector 712 which analyzes the software to determine which OS it has been written for (operation 810). In one embodiment, the OS detector 712 determines which OS the software is written for through the assistance of an OS lookup table 718. The lookup table 718 lists the different types of software packaging formats that exist and cross-references each type to its appropriate OS class type. The OS detector is able submit the type of software packaging format to the lookup table and determine which OS class the packaging format corresponds too. Next, the OS detector 712 uses the OS class type to analyze one or more binaries of the software application to assess which architecture the binary is targeted for (e.g., x86, Sparc, PowerPC, etc). In many situations, this level of detection is sufficient to determine the OS of the software application. If further analysis is required, the OS detector 712 can implement additional tools to review the package manifest of the software application to determine which OS the software is targeted for. Once the correct OS has been determined, the element unpacker 710 may begin extracting the file from the software application's packages.

In order for the element unpacker 710 to extract the files from a software application, it also receives assistance from an OS specific module 725. An OS specific module 725 or plugin exists for each OS in which software is written for within the dependency map 400. Once the OS detector 712 determines which OS the software application is written for, the appropriate OS plugin 725 is called to assist the element unpacker 710 with extracting the files from each package in the software application (operation 820). The element unpacker 710 uses unpacking commands specific to the OS that the software is targeted for. For example, if the software application is targeted for UNIX, the element unpacker 710 may use tar, or gzip to unpack the files from the package. If the application is targeted for Microsoft™ Windows™, the element unpacker 710 may use unzip or rar to extract the files from the package.

Once all the files have been extracted, the element unpacker 710 analyzes the software manifest and the installation scripts for the software application to characterize each file by its file type (e.g., executable file, configuration file, library file, etc.) (operation 830). In one embodiment, a file type lookup table is used to map each file type suffix (e.g. exe, dll, etc.) to the file type that the suffix corresponds too. For example, if a file has a "dll" suffix, the lookup table would return shared library as its file type. In another embodiment, many operating systems provide commands to analyze a file for its file type. For example, Solaris has a "file" OS command that will reveal the file type of a file.

Lastly, the files extracted from the packages are forwarded to a graph manager 730. The graph manager 730 is responsible for creating a software element 745 and adding it to the dependency map 400 (operation 840). As previously stated, a software element includes an attribute that has a pointer to the physical location of the file the element represents. As software elements 745 are placed into the dependency map 400, the graph manager 730 creates a pointer to the physical location of the file it represents (operation 850). As stated above, the pointer is stored as an attribute of each software element. In one embodiment, each file is stored in a software warehouse or database. Hence, the software element's pointer would point to the location within the software warehouse that hosts the actual file. Therefore, when the actual file is needed, the pointer will direct the dependency map 400 to the location of the physical file. Further, the graph manager 730 allows for each software element 745 to have additional attributes associated with it. The details of such attributes are discussed throughout this application.

As software elements 745 are added to the dependency map 400, their status is temporary in that the elements are inaccessible by other modules of the service provider. It is not until dependencies 747 are created between these software elements 745, that their status is changed to operational allowing the elements to become available for dependency routes. Once the software elements 745 have been created and placed into the dependency map 400, a copy of each element 745 is relayed to the dependency resolver 715 for analysis of the element's dependencies 747. Through the assistance of the appropriate OS plugin 725, the dependency resolver 715 launches an OS shell 727. An OS shell is a minimal instance of an OS which is able to perform a minimal set of instructions specific to the OS. The dependency resolver 715 is able to analyze each software element 745 within the OS shell to determine the dependencies with other software elements 745. The process for determining each dependency will be further described below. Once each dependency 747 is determined, the dependency resolver 715 passes this information to the graph manager 730 to add to the dependency map 400.

Figure 9:
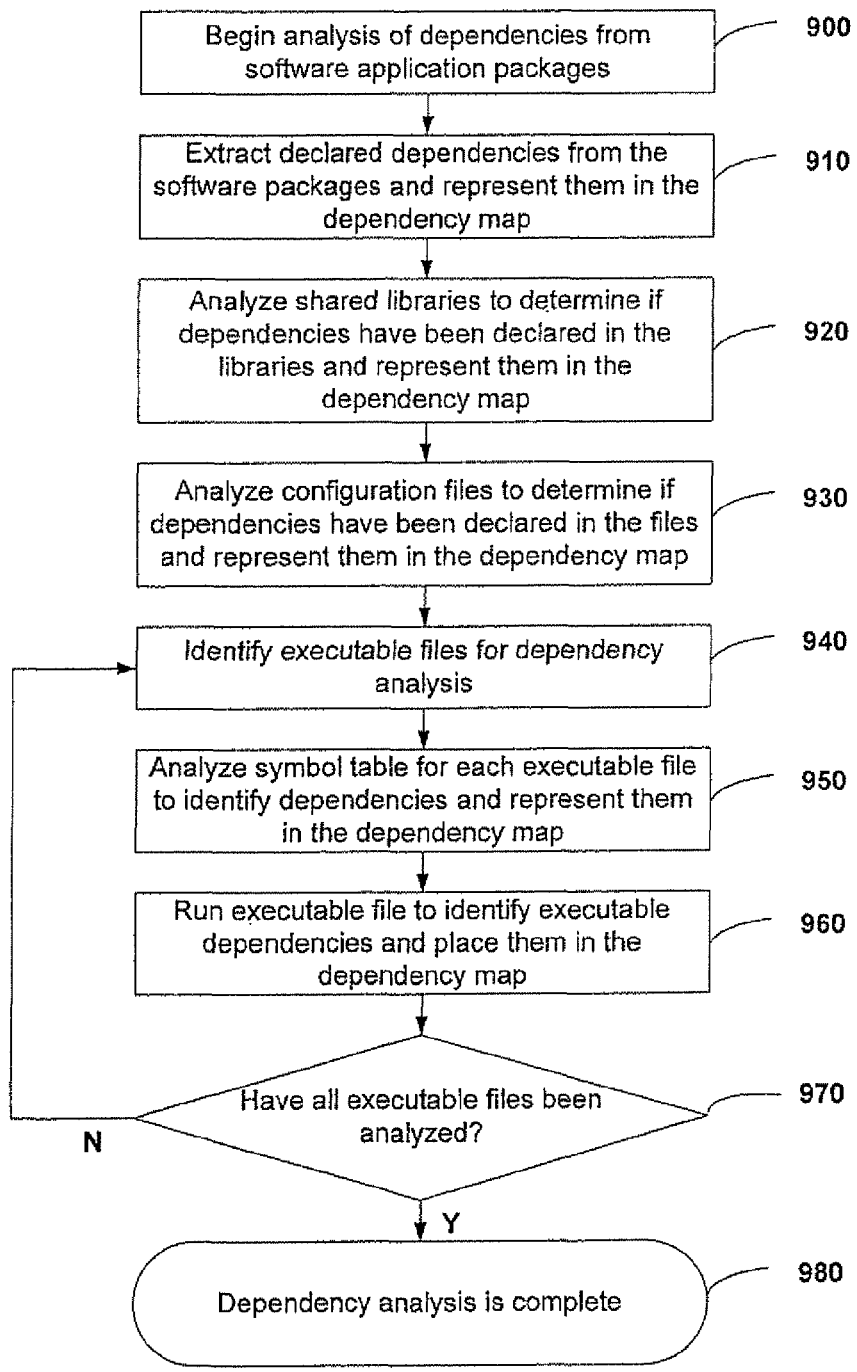
FIG. 9 is a flow diagram illustrating one particular method of generating a dependency map.

FIG. 9 is a flow diagram illustrating the operations for identifying dependencies between the software elements, and the new element placed in the map as described in FIG. 8. Upon completion of adding software elements to the dependency map and placing them in a temporary status, the analysis of dependencies 747 between each software element 745 begins (operation 900). In many circumstances, each package in a software application will already include a number of declared dependencies. These declared dependencies are often located in item 120 from FIG. 1. Based on this knowledge, many of the dependencies between individual files can be extracted from the package and represented in the dependency map 400 (operation 910). In one embodiment, the specific OS the software is targeted for includes packaging tools that may be utilized to extract the dependencies between software elements. Next, the shared libraries from within the software application are analyzed to ascertain inter-library dependencies (operation 920). Each shared library often defines dependencies to other shared libraries. Upon identification of a shared library, these dependencies are represented in the dependency map 400. After shared libraries are analyzed for defined dependencies, configuration files are analyzed to identify declared dependencies. Configuration files within a software application may also declare dependencies between files are identified and represented in the dependency map 400 (operation 930). Next, all the executable files from within a software application are analyzed to identify dependencies (operation 940). Typically, each executable file contains a symbol table. Analysis of these symbol tables may identify dependencies that exist between the executable file and other file types within the software application (operation 950). An OS typically has commands that are able to analyze executable symbol tables. For example, UNIX uses a command called "nm" to analyze symbol tables. Finally, simulated execution of executable files is possible. Upon execution of an executable file, the initial execution cycles are analyzed to assess what files are loaded or referenced during execution (operation 960). Any files that are loaded or referenced during the initial execution cycles are identified as dependencies on the executable file. These dependencies can then be represented in the dependency map. Recursive use of some or all operations 940-960 may continue (operation 970) until all the executable files have been analyzed. Once all the executable files have been analyzed, the dependency analysis is complete (operation 980) and the newly added software elements are changed to an operational status.

Figure 10:
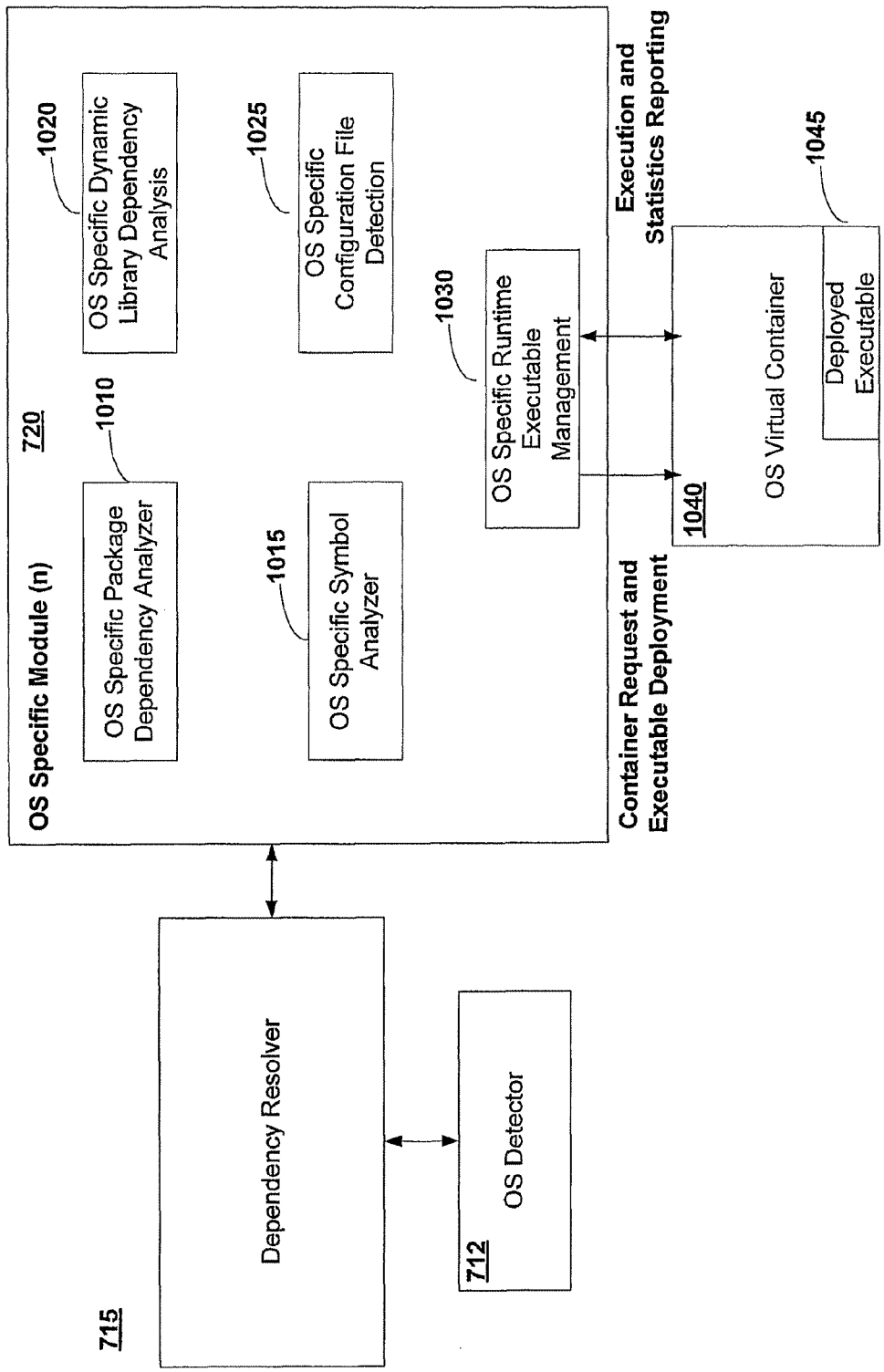
FIG. 10 is a block diagram illustrating an OS specific module as well as additional modules involved in resolving dependencies between software elements.

FIG. 10 is a block diagram that illustrates an OS specific module as well as additional modules used to resolve dependencies between software elements recently added to the dependency map. As stated above in regards to FIG. 7, the dependency resolver 715 identifies the dependencies for each software element. In order to accomplish this, the dependency resolver 715 is expected to know which OS each file, represented by a software element, is written for. In one embodiment, the OS detector module 712 described in FIGS. 7 and 8 is in communication with the dependency resolver 715. The OS detector 712 analyzes a file and determines which OS it is written for and passes this information to the dependency resolver 715. One or more OS specific modules (also referred to as "plugins") are coupled to the dependency resolver 715 with each plugin representing a different OS. Through the assistance of the appropriate OS plugin 725, the dependency resolver 715 launches an OS shell 727. As stated above in regards to FIGS. 7 and 8, an OS shell is a minimal instance of an OS which is able to perform a minimal set of instructions specific to the OS. The dependency resolver 715 is able place each file in the OS shell 727 and analyze the file to identify its dependencies.

In one embodiment, the dependency resolver is able to identify the dependencies of a file through the assistance of the appropriate OS plugin 725. Each OS plugin has a plurality of individual sub-modules 1010-1030. The OS specific package dependency analyzer module 1010 performs the functions described above in regards to operation 900 from FIG. 9. Whereas, sub-modules 1020-1030 are responsible for analyzing each type of software file. Therefore, depending on what type of file is placed into the OS shell, one of these sub-modules are called to identify the dependencies. For example, if the received software element is a shared library, the OS specific dynamic library dependency analysis module 1020 is called by the OS plugin 725. This sub-module analyzes the shared library file and determines what dependencies exist between the shared library file and any other files. This is accomplished by checking each line of code within the shared library file to identify code that declares a dependency. If the software element being received is a configuration file, an OS specific configuration file detection module 1025 is called by the OS plugin 725. This sub-module analyzes the configuration file line by line to identify code that declares a dependency. If the received software element is an executable file, two separate sub-modules are accessed. First, an OS specific symbol analyzer module 1015 is called by the OS plugin 725. This sub-module accesses the symbol table of the executable file and checks each line of code to identify code that declares any dependencies. Next, an OS specific runtime executable management module 1030 is called by the OS plugin 725. This sub-module actually launches an OS virtual container 1040.

A virtual OS container is a virtualized instance of an OS running with a minimal set of functionality sufficient to execute an executable binary file and analyze its run-time path. In one embodiment, multiple virtual operating systems may run on a single hardware platform. Once the virtual OS container 1040 is launched, sub-module 1030 places the executable 1045 into the OS container 1040 along with any known dependencies of the executable. The executable 1045 is executed with the runtime execution being monitored to assess for any missing configuration files that are needed by the executable. These additional configuration files are then declared as dependencies to the executable. Any additional dependencies that were declared in the runtime execution path are then returned to the OS specific runtime executable management module 1030.

The previous section discussed the ability to identify dependencies from executable files using sub-modules with each OS specific module. This approach works effectively when identification of the dependencies occurs for software elements that are part of a software application. However, this approach is less effective when trying to identify dependencies in an actual operating system. In the core files comprising an OS, the dependencies are so tight, that dependency identification should be fully analyzed as an entirety of the files and not sequentially. In order to accomplish such analysis of an entire OS, a full version of the OS is loaded (also known as "provisioned") and its file-level dependencies are validated.

The complete system dependency validation is an asynchronous scheduled act from the actual dependency discovery. Complete system dependency validation does not define dependencies (which is accomplished by the dependency resolver) but rather validates the identified dependencies. Dependencies may nonetheless be redefined during the validation procedure, such as when an invalid dependency is identified. One method for validating dependencies is through the use of a processes referred to as Bare Metal Provisioning. In this process, the complete OS defined in the dependency map is collected into an optical disc image (hereinafter "ISO") format and provisioned onto dedicated hardware that the OS architecture is targeted for. For example, in analyzing the dependencies of Solaris 9.1, the entirety of the OS may be provisioned on a Sun Microsystems Sparc™ Station. Once provisioning is complete, a set of system tests are performed that have been prebuilt as part of the OS. These tests, common to a particular OS, may be run to exercise the basic input/output system of the OS to ensure it is working within expected parameters. In order to include these tests in the Bare Metal Provision, the files needed to execute these tests are included.

A first test includes file system checking such as reading and writing files to the OS This in turn exercises the kernel of the OS since basic I/O processing is written as part of the kernel. A second test includes system error log scraping to ensure that the running OS is operating within normal parameters. In one embodiment, this is performed by a log watcher. Since operating systems classify errors in their system logs based on severity, the log watcher looks for errors with a severity greatest than a predetermined threshold severity level. If an error is flagged with a severity above the threshold, the error is captured for further analysis.

A third test includes deployment of a common software application (e.g., a web server) to see if the operating system runs the application within the specified parameters. Each deployed application and test environment may have its own testing parameters and expected results. However, the general approach is to verify that the deployed software application runs successfully (i.e., all dependencies are in place and accounted for). For example, if the deployed application were a web server, the test would verify that the core web server daemon is running and that any errors returned by application specific error logs are below a threshold severity level. Upon successful completion of the system tests described above, the OS as a whole is given a first level assertion of correctness for the dependencies through the OS.

In one embodiment, the dependency resolver analyzes the software files extracted from a package to identify the dependencies between each file. As previously stated, dependencies are not necessarily absolute. Installing a software application "with the most stable version" may require element A be dependent on element B. Whereas installing the same software "with the newest version" may show that element A is not dependent on element B. Hence, in this example the dependency between element A and B is not absolute, bur rather installation specific. In another example, a dependency may be declared within the conventional package of the software application itself, yet not found to exist by the dependency resolver. To handle this situation, a confidence factor or weighting is placed on the dependency such that the dependency still exists, but may likely have a low confidence factor attached to it. This confidence factor becomes an attribute of the dependency.

A confidence factor attached to a dependency can increase each time the dependency resolver reanalyzes that the dependency is in fact real. On the opposite end, the confidence factor can decrease if the dependency resolver reanalyzes the dependency and finds that it is not required or if an additional software element was preferred. This allows the dependency map to reflect the confidence based on computational analysis of the independent software element. The output is a complex software map that reflects the true dependencies and relative confidence of the dependencies for the software applications that are being mapped.

Another aspect of the present invention involves dependency map overlays. In one particular implementation, there are three types of overlays placed on the dependency map: software boundary overlays, dependency route overlays and route calculation overlays. The first type of overlay is described in the next paragraph, wherein the last two types of overlays are described in Section IV. Generally speaking, an overlay is a subset of software elements and their dependencies that are overlaid on top of the primary dependency map, where the subset of software elements have some overarching feature in common, such as originating from a common software application or belonging to a common dependency route.

The first type of dependency map overlay is a software boundary overlay, which is a virtual boundary placed around a collection of software elements that make up the entirety of a software application and groups them into a form understandable by a human. One embodiment for creating a software boundary overlay is performed by analyzing the package manifest 130 of the software application to identify a list of files for the application. Then each software element (from the dependency map) that represents the files from the manifest are collected together to create the boundary overlay. Other elements with dependencies, not necessarily identified in the manifest may also be included. In one embodiment, the software elements that make up a software boundary overlay may change over time if additional software elements are added or removed from the application. Such an approach is a replacement for convention software packaging where one or more packages comprise the pieces for a software application. It is possible for a software boundary overlay to include software elements that are not all related through dependencies, but instead are collected together to form a human understandable software application. An example of a software boundary overlay would be an application such as Apache 5.5.

FIG. 11 is a diagram illustrating an example of a dependency map with a software boundary overlay. FIG. 11 shows a plurality of software elements 1120 that comprise an example of a dependency map 1100. The bounds of the dependency map 1100 are shown by the dashed line surrounding the software elements 1120. Each software element 1120 has at least one dependency 1130 upon another software element 1120. The dependencies 1130 are shown as straight lines that connect two software elements 1120. In this embodiment, there are no software elements 1120 within confines of the boundary 1110 that depend upon a software element 1120 outside the boundary 1110. This example illustrates a single software boundary overlay 1110. However, a dependency map 1100 may comprise a plurality of software boundary overlays, each representing different possible overlays.

Figure 12:
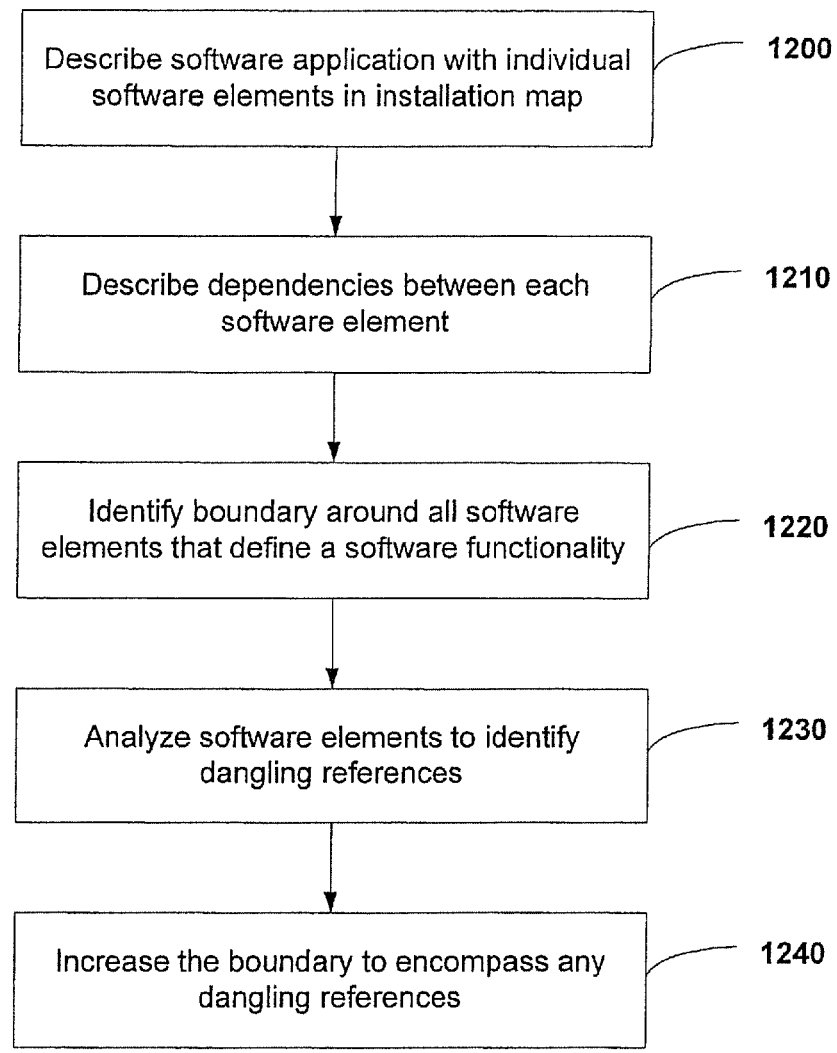
FIG. 12 is a flow diagram illustrating aspects of one particular method of creating a software boundary overlay in a dependency map.

FIG. 12 is a flow diagram illustrating various operations involved in creating a software boundary overlay in a dependency map. In one particular implementation, to begin creating a software boundary overlay, the package manifests 130 of the software application are analyzed and each software element is extracted from its package and placed onto the dependency map (operation 1200). The methods used for these processes are described above with respect to FIG. 8. Once all the software elements are placed into the dependency map, the dependencies between all of the software elements are determined and placed onto the dependency map (operation 1210). The methods used for these processes are described above with respect to FIG. 9 and otherwise. Next, a boundary is drawn around all of the software elements derived from the unpacking of the software application (operation 1220). This creates the initial bounds of the software application. The software elements and their dependencies are then analyzed by the graph manager 730 to identify dangling references (operation 1230). In one embodiment, a dangling reference is a reference that is outside the scope of a software boundary or of a dependency that is not yet defined if the corresponding element is not loaded into the dependency graph. For example, if a software element within the bounds of the software boundary overlay shows a dependency on a software element outside the bounds of the overlay, this would be a dangling reference. If a dangling reference is found such that the software element referenced is outside the bounds of the boundary, the boundary is increased to encompass the new software element (operation 1240). Moreover, attributes of the software element are updated to identify the newly added dependency. Hence, the software boundary overlay is increased in size to include this new software element. This process continues until each dangling reference is resolved. Hence, a software boundary overlay will continue to expand until there are no further dangling references.

In one embodiment, a software boundary overlay should not comprise any software elements from any other declared software boundary overlays. For example, software elements should not be included in two separate software boundaries. Such a rule prevents software boundaries from encroaching on each other and keeps them inherently distinct. The end result is that a software boundary declares the manifest of a software application that the dependency map supports. The dependency map itself understands explicitly all of the dependencies within the software package and all of the detailed inter dependencies between software packages. But this level of detail does not need to be known by a system administrator.

Aspects of the present invention are also able to address another concern with conventional software applications; namely, accounting for patches and minor revision releases in the installation process. It is known in the art that software applications change over time. Due to the release of bug fixes or patches, a software application's version is constantly in flux. As patches are released, dependencies between software elements may change. Under such circumstances, a software dependency between element A and B may exist in the initial release of a software application. However, once a patch is applied, the dependency between A and B may no longer exist. The software dependency map is configured to track software dependency changes over time, in one particular implementation. For example, assume element B provides certain functionality in version 1 of an application, with an element A depending upon B. When version 1.1 is released, the functionality of B is replaced with new software element C. At this point, the dependency between A and B is removed and a new dependency between A and C is created.

A common request from a customer is that they wish to install the most "stable" version of a software application. This request can be version related, as the current version of an application may not be the most stable version. In one embodiment, in order to install the most stable version of a software application, the root software application is installed first, followed by a potential list of updates, service packs, patches and point releases to get the software to the configuration requested by the customer. The root software elements of a software application do not depend on any other software elements, only other software elements depend on them. These root elements tend to remain constant, no matter which version or configuration of the application is installed In order to map any minor versions of a software application, the dependency map includes each minor version, patch or bug fix of the major software application. Hence, after the root elements are installed, each software element in each minor version would be mapped, with dependencies, to each root software element in the major versions.

Once all the dependencies of each version of a software application are mapped, the need for mapping dependencies over time becomes important. In one embodiment, when a dependency is added into the dependency map, two timestamps are recorded as attributes to the dependency. Thus, a software element may have time stamp attributes. First, the timestamp associated with the file represented by the software element is recorded. Whenever an individual software file is created, a timestamp is added to the file. Therefore, a software developer will know when the file was actually created during development. Second, the software element includes a timestamp of when it was added into the dependency map. The timestamp information is stored in the dependency map using a timeline data construct. A timeline data construct describes a set of software elements that are all related when they were inserted into the dependency map. This is how the service provider knows that a group of software elements are from the same version and hence part of the same software boundary overlay. As each new software element and dependency are added to the dependency map, the timeline construct is also added. As a result of these timelines, when a customer wishes to install a specific version of a software application, these timelines are used to calculate the optimal installation by correlating the timestamp on the root install software with each of its assumed dependencies. In one embodiment, the timelines are assembled as fragments and as the route analyzer of the dependency map analyzes the map, it assembles the overall timeline of software that needs to be installed. The above is applicable if there are more than one version of a software application and each version has the same dependency resolution.

IV. Software Dependency Routes

The previous section discussed a first type of dependency map overlay referred to herein as a "software boundary overlay." This section describes a second type of dependency map overlay referred to herein as "a dependency route overlay." The dependency map is a vehicle for identifying and facilitating various possible software installations. Software elements and their dependencies from mapped software applications are set forth in the dependency map. A dependency route is one of many paths or ways of connecting a group of software elements based on specific installation needs. From another perspective, a dependency route is a list of software elements and the dependencies associated with the elements that get a customer from their current place in the dependency map (starting collection of software elements) to where they want to be (ending collection of software elements conforming to an installation goal). For example, installing Apache 5.5 on Solaris 9 would create a dependency route through the map connecting each software element needed to install Apache 5.5 on Solaris 9. The starting point might be all the software elements for Apache 5.0 on Solaris 9 (obtained from target computer) and the ending point is the collection of software elements for Apache 5.5 on Solaris 9. There may be software elements added, removed and consolidated along the path. Installing the most stable version of Apache on Solaris 9 would take a slightly different route through the map as it may involve Apache 5.5 or some other version. As such, the collection of software elements that comprise each installation may be different.

As with software boundary overlays, dependency routes are subsets of information contained within the dependency map. To restate, the dependency map is a collection of software elements and their dependencies that are placed in the map by the apparatuses and methods described in FIGS. 7-10 and elsewhere. Dependency routes are formed from a subset of all possible software elements to advance an installation goal. Moreover, dependency routes reflect customer installation choices, analysis of the installation success, and feedback to the map concerning the same. The installation feedback is captured in a confidence factor tied to a given dependency route.

Dependency routes do not exist automatically from the creation of the dependency map. Dependency routes are first defined when a specific installation is undertaken by a dependency route calculator. The routes are refined over time based on success and failure feedback based on the actual install. FIG. 13 is a block diagram illustrating an embodiment of the components involved in generating a dependency route. In the service provider arrangement set out in FIG. 13, there is both a customer environment and a service provider environment. In Section III above, the concept of a software installer or software management agent operating on the client environment was discussed. The software agent 1350 is a client-based service that manages communication with the service provider hosting the dependency map 1310.

Figure 14:
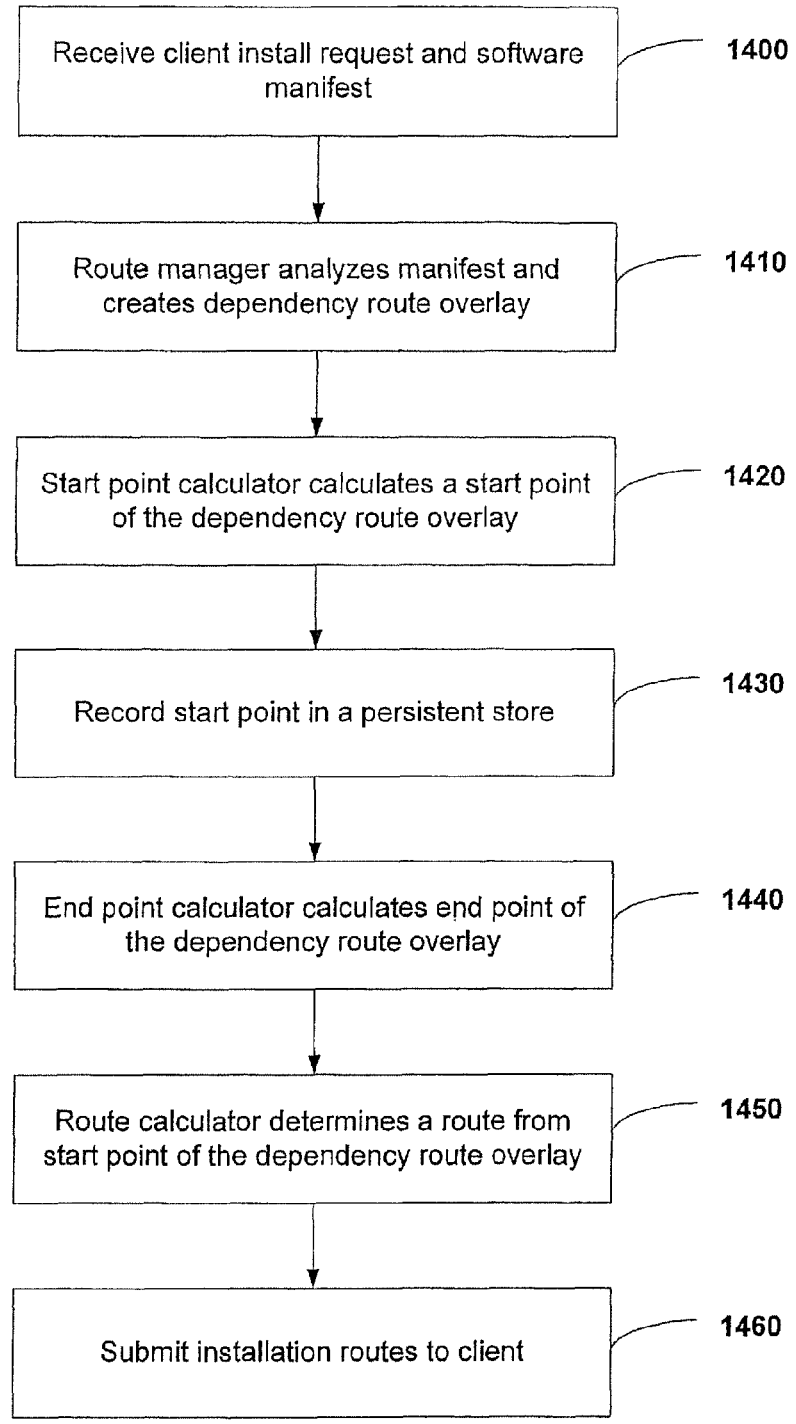
FIG. 14 is a flow diagram illustrating aspects of a method of generating a dependency route for installing, updating, or otherwise modifying an application or "installation" on a target computer or computers.

In concurrence with FIG. 13, FIG. 14 is a flow diagram illustrating the operations performed by the service provider to calculate a dependency route overlay for a client system or systems. First, the client relays software installation requests to the software agent 1350 (operation 1400). In an example, it may be the goal to install, on a client system, the fastest version of Apache 5.5 that runs on Solaris 9. Upon receiving the request, the software agent 1350 obtains the current software manifest for the client computing system (operation 1400). In other words, the software agent obtains a complete collection of all software applications and their configurations and provides the manifest to the service provider system. In one particular implementation, a software manifest monitor 1355, which is coupled to the software agent 1350, performs this function. The software manifest monitor 1355 monitors, whether periodically, intermittently or otherwise, changes to the client's software manifest. As changes are made to client's system the software manifest monitor 1355 records them. Hence, when a request for the client's software manifest is made by the software agent 1350, the software manifest monitor 1355 compiles the manifest and transmits it to the service provider, via the software agent 1350.

Once the software manifest and installation requested is received by the service provider (operation 1400), the route manager 1305 analyzes the client's software manifest and creates a dependency route overlay on the dependency map (operation 1410). A dependency route overlay 1320 is a structural overlay placed on the dependency map 1310, including each software element in the client's manifest. Hence, the installation overlay is initially a snapshot of the elements of each software application installed on the client's computing system. In order to carry out this service, the route manager 1305 begins with the first software element in the manifest and searches the dependency map 1310 for the same element. Once found, the element is flagged as the start of the dependency route overlay 1320. The route manager 1305 continues this process through each software element in the manifest until they are all flagged in the dependency map 1310 and placed into the dependency route overlay. Next, the route manager 1305 assesses the declared dependencies between each of the software elements in the manifest and recreates these dependencies in the dependency route overlay. Just as dependencies between elements are used to define a software boundary overlay 1315, dependencies between software elements in a dependency route overlay 1320 are also used to define the relationship of each element that comprises the manifest of the client's computing system. Lastly, the route manager 1305 defines a relationship (draws a line) between each software element in the client's manifest. The line will only connect between two elements by way of the dependency that connects them. Hence, the line will not connect between two software elements if there wasn't a dependency that already connected them.

Once the route manager 1305 completes the dependency route overlay over the dependency map 1310, a start point calculator 1325 determines the start point of the client's dependency route overlay (operation 1420). The start point is the current state of the client's software manifest before any additional changes are made to it. At this point, the current state (i.e., start point) of the client's environment is recorded in a persistent store 1330 (e.g., data warehouse) and time stamped for future reference (operation 1430). For example, the timestamp can be later used to intelligently back out of a future install, which is further described in Section VI. Next, an end point calculator 1335 is used to calculate an end point based on the client's install request (operation 1440). In one example, the state of the client system start point is known to run Apache 4.0 on Solaris 9.0. Whereas, the end point of the client's system would be the fastest version of Apache 5.5 running on Solaris 9.0. Therefore, the difference between the start point and the end point is a compilation of the software elements that must be added and removed to transform the client system from its current state of software elements (i.e., start point) to its new collection of software elements (i.e., end point.) The software elements used to get the client system from the start point to the end point is known as a route calculation overlay, which will be described below.

In one particular embodiment, each time the client wishes to add or remove software from their system, the start point is recalculated based on the current software manifest and not assumed from a previously stored start point located in the persistent store 1330. This is due to the possibility of software drift. Software drift occurs when the current state of a computer's manifest changes due to the manual removal of certain services or files on the computer. This usually occurs when a system administrator wishes to remove certain portions of code from an application or OS. For example, the client system may contain ksh, csh, tsh as part of its Unix OS scripting inventory. In order to reduce the chance that someone will use ksh, a system administrator may remove ksh from the OS. This change would not be known by the previous start point. Hence, the route manager 1305 and start point calculator 1325 conducts a new analysis of the client manifest and creates a new dependency route overlay 1320 and start point each time the client wishes to make a change to their system.

Once the start point and end point have been determined by the respective calculators, the overlays are passed to a route calculator 1340 that plots a complete route between the start and end point (operation 1450). In one embodiment, there are numerous routes that exist between the start point and end point. This is why confidence factors and weighting of dependencies are valuable. One function of the route calculator 1340 is to compute the total dependency confidence value across a route and declare its confidence factor. For example, there may be 23 possible routes between the start point and end point. Beginning with the first route, the route calculator will summarize the dependency confidence factors across each dependency in the route. The route calculator 1340 uses calculations to arrive at a summarized confidence factor of the entire route. In one embodiment, the dependency route confidence factor is determined by summarizing the confidence factor between each dependency and dividing it by the total number of dependencies.

A list of routes may then be presented to the client with the route having the highest level of calculated confidence being presented first (operation 1460). Lastly, the system administrator selects the route they wish to use. In another embodiment, the client system may be automatically configured to trust the route with the highest level of confidence and install the solution automatically.

FIG. 15 is a block diagram illustrating an example of a dependency route overlay. FIG. 15 shows a plurality of software elements 1530 that comprise an example of a dependency map 1500. The bounds of the dependency map 1500 are shown by the line encompassing the software elements 1530. Each software element 1530 has at least one dependency upon another software element. The dependencies 1520 are shown as straight lines that connect two software elements 1530. A dependency route overlay 1510 is also shown. In one example, the dependency route overlay 1510 is a path drawn around a plurality of software elements 1530 needed to bring a client computing system from its current state to the state it would be in after the requested installation. This example illustrates a single dependency route overlay 1510. However, a dependency map 1500 would likely comprise a plurality of dependency route overlays 1510, each representing different dependency routes for installing a software application.

In a particular implementation, automated installation policies may be put into place on a client computing system. Such policies give system administrators complete control over all installation options. On the other hand, installation policies can learn, over time, an administrator's preferences and desired level of manual interaction. One purpose of such installation policy is to allow for as much automation, regarding installation decisions, as possible.

Policy may be defined within each software application's dependency route and/or within each client system's software agent. In one example, each dependency route includes a statically defined policy. The policy may state that upon completion of the installation, perform an automatic reboot of the system. The policy definition may also comprise policy information about user preferences. For example, the policy may ask the user's permission to reboot, or proceed automatically. Over time, the default policy definitions attached to each dependency route may change. As dependency routes are installed, the software agent from each client returns success or failure information regarding the individual install of the software application. The dependency map may consider these statistics when determine policy definitions. For example, a policy definition may state that user permission is requested for each installation step. Over time, the installation success rate of this route may increase dramatically. As a result, the default policy definition of this route may change to "proceed automatically" instead of requesting user permission to continue. Such a change is the result of increased confidence in the installation success of the dependency route.

By implementing such an approach, the amount of manual involvement by system administrator may decrease. If a dependency route has a high confidence factor, due to the number of previously successful installs, the route may be configured with a policy to automatically implement the route which does not involve the administrator. On the other hand, if a dependency route has unsuccessful installations, a default policy that involves the administrator would decrease the likelihood that the install may fail. In one embodiment, a threshold confidence factor along with the number of installation attempts may be used to determine the level of automation within a route's installation policy. For example, a dependency route that has been installed 800 times with a confidence factor of 87% may have an installation policy with increased automation. Whereas, a dependency route that was installed 4 times with a confidence factor of 50% may have an installation policy with reduced automation.

The second place that user policy is defined is in the software agent of each client system. In one embodiment, the default policy stored in the software agent may override the default policy tied to a specific dependency route. In other embodiments, a combination of the dependency route policy and the software agent policy may be combined to arrive at a hybrid policy definition. For example, if a new dependency route without previous installation history is chosen, then the default policy of the dependency route may be combined with the default policy of the software agent. If the software agent's policy allows for automated installation in all cases, then the new route will be installed regardless of its confidence factor. In another example, a software agent's default policy may request administrative interaction regardless of the confidence factor of the chosen dependency route. Even if the chosen dependency route has 1500 installs with a confidence factor of 98%, the administrator would still be requested to interact during the installation.

When a client requests a software application to be installed on a system, optimization of the system prior to installation is another consideration. A client may request that Apache 5.5 be installed in one of many ways. Although the software boundary overlay of Apache 5.5 does not change, the dependency route plotted through this overlay may change depending of the installation choice made by the customer. For example, the system administrator may wish to install Apache 5.5 with a configuration including: 1) the least number of software elements required; 2) the least disk space needed; 3) the least errors reported; or 4) the latest security updates. Each one of the options or combination of options may result in a slightly different dependency route. In order to analyze and plot a dependency route, the route manager will also consider the current state of the client's system. As stated above, the client's software agent will upload the client's current software manifest to the route manager for analysis.

In one embodiment, it is possible that the current state of the client's computing system will require some changes in order to install the new application based on the preferences chosen by the system administrator. For example, the client's computing system may contain no software other than a fresh installation of the Solaris 9.0 OS. If the administrator wishes to install the most stable version of Apache web server, a number of changes or optimizations to the current client system may be required. For example, in order to install the most stable version of Apache, Solaris may need to be upgraded from version 9.0 to version 9.1 (release B). Such a change may be unacceptable to the administrator, as they may plan on installing an additional application that requires Solaris 9.0.

When a dependency route is being calculated by the route manager, as discussed in regards to FIG. 14, any required changes to the existing client's software configuration or versions will be provided to the system administrator. Assuming the changes are acceptable to the administrator, the software agent will apply these changes to the client's system before installation of the new software application begins. If the changes are not accepted, a different installation and/or preferences must be redefined such as installing the most stable version of Apache that works on Solaris 9.0.

In order to provide an accurate installation dependency route to a client, it may be necessary to provide multiple iterations of the route to the client. The reason for multiple iterations is due to the potential of the first route being incomplete or inaccurate. Hence, additional routes may be needed, with each iteration improving on the errors discovered in the previous route.

Figure 16:
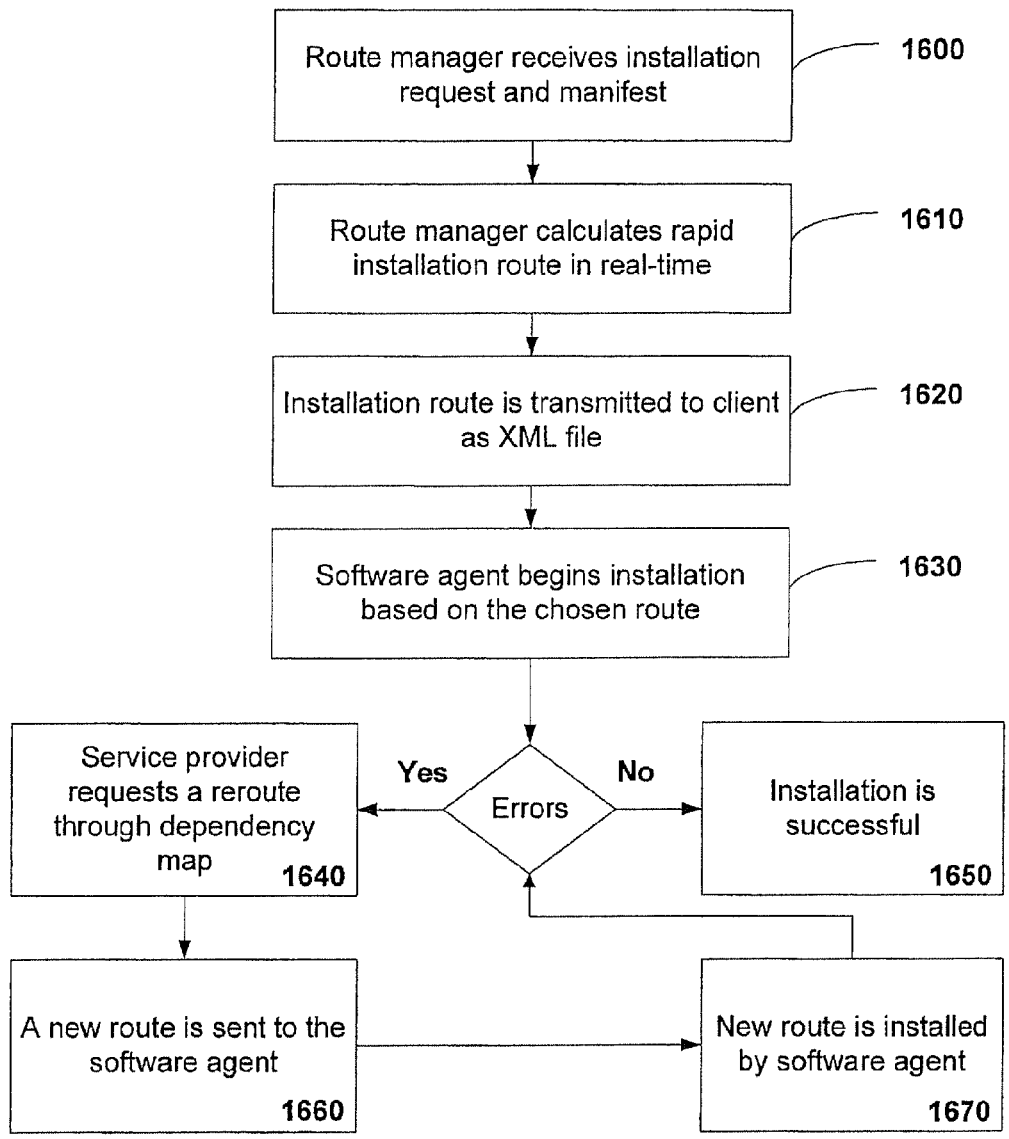
FIG. 16 is a flow diagram illustrating aspects of a method of generating a rapid dependency route for installing, updating, or otherwise modifying an application on a target computer or computers.

FIG. 16 is a flow diagram illustrating one method involved in presenting an accurate dependency route to a client computing system. As previously described, when the route manager receives an initial software installation request from a client device, the relevant portion of the client software manifest is also submitted to the route manager (operation 1600). In a particular implementation, less than the entire software manifest is sufficient for the route manager and other components to generate a dependency route. The software agent running on the client determines which portions of the software manifest are relevant to the installation request and only transmits those portions. Logic is built into the software agent that permits the agent to analyze the software manifest and the installation request and resolve which portions of the manifest are likely needed by the service provider in creating the dependency route based on the installation request. If the portion of the manifest sent is insufficient, additional portion may be transmitted as needed. Providing only a portion of the manifest reduces the amount of information being communicated to and analyzed by the route manager.

The route manager may next calculate a complete dependency. Alternatively, the route manager may calculate a rapid dependency route through the dependency map based on the software elements needed to complete the installation (operation 1610). A rapid dependency route describes the first route that is calculated based on a first pass through the dependency map. This route may not be relevant to any previous routes or may not take advantage of confidence factors, etc.; thus it may not be the most optimal route. However, the rapid dependency route is the easiest to calculate since it is based on absolute dependencies. In other words, the calculated route only includes dependencies between elements that will always exists, such that a confidence factor is ineffectual, as the dependencies are not optional.

In one embodiment, the dependency route is packaged as an XML file and transmitted to the software agent on the client (operation 1620). This initially transmitted dependency route is created in response to the client request, and provides the client with an immediate response to their installation request based on the portion of the software manifest transmitted by the software agent. In this first "rapid" iteration of the dependency route, the route manager is more concerned with providing an immediate response to the client than providing a completely accurate dependency route which takes more time. Such an approach provides real-time feedback to the system administrator, with accuracy refinement coming after the system administrator chooses a route. As mentioned above, it is possible to set forth an implementation that does not employ "rapid" dependency route calculation, but rather transmits a more complete route.

Once the system administrator approves the dependency route, the software agent on the client begins processing the dependency route (operation 1630). If there are no errors or problems with the dependency route, then the installation will complete successfully (operation 1650). However, it is possible that the partially provided software manifest is incomplete or not granular enough for complete determination of the dependency route. In such an instance, the route provided by the route manager may become invalid as the installation progresses. The software agent handles this issue by using a soft reference style connection to an element that does not exist in the current dependency route, but is known to exist. The software agent transparently initiates a web services request back to the service provider and requests a reroute through the dependency map (operation 1640) based on the declared soft reference. The route manager provides the reroute information back to the software agent on the client (operation 1660), allowing the agent to continue installation In one embodiment, the software agent comprises both a main logic layer and a business logic layer. The main logic layer is responsible for communication with the service provider, as well as receiving dependency route information. The business logic layer is unaware of the processing of the main logic layer. The reroute request is handled by the software agent's main logic layer. Therefore, the business logic layer is unaware of the network reroute. In other words, the business logic layer receives continuous instructions from the main logic layer to proceed with the installation. If a change in the instructions, due to a network reroute, occurs at the main logic layer, the business logic layer is unaware of these changes and continues to receive instructions as if nothing has changed.

Hence, the business layer of the software agent continues with the installation based on the reroute (operation 1670) without knowledge of underlying changes that may occur. The installation continues until completion (operation 1650).

In order to perform a reroute, a number of parameters are considered by the route manager. In a first parameter, the route manager determines whether specific software modules are included as new in the installation request. This is often the case as these modules may not be explicitly called out in the manifest. For example, a requested patch (Patch A) introduces a new library that has a side effect. Further, patch A is introduced to fix a security hole in an OS. Patch A may also include a new version of libSocket. Additional applications may use libSocket and depend upon it based on its current version. The new version of libSocket may have new changes in the functional profile of libSocket, such that the applications that relied on the previous version may stop operating correctly. In order to address such an issue, the route manager will create a reroute to include all of the updated applications based on the new version of libSocket.

A second parameter that may be considered by the route manager when performing a reroute is a historical request. As previously stated, the dependency map maintains historically successful installation routes. If a client requests an installation that matches one of these historical routes, the reroute will include this additional information which may reduce the information included in the re-request. This acts as a predictive model for the routing system by utilizing historically successful route information when possible.

The third and last parameter that may be considered by the route manager during rerouting is a declared dependency in the software installed on the client system that is not included in the dependency map. This will usually occur for custom software packages that are already installed on the client system yet are unknown to the dependency map.

In order for a software agent to install a software application based on a given dependency route, the portion (i.e., actual files) of the dependency map that encompasses the route is needed by the software agent. It is possible to host some or all of the files of the dependency map on each client system. However, the size of the map could be so large that local storage would be impractical. Accordingly, in one implementation, the service provider is configured to stream or otherwise transmit the relevant portions of the dependency map to the client system.

Further problems may arise due to potentially unrecognized dependencies on the client system that are not included in the software manifest. In result, the initial portion of the dependency map streamed to the client may be incomplete or inaccurate based on unrecognized dependencies in the software manifest that was communicated to the service provider. As previously stated, an unrecognized dependency can occur if a system administrator manually removes files from the system. For example, the software agent may not be aware of such manual changes, hence the software manifest is not properly updated with such changes. This results in a differences between the client manifest and the actual files on the client system. As such, it is possible that the actual dependency route may need to change once the installation begins. Therefore, in one particular implementation, the relevant portions of the dependency map are divided into multiple pieces and transmitted in phases.

In an example, once the client submits the initial install request, that request is sent back to the service provider where the request is analyzed. The initial portion of the dependency map, which may involve root software elements relevant to the request, is returned and processed for install by the software agent. This is the first phase of the installation, which involves installation of the root software application. Next, the total route length is calculated. The route length is defined as the number of individual software elements that comprise the dependency route. Based on the confidence factors of each dependency in the route, the route is calculated at specific steps along the way such that the entire path may not always be known from the start. In other words, as the dependencies between each element in the route are calculated with a summarized confidence factor, the route may change if the confidence factor drops below a threshold. As long as the summarized confidence factor of the dependencies maintain above the threshold, the route will continue without deviation.

In another embodiment, a route may be recalculated if the software elements already installed on the client require the route to be changed. Such a situation arises when software is present on the client's system, yet is not explicitly declared by the software manifest. An example might be if a library that is versioned and has a dependency present based on a symbolic link. If route calculation drives the software agent to an unresolved software dependency on the local dependency map, hosted by the client, a request will be sent to the service provider causing calculation of an additional segment of the dependency map, which is subsequently streamed to the client. This route calculation is based on the route path that has been recalculated by the software agent on the client. The service provider follows the route path and sends back the relevant part of the dependency map to the client. The client then continues its installation until completion. This recalculation can occur many times and is highly related to the size and complexity of the installation job that is requested by the client.

Aspects of the present invention may further involve the inclusion of confidence factors with a dependency route provided to a client from the service provider. As previously described, the service provider often transmits multiple dependency routes to the client. Each of the routes may have a confidence factor. These confidence factors provide a system administrator with a weighted scale of which route will likely result in a successful installation. Confidence factors for each dependency route can change based on a variety of factors. As installations are attempted on client devices based on a given dependency route, the service provider system collects the successes or failures of the installations. This collected data is provided to the service provider system as feedback from the software agents based on each installation in one particular embodiment. As a specific dependency route results in more successful installs, its confidence factor increases. In contrast, if a dependency route results in failure, its confidence factor is diminished. In the end, the best choice for the client will be provided by understanding successful installations that have previously occurred and using this information to provide the best solution.

Confidence factors explicitly apply to dependencies between individual software elements. Whereas, a confidence factor of an installation route may be implicitly represented based on the average of the confidence factors for each dependency within the route. For example, if a dependency route has three dependencies with confidence factors of 100%, 65% and 75%, the average confidence factor of the dependency route is 80%. The value of each confidence factor may change over time. As more installations are performed and feedback received from software agents, the confidence factor of each dependency between two software elements becomes more valuable. For example, if feedback from a particular installation route is positive (e.g., successfully installed), the confidence factor for each dependency in the route is increased accordingly. In result, the implicit confidence factor of the installation route is also increased, based on the average of the individual confidence factors from the dependencies that represent the route. As such, the more installations that have provided feedback on a dependency route, the more valuable the confidence factor of each dependency within the route becomes. In an example, dependency route A consists of 1000 dependencies with an average confidence factor for the dependencies of 100%, based on three installations. Dependency route B consists of 1000 dependencies with an average confidence factor for the dependencies of 78% based on 450 installations. The averaged confidence factor of dependency route B may be more valuable that dependency route A based on the frequent use of dependency route B.

In order to build a confidence factor for an individual dependency or an entire dependency route, the service provider may receive feedback from software agents during client installations. In one particular arrangement the software agent is configured to monitor the installation for errors. During an installation, any errors detected by the software agent are sent to the service provider hosting the dependency map. The software agent may send the actual error string, the software element that caused the error and the current location within the route where the error occurred. To begin analysis of the errors, the service provider will launch an analysis service to begin parsing the error string. The analysis service identifies references to any files that may have already been installed on the client system prior to the installation. This may point to problems with pre-installed files. For example, an existing application may have already experienced runtime errors. Hence, the previous state of the client system may already experience problems.

Further, the analysis service also identifies references to any known installation problems such a disk space, file system errors or other operating environment problems. As such, the software agent, with the assistance of the analysis service, constantly monitors the client system for failures, as well as other issues such as disk space utilization and speed of installed applications, which are reported back to and included as features of individual software elements and/or installation routes. Software elements and routes also have other features such as a version number of the related software file, security update status, and the like. In one embodiment, the agent monitors file system utilization and the system error log. When the agent detects any errors, the error is correlated to specific files on the client system. The software agent can then communicate this error back to the service provider as an error of a dependency between two software elements.

Once an error in an individual dependency has been addressed by the analysis service, the dependency is flagged with the error as well as the reason, if known. This error and its reason are stored as attributes of the dependency. The confidence factor of the dependency is now reduced due to the new error. In one embodiment, the confidence factor is calculated by taking the number of installations involving the dependency divided by the number of successful installations to generate a new confidence value.

As previously described, in one particular arrangement, in order for a software agent to install a software application on a client system, a portion of the dependency map is streamed to the software agent along with a manifest of each software element to be installed. In one embodiment, the software agent may perform a pre-installation verification check to verify that the dependency route chosen will install without errors. However, such a check is not mandatory. Further, a threshold confidence factor may be implemented such that a pre-installation verification is only triggered if the confidence factor falls below the threshold. For example, the software agent may be configured to only perform the pre-installation verification if the confidence factor of the chosen dependency route is below 65%. Therefore, a pre-installation verification would not occur on a dependency route with a 98% confidence factor as its chance for success is very high. The threshold may nonetheless be set at any value desired by a system administrator at either the computer-specific level or applying enterprise-wide.

Figure 17:
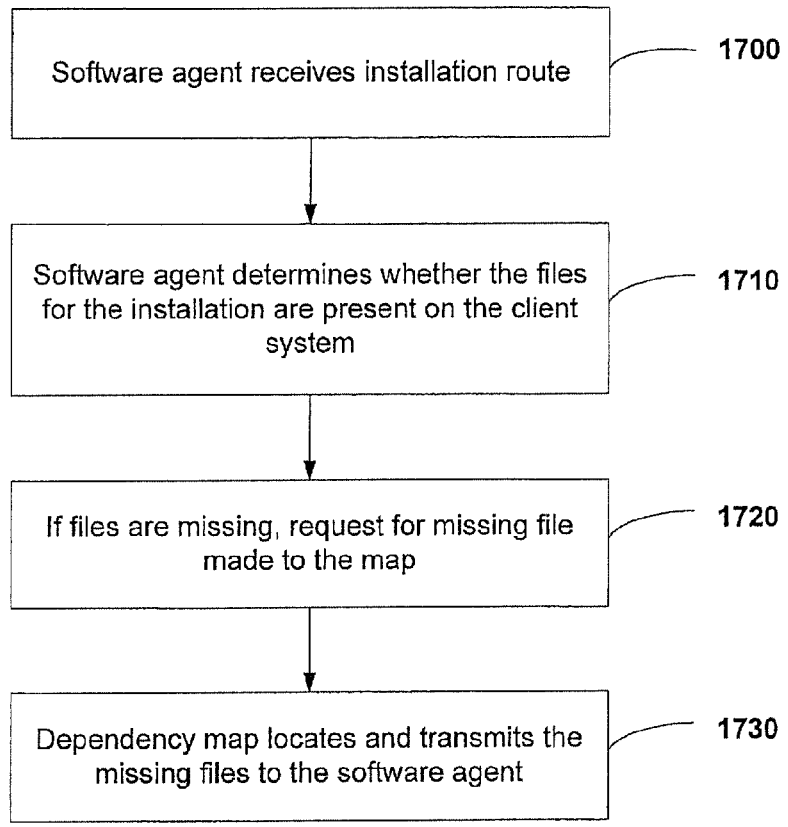
FIG. 17 is a flow diagram illustrating aspects of a method for performing a pre-installation verification of a dependency route.

Even with a reasonably high confidence factor, it is still possible that an installation based on a chosen dependency route may fail. FIG. 17 is a flow diagram illustrating a method for performing a pre-installation verification. A pre-installation verification may reduce the opportunity for installation-time errors by illuminating such errors during the validation process. In order to perform a pre-installation verification, the software agent receives the relevant portion of the dependency map needed for installation, which includes a manifest that lists each software file needed for installation (operation 1700). Once the dependency map has been received, the software agent scans the manifest of the dependency route to verify that all the files and symbol-based dependencies needed by the installation presently exist on the client system (operation 1710). As described above, symbol-based dependencies are dependencies declared within the symbol table of each executable file. If a missing dependency or software file is discovered during the verification check, the software agent requests the missing file from the dependency map (operation 1720). The dependency map locates and transmits the file back to the software agent (operation 1730). Once the missing file is received, the verification continues until each file and dependency has been determined to reside on the client system.

Figure 18:
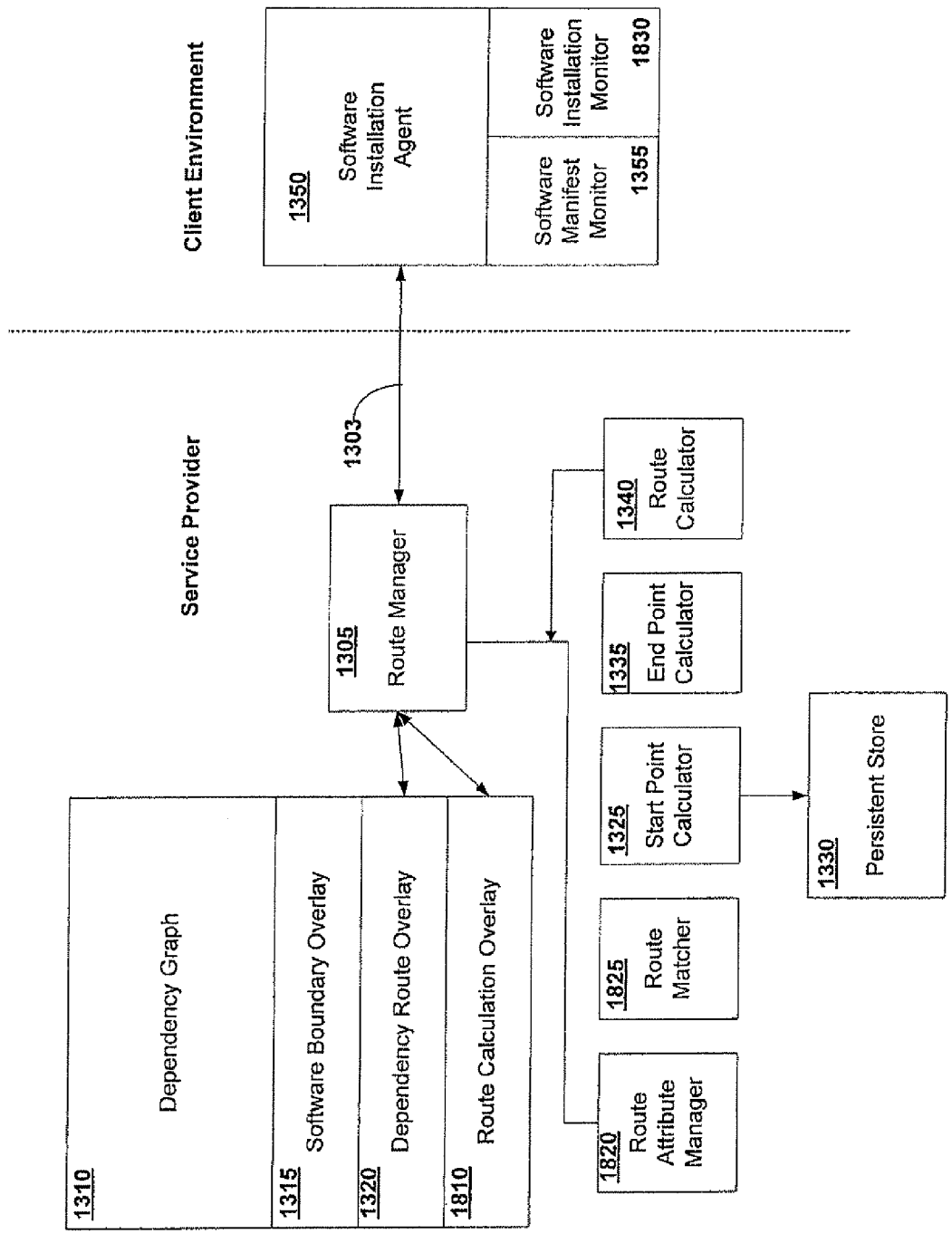
FIG. 18 is a block diagram illustrating another embodiment of a dependency route calculator that includes modules that collect and use successful and unsuccessful installations to optimize future installations, amongst other functions.

FIG. 18 is a block diagram illustrating another embodiment of the architectural components of a dependency route calculator that additionally stores information about successfully installed routes. In order to identify successfully installed routes in the dependency map, a third dependency map overlay is provided, known as a route calculation overlay 1810. This type of overlay represents each dependency route used to install or remove any software applications managed by the dependency map. In order to track the success or failure of dependency routes, the software agents 1350 provide results of the installation including whether the installation was successful and if not where the installation failed. In one embodiment a software installation monitor 1830 is responsible for monitoring a software installation. If any errors or warnings are detected by the installation monitor 1830, the information is passed to the software agent, who in turn relays the error to the service provider. As previously described, a communication feedback loop 1303 may exist between the software agent 1350 that performs the installation and the route manager 1305. Software installation or removal is monitored by the software agent 1350. If a dependency route is successfully (or unsuccessfully) installed or removed, the success (or lack thereof) is transmitted back to the route manager 1305. If the dependency route already existed as a route calculation overlay, than the confidence factor of that overlay is updated with the success received from the software agent 1350. An attribute of the route calculation overlay tracks the total number of successful and unsuccessful installations. This attribute is then incremented based on the success of the installation.

Another attribute of the route calculation overlay stores a timestamp of each installation attempt. This attribute allows for queries to be made as to how many successful or unsuccessful installs have occurred as well as the date and time of each install. On the other hand, if the specific dependency route did not exist, the route manager 1305 creates an overlay of the dependency route and provides an initial confidence factor to the overlay and a first value in the timestamp attribute. In one embodiment, the initial confidence factor is set to zero, as no data has been provided.

When the dependency map 1310 is initially created, no route calculation overlays exist. As installations occur, calculation route overlays are created. Over time, the number of overlays and their timestamp attributes will increase. However, it is likely that after a certain period of time, the number of unique route overlays may stabilize after the initial increase, as there are a limited number of installation paths available.

As stated above, the route manager 1305 considers the start point and end point of the client when building a dependency route for the client. The route manager 1305 searches the route calculation overlay 1810 for all possible routes along with their corresponding confidence factor. In one embodiment, it is possible that a route overlay may not exist that would include each software element needed to get the client from their start point to their end point. In such a circumstance, some level of deviation between the start point and end point may be allowed such that the finalized dependency route is slightly modified based on the differential between the start point and end point. In such an embodiment, it may be preferable to provide a slightly deviated route overlay that has been successfully installed rather than a completely customized overlay that has never been installed. Once all the dependency routes are calculated by the route manager 1305 they are passed to a route matcher 1825 which attempts to find exact matches in the route overlay followed by a degrading analysis to find nearest matches. In one embodiment a 10% deviation (i.e., the number of different software elements between the preferred route and the deviated route is 10% or less) is acceptable. For example, if the preferred route has 1000 elements and the deviated route has 980 elements of which 910 of the elements are the same, the deviated route would fall within 10% deviation.

The nearest matched routes are then analyzed around the start and end points to see how important the deviation is and if it can be legitimately corrected. Based on the possibility of a deviation, the confidence factor for a given route may also change. In one embodiment, the route manager 1305 may calculate the overall confidence factor based on the following equation: Route confidence=(0.1(1+Number of times route already used)*base dependency confidence calculation of route)/dependency confidence of any deviation from route. The above equation may promote the continued reuse of a route that has been successfully installed and reflects that the more use it has the less the risk the deviation becomes.

One consideration to be addressed by a service provider hosting a dependency map is the physical storage requirements for hosting the dependency map and all its software applications. One approach to storing this data is a software warehouse. Large amounts of disk space may be needed to store the dependency map data. For example, a single software application may require multiple gigabytes of storage space. Hence, a software warehouse storing hundred of applications and OS could reach well into the multiple terabyte range of storage space. Over time, the number of software applications stored in a software warehouse may continue to grow. Not only may the number of different applications increase but the number of versions of each application may increase as well. It is possible that the size and cost of storing all this data may become prohibitive unless measures are taken to phase out certain applications from the software warehouse based on differing criteria and to only store current software.

One approach for determining whether to phase out software or keep it as current, is to base the decision on the support of the actual software vendor. If a given software vendor happened to provide support for only the current and previous two versions of their operating systems, then there would be little need for continued hosting unsupported operating systems. Each software vendor has their own rules on how far back they will support their software versions. Hence, a vendor by vendor analysis may be used to determine when software versions can be phased out of the software warehouse.

Another approach for determining which software should be flagged as current and which may be phased out is based on usage patterns from customers (discussed as aging below). As previously stated, each time a software element or route is used in an installation, a timestamp is recorded of its use. These timestamps may be used in determining the frequency by which the software elements are accessed. An advantage to hosting software applications at the software element level allows for added flexibility to phase out portions of a software application, while only maintaining the current portions. For example, Apache 5.5 may have 10,000 software elements that comprise the entire software boundary overlay. Of these 10,000 elements, actual dependency routes may only include 5000 of the software elements over a specified period of time. Therefore, it may be possible that the unused software elements are no longer needed, and may thus be phased out (removal from warehouse or otherwise as discussed below).

Figure 19:
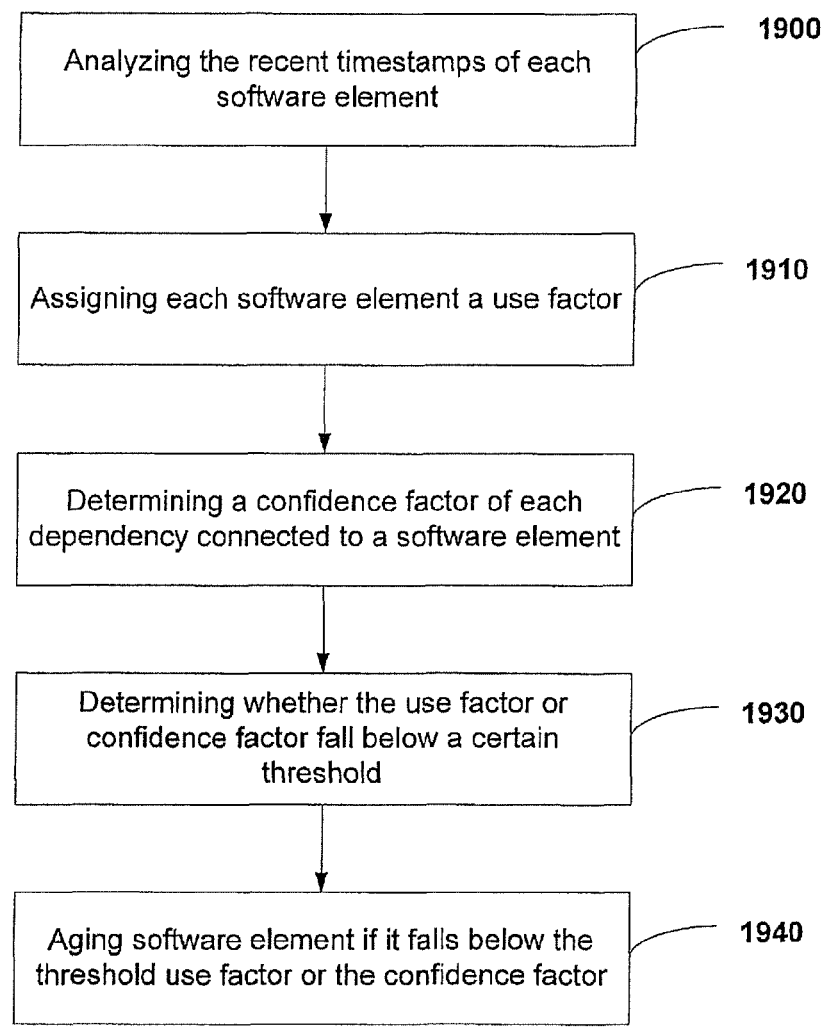
FIG. 19 is a method for updating a dependency graph to account for software elements that may no longer be useful in installations.

FIG. 19 is a flow diagram illustrating operations involved in determining which software elements to phase out (also referred to as "aging"). An aging process controlled by the dependency map periodically analyzes the map and the recent time stamps associated with each software element (operation 1900). The aging process analyzes each software element and determines the amount of recent use and assigns the element a use factor (operation 1910). The use factor is determined by the number of times the software element was accessed over a pre-determined time period.

Next, the aging process analyzes the number of dependencies connected to the software element and the confidence factor of each dependency. Since dependencies have a confidence factor tied to them, the confidence factor of each dependency is summed and an average is drawn across all the dependencies for the element (operation 1920). A pre-determined threshold value exists to determine whether to age the software element (operation 1930). In one arrangement, if either the use factor or total dependency confidence factor fall below the threshold, the software element is aged (operation 1940). In an example, the threshold value is 42%. Software element A has been assigned a use factor of 47% based on it use over the past 30 days. Element A also has three dependencies, each having a confidence factor of 20%, 90% and 10%, respectively. The average confidence factor of element A's dependencies is 40%. Hence, the use factor of 47% is above the predetermined threshold of 42%. However, the confidence factor of 40% falls below the threshold value, resulting in the software element being aged. In another embodiment, a software element is not aged unless both the use factor and the total dependency confidence factor fall below the threshold value. The method described above is merely an example of how software elements may be aged. As such, additional methods may be used to determine which software elements may be aged.

Once a software element reaches a certain age, it may be removed from the dependency map, or otherwise identified as "aged". In a first level of aging, a file represented by a software element may be moved from the primary hard disks that comprise storage for the software warehouse to a slower retrieval mechanism such as tape drives or slower disk drives (e.g., slower seek times, RPMs, cache, etc.) In this level, access to these elements are still possible, but with reduced retrieval performance. In a second level of aging, software elements that have not been referenced through dependency routes are aged into an offline storage. The elements are no longer maintained in the dependency map, however, a link to the elements still exist. After 90 days, the reference from the dependency map to the element is removed. In another approach, the file represented by the software element is also removed from the software warehouse. However, a log is maintained of previously removed elements for future retrieval if needed.

The purpose of aging software elements and removing them from the software warehouse is to reduce the exponential size of the warehouse. As software applications are added to the dependency map and the warehouse, the warehouse increases in size. As a relational database grows in size, its performance diminishes. The "aging" process permits the dependency map to continue to add software applications and dependency routes, while maintaining acceptable performance in the underlying warehouse that hosts the software applications.

Another consideration for a service provider hosting a dependency map is the division of software applications that occurs across multiple vendors. It may be the case that a single service provider will not host a dependency map and software warehouse for all software applications across different vendors. Accordingly, in one implementation, dependency maps from different vendors are linked together. In one example, each software vendor, or other party hosting a dependency map may have links to other dependency maps, allowing a customer to access dependency routes across multiple vendors.

In one arrangement, the linking of vendor specific or other separate dependency maps provide a virtual dependency map. The virtual dependency map is accessible by the software agent on each client. The virtual dependency map is an accumulation of many separate vendor maps. Each vendor dependency map knows the location of every other vendor dependency map by way of one or more soft references to the other vendor dependency maps. These references are in effect dangling references, as discussed above, that will be fulfilled when connected by dependencies from other dependency maps based on a request made from a customer to install applications that span two vendors. Hence, a plurality of individual vendor-hosted dependency maps can be connected to each other when needed.

In an example, a customer may wish to install Apache 5.5 on Solaris 9.0. In this example, two different vendors supply the software applications and host the dependency maps, thus two different dependency maps are accessed. The software agent on the customer's client system may query one dependency map for the optimal dependency route for installing Solaris 9.0. Next, the software agent on the client system identifies a soft reference to the Apache dependency map. The software agent uses a lookup request to obtain the uniform resource indicator (hereinafter "URI") of the Apache dependency map that fulfills the soft reference. The two separate maps are thus functionally combined to create a "virtual" map for the purpose of providing a dependency route installing Apache 5.5 on Solaris 9.0 of a target computer.

In another embodiment, the use of soft references to connect multiple dependency maps can be used in an opposite approach by dividing a single large dependency map from an organization into smaller and more manageable maps. Each dependency map would have a soft reference allowing it to be connected to the other dependency maps within the organization. In one embodiment, each map could be divided across product lines, vendors, or other division criteria.

Figure 20:
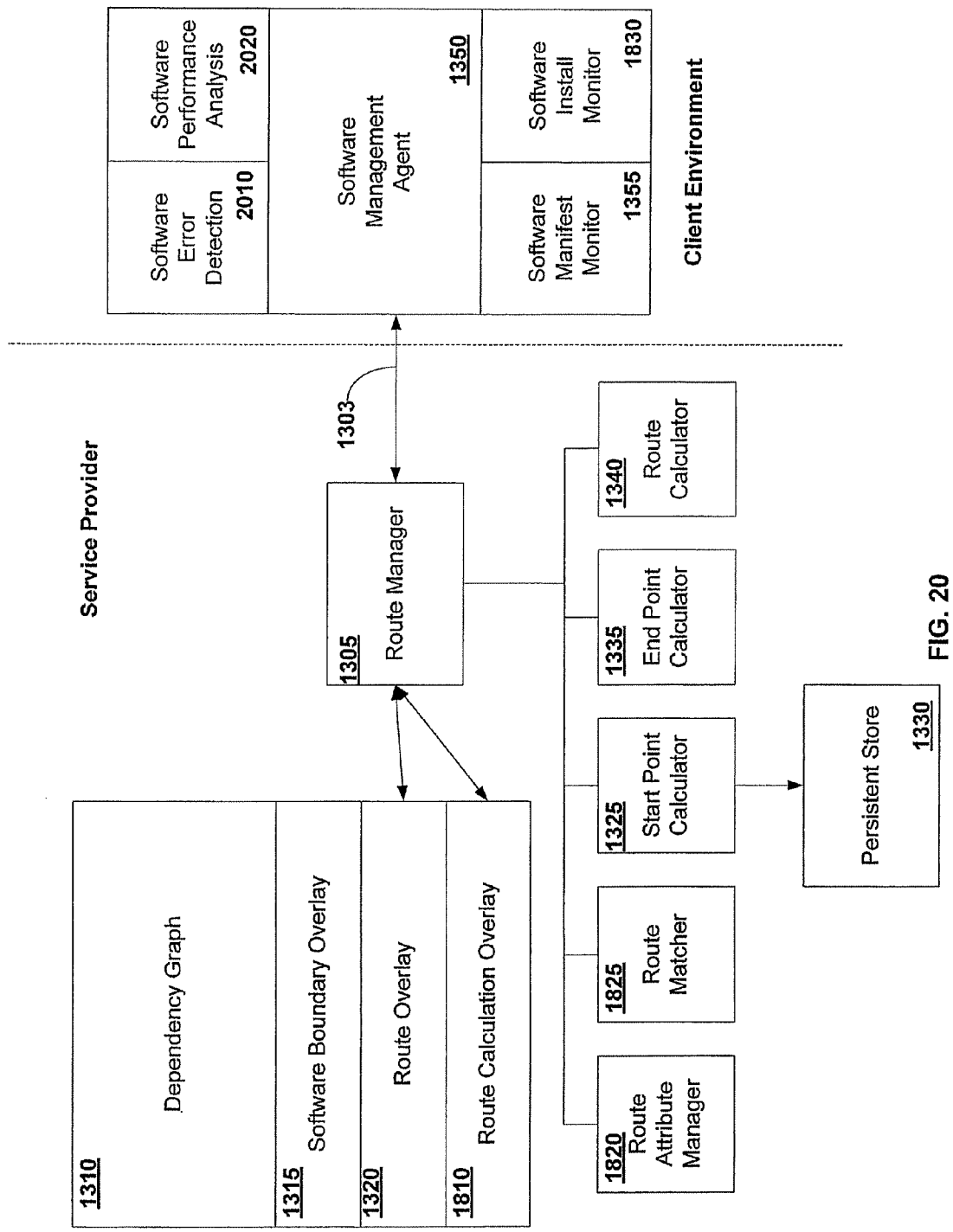
FIG. 20 is a block diagram illustrating a software management agent on a target computer that tracks and analyzes information about run-time failures and performance statistics of successfully installed routes and communicates the information to component modules in dependency map generation to optimize installation route information.

V. Enriching the Dependency Map by Monitoring Software Installations and Performance As described in Section IV, dependency routes include attributes that store additional information about a dependency route. Such information includes the number of successful and unsuccessful installations based on the route as well as timestamps for each installation attempt. Tracking installation-time success and failure is not the extent of the information that may be associated with each route. In addition, tracking run-time failures as well as performance data is also possible, besides other information. In order to track this type of information, additional modules may be coupled to the software management agent as shown in FIG. 20. FIG. 20 is a block diagram illustrating another embodiment of the architectural components of a software management agent that tracks and analyzes information about run-time failures and performance statistics of successfully installed routes. In this embodiment, the software agent 1350 further includes one or more software error detection modules 2010 and software performance analysis modules 2020.

In one embodiment, run-time errors and execution analysis is performed by the software error detection module 2010 which may include two sub-modules; an event detector and a log file watcher. The event detector is configured to detect problematic events in the software that is being installed by the software agent. The event detector may be configured to perform simple network management protocol ("SNMP") sniffing, core or memory image dumps, java stack detection, etc. By contrast, a log file watcher tracks pre-determined log files looking for conventional textual entries associated with system error logs or application specific error logs.

The software error detection module 2010 is further configured to receive input from the system administrator regarding the type of errors to monitor and how to determine if such errors should be flagged. Hence, each error detection module includes a definition construct, defined by the system administrator, describing the module's responsibilities. In the case of an event detector, the definition construct describes which type of events to monitor and whether a given event type should be defined as an error. In the case of file log watcher, the definition construct describes which type of log files to monitor and which type of log events should be flagged as an error.

In one particular arrangement, there are individual software error detection modules 2010 for each application on the client's system. The software agent 1350 then uses these modules to watch for errors that are associated with individual software applications. As errors are detected by the individual software error detection modules 2010, the software agent 1350 periodically sends these errors and the client software manifest back to the route manager 1305. The route manager is further tasked with applying these errors to the dependency route or routes associated with the error in question. The error is then computed into the existing confidence factor, thereby reducing the factor to some degree.

The tracking and analysis of performance data is similar to tracking errors such that software performance analysis modules 2020 are deployed to monitor the performance of each software application installed On the client's system. In one embodiment, there may be only one software performance analysis module 2020 configured to monitor all the software applications. In another embodiment, there may individual analysis modules 2020 for each software application. The module is configured to define what type of performance variables to monitor and for which software applications. Such performance variables may include, but are not limited to, the timeframe required to execute certain functions, the number of processor clock cycles for performing a function, etc. Once performance information is gathered by the analysis module 2020, the information may be submitted to the route manager 1305 along with the dependency route used to install each software application. In one embodiment, a performance rating may be applied as an additional attribute to dependency routes. Once additional performance information is submitted to the route manager, the performance information may be averaged into the existing performance rating.

Further, the performance rating of this route may be compared to the performance ratings of additional routes. This permits the route manager to order other dependency routes, with the same software configuration, based on performance.

VI. Software Installation Simulation and Intelligent Software De-Installation Another feature of using a dependency map to create a software dependency route is the possibility of simulating a software installation. By understanding the precise state of a start point, the exact installation effects of a request can be simulated using a virtually provisioned operating system. Such a simulation can allow system administrators to see the effect of the installation with complete accuracy, yet without having to physically install the software. There are many benefits to simulating a software installation. For example, a requested installation of a software application may generate a dependency route with a low confidence factor. Accordingly, the administrator may wish to test whether the install is likely to work in their environment without having to install the software beforehand. In another example, a returned dependency route may have little or no confidence factor weighting tied to the route. This would be the result of very few, if any, installations having been attempted with the route. Running a simulation allows an administrator to verify whether the installation will be successful.

Figure 21:
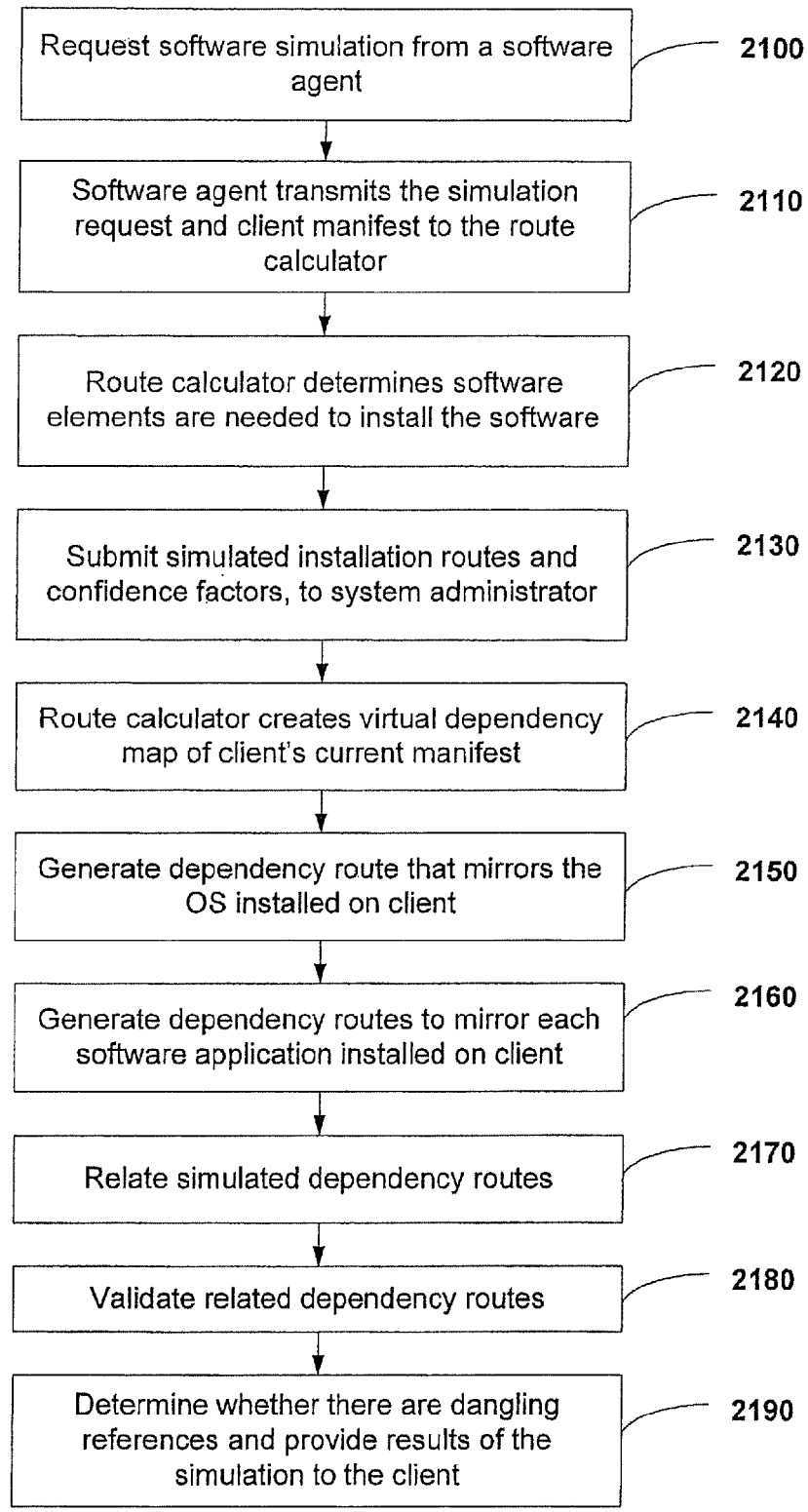
FIG. 21 is a flow diagram illustrating a method for performing a software installation simulation.

FIG. 21 is a flow diagram illustrating the operations for performing a software installation simulation. When an administrator requests a simulation of a software application, they would proceed by defining the request through the software agent on the client system (operation 2100). The simulation request would be similar to a traditional installation request in that the system administrator would define the application to be installed and any special configuration options they require. For example, they may wish to simulate the affects of installing the latest version Apache 5.5 on Solaris 9. Once the request is relayed to the software agent, the request, its configuration parameters and the current manifest of the client are transmitted to the route calculator (operation 2110). The route calculator uses the dependency map to back trace the software elements needed to install the software based on the manifest (i.e., start point) of the current software inventory on the client system (operation 2120). As with actual installations, the service provider will often return multiple dependency routes that meet the criteria of the simulation request. Each route may also comprise confidence factors, allowing the administrator to decide which route to simulate (operation 2130).

In order to simulate an installation of a software package a mirror image of the client's system is needed. This includes a virtually provisioned OS as well the other software applications and services which resides on the client. By having a copy of the client's manifest, the route calculator can create a virtual dependency map of the client OS and the other applications and services that exist on the client (operation 2140). Next, a dependency route is created for the OS residing on the client system (operation 2150). This route includes every software element and dependency needed to rebuild the OS exactly as it exists on the client system. Next, a separate dependency route is created for each software application and service that exists on the client system (operation 2160). Lastly, the simulated dependency route selected by the administrator is provisioned. In one embodiment, a plurality of dependency routes exist (e.g., one route for the OS and one route for each software application on the client) that may be joined together into one large route (operation 2170). It is possible that joining two dependency routes together is straightforward if all the dependencies between the two routes are already realized. However, it is possible that an interim dependency route may need to be created to connect unrealized dependencies between the individual routes.

Once all the dependency routes have been joined, the complete route is validated by verifying the dependencies of the elements in the route and resolving any dependencies that are incomplete (operation 2180). In one embodiment, this validation is a step-by-step model that creates a stack of all the software elements created and their dependencies. The stack is responsible for storing the validation results. Upon completion of the validation, verification is made that there are no dangling references (operation 2190). However, if any dangling reference are reported from the validation process, the dangling reference is returned to the system administrator and the validation process halts. Since a dangling reference is typically not permissible in the installation of a software application, the simulation shows that the simulated dependency route would not be installed successfully.

One type of issue that a simulation may be unable to recognize or fix is the possibility that some piece of software needed for an installation is unavailable. In other words, it is possible that the software manifest of a client system includes a dependency that is unforeseen or unrecognized by the service provider. Hence, this embodiment focuses on the need for on-the-fly resolutions of problems in the installation phase that may not be recognized during simulation or analysis of dependencies. As previously stated, each client system contains a software manifest that lists every software element on the client system. When a client requests software to be installed, the client manifest is uploaded to the route calculator by the software agent. Access to the manifest permits the route calculator to determine the start point of the client's system. If the client manifest is incorrect for some reason, then the dependency route created by the route calculator may cause installation-time errors.

Normally the items contained in the client manifest are updated as software applications or services are installed or deleted. For example, if a software service is deleted from the client, each file that has been removed is reflected in the manifest. Under most circumstances the manifest accurately reflects the current state of the client system. However, a client manifest may have inaccuracies for a number of reasons. One common situation that may cause inaccuracies occurs when manual changes are made to the client system by a system administrator. For example, a system administrator may have Solaris 9 installed on the client. By default, CoreLoginServices, a module of Solaris, is installed. CoreLoginServices includes a number of individual login shells for accessing a UNIX server. One of the login shells, sshd, is a secure login shell. It is possible for a system administrator to manually delete this shell and its associated files to prevent others from accessing the server from this method. However, a manual deletion of this shell would not show up in the client's manifest because the manifest is only updated based on changes that occur through the control of the software agent. Therefore, if an administrator wishes to simulate an installation of Apache 5.5 on the client, the uploaded manifest states that sshd exists on the client. In this case, Apache 5.5 may have a dependency on sshd. During a simulation, this discrepancy may not be found since the simulation uses the client manifest to determine the software state of the client. Since the manifest does not show sshd as missing, the simulation will not find this potential problem. However, during an actual installation the absence of sshd will likely cause installation-time errors.

One method for alleviating this situation is to add an additional installation validation thread to the software agent running on the client. This thread is concurrently active during installations occurring on the client. During an installation, this validation thread acts as a background process to the software agent running low level validation checks of each dependency in the installation. Based on the above example, the validation thread validates the integrity of each OS command (e.g., sshd) by analyzing any potential log files created from the command being executed. In other words, this thread is tasked with isolating any dependency discrepancies that may occur during the installation that have not been detected during the initial route creation or installation simulation.

Figure 22:
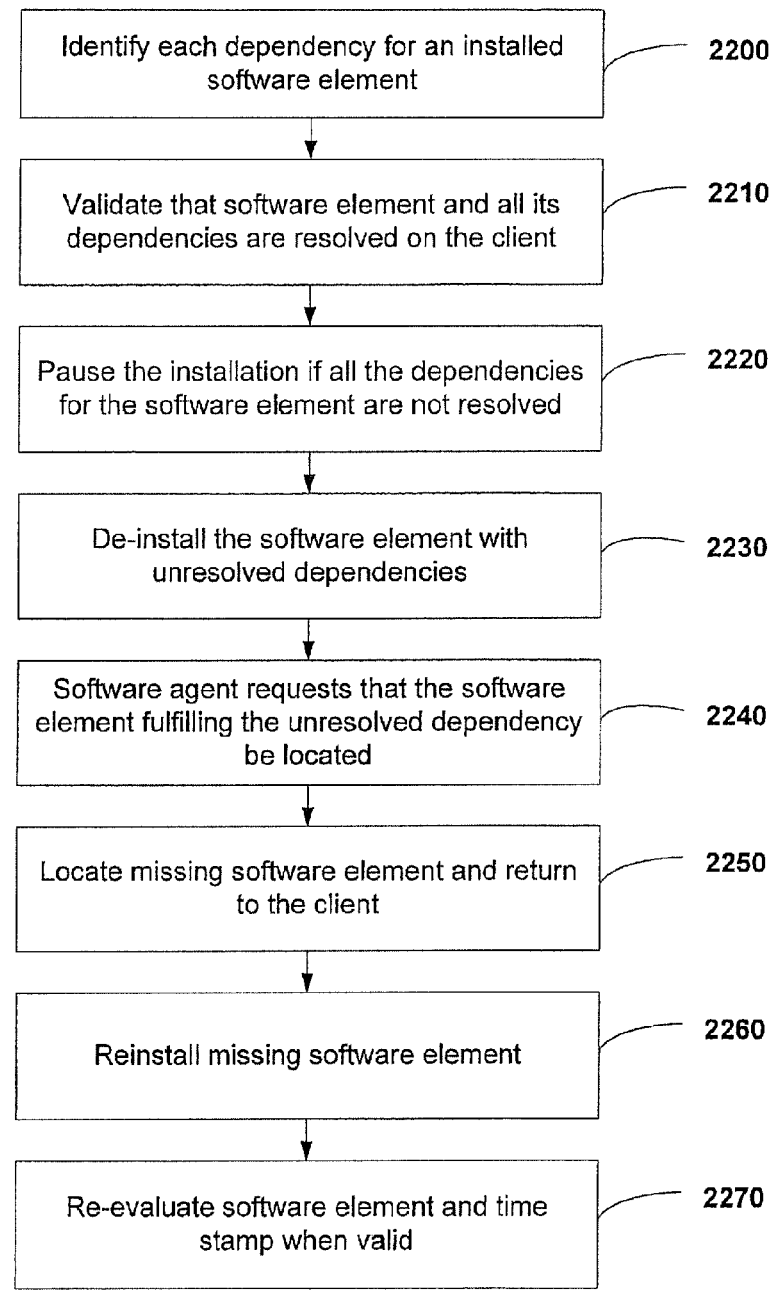
FIG. 22 is a flow diagram illustrating aspects of a method for validating an installation using a installation validation thread.

FIG. 22 is a flow diagram illustrating the operations for validating an installation using a installation validation thread as described above. The validation thread works by analyzing each new software file that is being installed during a software installation. After a software file is installed, the thread identifies each dependency that exists in the dependency route for the software element associated with the file (operation 2200). If each dependency is accounted for (i.e., each software file that depends upon the installed element are found to exist on the client system), the associated element is found to be complete and date stamped as an attribute to the element (operation 2210). On the other hand, if a file is found to have a missing dependency (e.g., sshd) the validation thread requests a pause on the installation (operation 2220). The installed file is then forcibly de-installed (operation 2230) and a network request is sent to the installation map to identify the missing software element (file) (operation 2240). The dependency map receives the request, locates the missing element through a uniform resource locator ("URL") reference or otherwise, and returns the missing element to the client (operation 2250). The software agent then reinstalls the software element as well as the missing software element from the dependency (operation 2260). Once the validation thread re-validates the software element and all its dependencies as being accounted for, the element is time stamped for completeness and the main installation is unpaused and continues (operation 2270). This process continues through the entire installation until each individual software element and its dependencies are validated and time stamped.

In one embodiment, user policy of a client system can be configured to specify the level of validation to be performed by the validation thread. In a minimal involvement, the system administrator can specify that the validation thread simply verify the existence of the files declared in the manifest. Such an approach would be faster in its execution, but less thorough. For example, this approach would not validate the dependencies that exist between each software element, only that the software elements exist. In an intermediate involvement, the administrator can specify that the validation thread validate actual file permissions for all files declared in the manifest. In higher level of involvement, the validation thread can be specified to perform analysis on the symbol tables for each executable in the dependency route. As previously stated, the symbol table for each executable file contains all the dependencies related to the executable file. For example, the symbol table of the executable file called "ls" may show that "ls" imports "PrtOut" which is a routine that allows the printing of text on an output display. PrtOut actually exists as a routine within a C library called libC. Therefore, analysis of the symbol table for "ls" would show that "ls" depends upon libC to operate successfully.

One of the benefits of simulating a software installation is to determine whether an installation would be successful without going through the actual installation process. However, there are times when an installation is found to be successful yet there may be reasons that an administrator may wish to back out of the installation after it has been completed. Conventional approaches to de-installing software are converging, in that they go forwards in time trying to merge back to a state that resembles the previously stored state of a system. This feature is also known as check-pointing or convergent software rollback. In order to perform such a rollback, an administrator must create a checkpoint before an installation takes place. This checkpoint takes a snap shot of the client's current software inventory and configuration. If the administrator wishes to return to the checkpoint at some point in the future, the system is actually moved forward by attempting to change the system to conform to the previous configuration as defined in the checkpoint. This often results in a mere approximation of the former check-pointed system due to the way conventional rollbacks are done at the package level and not the file level.

Figure 23:
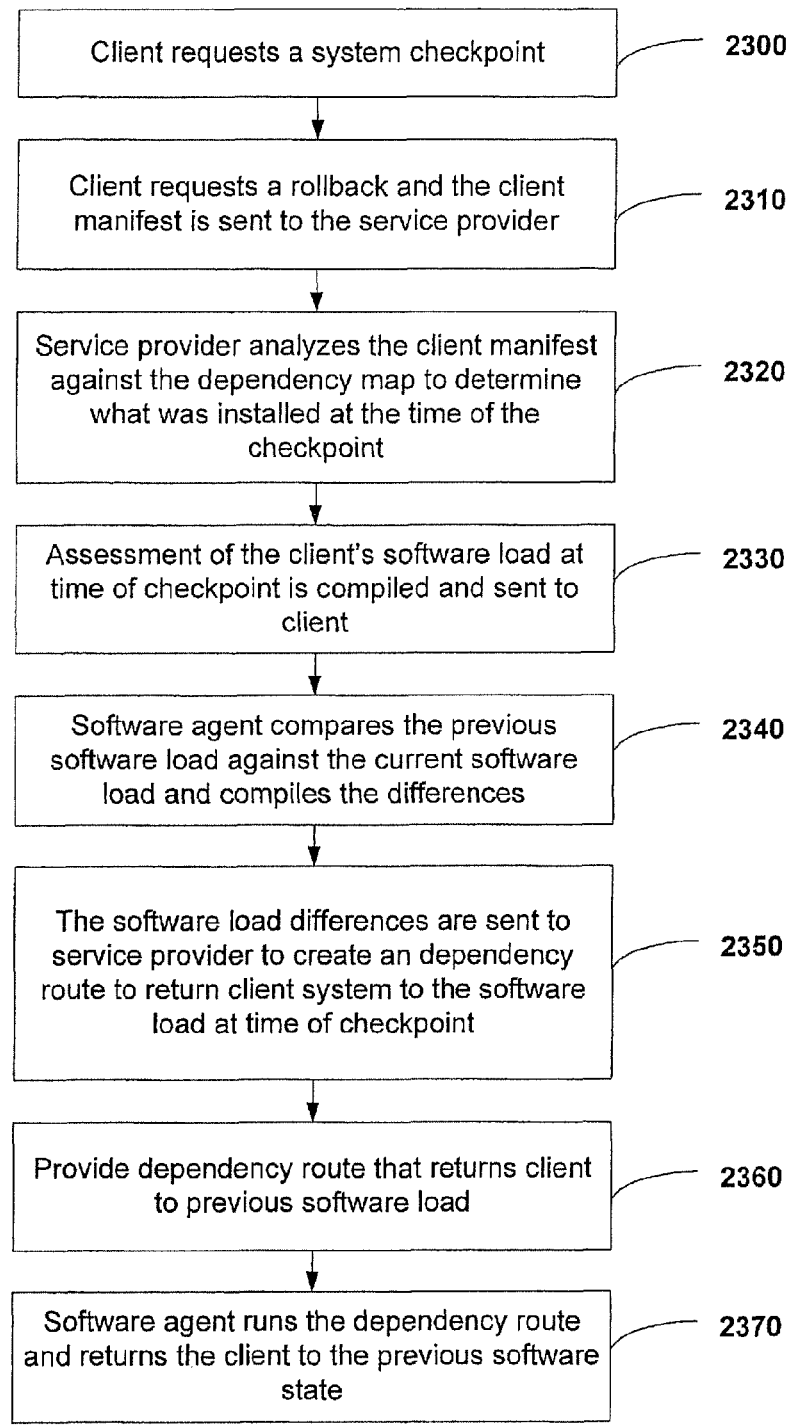
FIG. 23 is a flow diagram illustrating aspects of a method for performing a system rollback.

Aspects of the present invention offer an approach of moving backward in time to return a system to substantially the exact previous state. In order to allow for such an approach, the dependency map described above implements time tracking of each change to a client system. In order to implement time tracking of manifest changes an additional manifest is created and stored on the client when an installation is performed on the client. This additional manifest includes all of the dependency routes that were used to install all software applications on the client. This additional manifest further includes a timestamp for each dependency route used to install software. FIG. 23 is a flow diagram illustrating the operations for returning a computing system to a previous state. When a snapshot is requested for a client system, all of the dependencies on the client are traced back through the dependency map and the additional client manifest (operation 2300). This allows for a complete manifest to be created. The time-stamped information within the complete manifest allows for an accurate assessment of the routes that were used to create them.

At some point in the future when the client requests the system to be returned to the previous state represented by the snapshot, the software agent on the client recovers the new manifest and transmits it to the service provider (operation 2310). This manifest lists all the root software elements, the dependencies associated with each root software element, as well as a the root time dependency routes associates with the root software elements. As previously described, a root software element is an element that does not depend upon any other elements. Once the manifest is received, the service provider analyzes the historical data stored within the manifest and compares it to the dependency map to assess exactly what software elements and versions were installed at the time of the checkpoint (operation 2320). Upon completion, an accurate assessment of the software load at the time of the checkpoint is compiled and sent back to the software agent on the client (operation 2330). The software agent then compares the previous software load against the current software load and compiles a list of all the differences (operation 2340). These differences are then sent back to the service provider where the dependency map is used to assess what software needs to be de-installed and in what order to accurately return the client system to its previous state (operation 2350). Since the dependency map stores the previously installed software for the client, it is possible to properly assess which software elements need to be installed or de-installed. In other words, a dependency route is being constructed where the start point is the current software manifest of the client and the end point is the manifest at the time of the snapshot. Hence, the route contains all the software elements that need to be installed and de-installed to get the client from its start point to its end point. Without such historically collected information, such a de-installation approach as described would be extremely difficult if not impossible.

The service provider also uses the time stamped dependency routes from the additional client manifest to understand the differences. These time-stamped dependency routes can be broken down into smaller routes and the differences isolated. Once the differences are understood, metadata stored in each root software element and their dependencies are used to create de-installation and re-installation instructions (operation 2360). Lastly, the instructions are returned to the software agent on the client who carries them out line by line (operation 2370). Once completed, the client system is returned to substantially its exact state at the time the snapshot was created.

System administrators are often seeking ways to improve the performance of their systems. Aspects of the present invention permit existing software configurations on client systems to be analyzed by the service provider to determine if changes could be made increase its performance or remove unneeded software elements. In order for a client system to be analyzed for possible performance increases, the client manifest is transmitted to the service provider.

In one embodiment, an additional attribute stores with a dependency route is performance statistics. The software agent installed on each client may monitor the run-time performance of an installation, based on a specific dependency route, and communicate this performance information to the service provider. The performance data is then stored with the dependency route. As additional performance information is received from additional clients, the performance rating of the route is changed. If changes to a configuration are detected by the route manager that may increase performance, a list of such changes may be complied by the service provider and streamed to the software agent in the form of dependency routes that would install and de-install software elements as needed to change the installation of the software application to match the software elements that comprise the selected dependency route. The service provider could also provide performance information to the system administrator as a reason to perform the suggested changes. Further, such metrics could be used to give reasons why an updated version of an already installed application would be beneficial, resulting in additional revenue for the vendor or service provider.

Once changes have been streamed to the client, they can be implemented by the software agent.

In another embodiment, the service provider could further analyze the client manifest to determine if there any installed software elements on the client that are not needed for the current configuration. If such elements are discovered, the service provider could transmit a list of the elements that may be de-installed along with a dependency route that would de-install these elements.

In order to build a confidence factor for an individual dependency or an entire dependency route, the service provider may receive feedback from software agents during client installations. In one particular arrangement the software agent is configured to monitor the installation for errors. During an installation, any errors detected by the software agent are sent to the service provider hosting the dependency map. The software agent may send the actual error string, the software element that caused the error and the current location within the route where the error occurred. To begin analysis of the errors, the service provider will launch an analysis service to begin parsing the error string. The analysis service identifies references to any files that may have already been installed on the client system prior to the installation. This may point to problems with pre-installed files. For example, an existing application may have already experienced runtime errors. Hence, the previous state of the client system may already experience problems.

Once an error in an individual dependency has been addressed by the analysis service, the dependency is flagged with the error as well as the reason, if known. This error and its reason are stored as attributes of the dependency. The confidence factor of the dependency is now reduced due to the new error. In one embodiment, the confidence factor is calculated by taking the number of installations involving the dependency divided by the number of successful installations to generate a new confidence value.

Another solution available to system administrators through the use of dependency maps and dependency routes is server software duplication. It is common for a system administrator to substantially duplicate a software configuration across many servers. An example would be a large website that has a large amount of Internet traffic. Conventionally, in order for the website to manage the high traffic volume, a plurality of servers and a load balancer are used. Each server would comprise identical or substantially identical software configurations so that someone browsing the website hosted by the servers would see the same website no matter which server they were directed to by the load balancer. In any arrangement, it is possible for two servers to include the same functional software arrangements, but nonetheless differ by having different device drivers, different network connection drivers, etc., when different hardware or network connections are associated with the servers.

Conventionally, in order for a system administrator to con-FIG. multiple servers with the same software a common set of software distributions are created. The administrator would then use this distribution set to copy all the software onto each server. One problem with this approach is the inability to track or fix deviations or performance enhancements at the software element level, as the software would have been installed by the conventional package approach as described in the background section of the present application. In order to make changes to an existing software configuration the administrator would need to make such changes manually on the first server and then duplicate this effort across every other server comprising the same configuration. Depending on the number of duplicate servers, this task may be extremely time consuming as well as prone to human error.

Figure 24A:
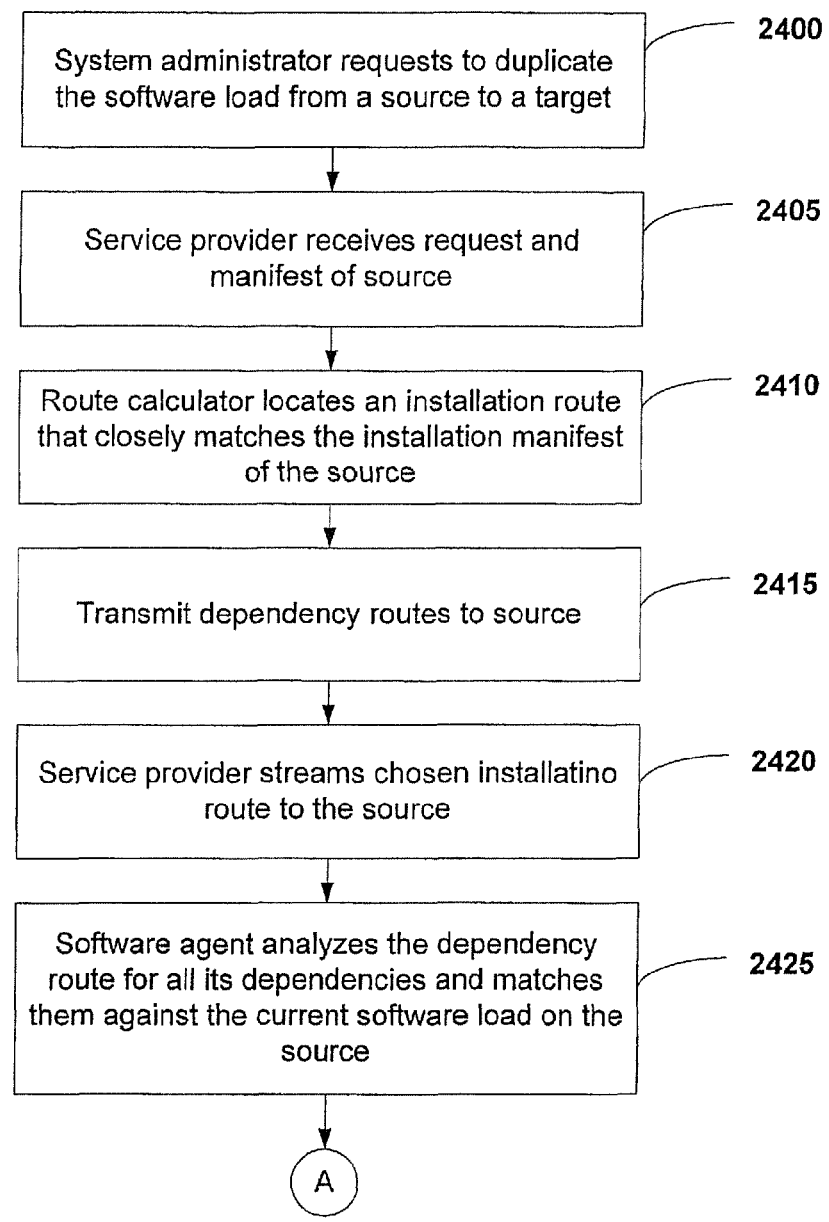
FIGS. 24A and 24B is a flow diagram illustrating aspects of a method for duplicating software across multiple servers.
Figure 24B:
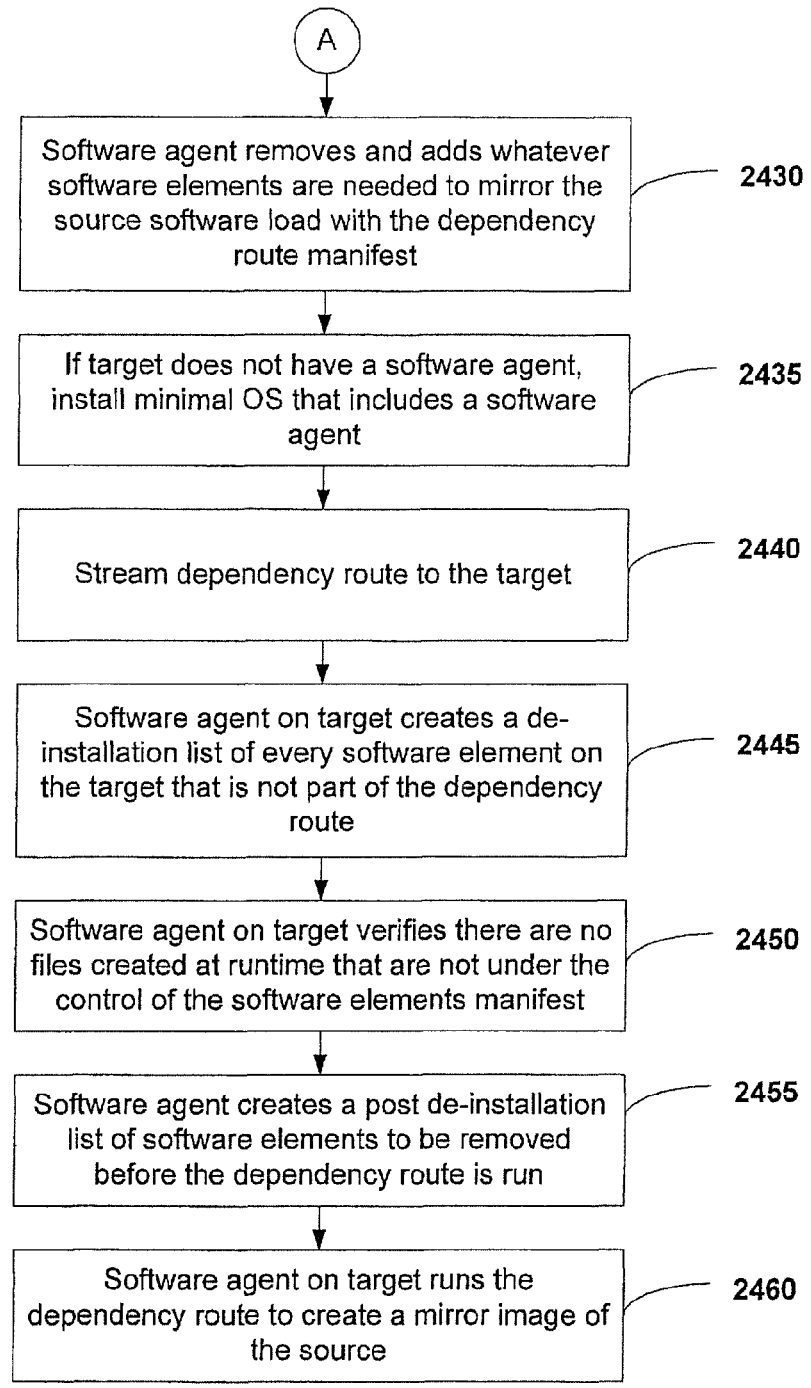

In accordance with aspects of the present invention, by using dependency maps and dependency routes, a solution for providing duplicate or substantially duplicate software manifests and configurations across multiple servers is possible. One method for duplicating software across multiple servers is illustrated in FIGS. 24A and 24B. First, a system administrator makes a request to the service provider to make a duplicate configuration on a target server from the current configuration on a source server (operation 2400). The request is uploaded to the service provider from the software agent on the source server. As with all installation requests the software manifest of the source server is also uploaded to and received by the service provider (operation 2405). Once the request and manifest is received, the route calculator attempts to locate a dependency route that matches the installation manifest for the source server (operation 2410). In order for this to occur, a software agent is preferably installed at the source server when it is first brought online. Otherwise, it is difficult for the manifest to accurately reflect the current and historical software load of the source server since a software agent tracks changes to a manifest as the changes occur.

If an exact dependency route is not found or if the software agent was not installed for the lifetime of the source server, then a dependency route is calculated based on the currently supplied manifest. As with a normal installation request, it is common for a number of dependency routes to be presented, with each route including a confidence factor based on the number of previously successful installations using the same route (operation 2415). Upon confirmation of a preferred route, the service provider streams the route to the software agent on the source server (operation 2420). As with any dependency route for installing a software application, the route will include every single dependency on other software elements needed to install the application. For example, when installing Apache 5.5 using dependency route Y, there may be 1200 software elements that the route depends upon. Therefore, all of these software elements should either exist on the client or be installed before Apache 5.5 is installed.

Once the dependency route is streamed to the software agent on the source server, the software agent will analyze the dependency route and match it to the current software load on the source server (operation 2425). If there are any differences between the software load of the source server and the dependencies required by the dependency route, which is likely, the software agent will remove and install whatever software elements are necessary to ensure that the route accurately reflects the software load of the source server (operation 2430). The purpose of matching the source server's software load with all the software elements and dependencies from the chosen dependency route is to ensure that the target server will end up with a substantial identical software load as the source server once the target installs the dependency route.

Once the source server's software load and the dependency route are equal, the target server is assessed. Depending on whether the target server has a software agent installed, two different installation paths would be followed. If the target server does not have a software agent installed, a minimal OS is installed on the target which includes a software agent (operation 2435). In one embodiment, Bar Metal Provisioning is used as previously described. In this embodiment, a bare OS, along with a software monitoring agent, is provisioned onto the hardware machine, erasing any previously installed OS or applications.

Once the target server includes a software agent, or if it already had one, the dependency route is streamed to the target server (operation 2440). The software agent scans the current software manifest on the target server and creates a de-installation list of every software element that is not part of the dependency route (operation 2445). Next, the software agent analyzes the file manifest of each software element in the de-installation list and performs a file-level dependency check on each software element to ensure there are no files that are created at runtime but are not under the control of the software elements manifest (operation 2450). An example of such a file may be system-level or application-level configuration files. If any such runtime created files are found, they are flagged in a separate post de-installation list. Once assessed, all the software elements and the de-installation list are checked for additional dependencies which are then added to the post de-installation list (operation 2455). After the software elements and runtime files are deleted, the software load on the target server should not have any additional software elements that are not part of the dependency map. Hence, the software agent only has to add software elements from the dependency map and not delete anything. At this point, the software agent carries out the installation as specified in the dependency map, resulting in a mirror image software load of the source server (operation 2260).

Another advantage of managing software with a service provider model is the ability to fine tune software configurations that are currently installed on a client system. As with all software applications, patches, bug fixes or new versions are continuously released by vendors. A vendor will often claim that the latest patch or version is always the best. Often times, vendor support may be denied unless the client upgrades to the current version or installs the latest patch. This approach is often flawed, as a particular patch may fix one thing, yet hinder others. As such, a system administrator may spend a great deal of time trying to determine which patch causes the least problems regardless of its release date.

A method for managing presently installed software configurations is described below. As previously described, software dependency routes stored as overlays on a software dependency map represent previously installed dependency routes for one or more software applications. Confidence factors for each route are calculated based on the success rate of an installation based on a specific dependency route. It is possible that a number of dependency routes exist for installing Apache 5.5 on Solaris 9.0 update 1. Each route may have the same end result of installing Apache 5.5, however, each route may have minor nuances that differentiate them in some way. Out of each route, one may be the most stable, one may have better performance statistics and one may be the most secure.

In one embodiment, a software dependency map hosted by a service provider comprises two type of nodes; major nodes and minor nodes. Each type of node is comprised of many individual software elements and dependencies. A major node is normally user-requested software that directly relates to the need of the user. An example might be Apache 5.5. Minor nodes are normally software that is installed in order to support the desires of the user. An example might be additional software elements that allows Apache 5.5 run with stability as its main attribute. There are very few major nodes compared to the number of minor nodes. For example, Apache 5.5 may have a single major node. Yet there may be 10 different minor nodes that change the attributes of how Apache 5.5 is configured.

In one scenario, a system administrator may want to check and see if there is a more stable install of Apache 5.5 on Solaris 9 (release B), than the current configuration on their client system. If such an inquiry is transmitted to the service provider, it is likely that the minor nodes that support Apache 5.5 are the nodes being analyzed with the major node being untouched. The dependency map would analyze the current configuration of Apache 5.5 based on the client manifest and attempt to find a dependency route that matches this configuration. If such a route does not exist, a new route is created and given a low confidence factor. Next, the dependency map compares this new route to existing dependency routes, along with the confidence factors. If another route is found to have a higher confidence factor (i.e., less install or runtime errors and hence more stable) than the new route, it is selected for installation on the client system.

Before installation of the new dependency route, the software agent on the client system performs a depth first search of the first of the leaves in the dependency graph. The software agent then works upward from the bottom of the route reinstalling and updating software elements as needed to match the software manifest of the client to the software elements and dependencies from the dependency route chosen for installation. Once the update of the client is complete, the route information is uploaded to the dependency map for historical storage.

While the disclosed embodiments are described in specific terms, other embodiments encompassing principles of the invention are also possible. Further, operations may be set forth in a particular order. The order, however, is but one example of the way that operations may be provided. Operations may be rearranged, modified, or eliminated in any particular implementation while still conforming to aspects of the invention. Embodiments within the scope of the present invention also include computer readable media for carrying or having computer-executable instructions or data structures stored thereon. Such computer-readable media may be any available media that can be accessed by a general purpose or special purpose computer. By way of example, and not limitation, such computer-readable media can comprise RAM, ROM, EEPROM, DVD, CD ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications link or connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Those skilled in the art will appreciate that aspects of the invention may be practiced in network computing environments with many types of computer system configurations, including personal computers, hand-held devices, multi-processor systems, microprocessor based or programmable consumer electronics, network PCs, minicomputers, mainframe computers, and the like. Various embodiments discussed herein including embodiments involving a satellite or cable signal delivered to a set-top box, television system processor, or the like, as well as digital data signals delivered to some form of multimedia processing configuration, such as employed for IPTV, or other similar configurations can be considered as within a network computing environment. Further, wirelessly connected cell phones, a type of hand-held device, are considered as within a network computing environment. For example, cell phones include a processor, memory, display, and some form of wireless connection, whether digital or analog, and some form of input medium, such as a keyboards, touch screens, etc. Hand-held computing platforms can also include video on demand type of selection ability. Examples of wireless connection technologies applicable in various mobile embodiments include, but are not limited to, radio frequency, AM, FM, cellular, television, satellite, microwave, WiFi, blue-tooth, infrared, and the like. Hand-held computing platforms do not necessarily require a wireless connection. For example, a hand-held device may access multimedia from some form of memory, which may include both integrated memory (e.g., RAM, Flash, etc) as well as removable memory (e.g., optical storage media, memory sticks, flash memory cards, etc.) for playback on the device. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

What is claimed is:

1. A software run-time error detection system comprising:
    an error receiving module residing on a server device and executed by a processing device of the service device, the error receiving module to receive run-time error messages from a software monitoring agent residing on a plurality of client devices, the software monitoring agent configured to detect run-time errors associated with a first software functionality installed on the plurality of client devices; and
    a route manager residing on the server device and executed by the processing device of the service device, the route manager in communication with the error receiving module, the route manager further configured to modify a confidence factor associated with at least one software installation route defined in a software installation map, the confidence factor based at least on a plurality of successful prior installations involving the at least one software installation route on the plurality of client devices, the software installation route defining a plurality of software elements associated with the first software functionality installed on the plurality of client devices, wherein the route manager is further configured for:
        determining at least one software installation route associated with at least one error message;
        associating the at least one error message with the at least one software installation route; and
        updating the confidence factor of the at least one software installation route, the confidence factor being a function of the at least one error message.

2. The system of claim 1 wherein the software monitoring agent further comprises:
    a first software error detection module configured to detect run-time errors in the first software functionality.

3. The system of claim 2 wherein the first software error detection module further comprises:
    a first event detector configured to detect run-time errors events in the first software functionality; and
    a first log file watcher configured to monitor at least one error log associated with the first software functionality.

4. The system of claim 3 wherein the first event detector is further configured to accept instructions on which types of run-time error events to detect.

5. The system of claim 4 further comprising an event detector configured to perform at least one of the following: a) simple network management protocol ("SNMP") sniffing; b) core image dumps; c) memory image dumps; d) java stack detections; and e) kernel level system interrupts.

6. The system of claim 3 wherein the first log file watcher is further configured to accept instructions on which types of error entries to monitor in the at least one error log.

7. The system of claim 6 wherein the at least one error log is one of at least a system error log and an application specific error log.

8. The system of claim 1 wherein the software monitoring agent is configured to accept instructions on which types of run-time errors are to be flagged and provided to the route manager.

9. The system of claim 1 wherein the route manager is configured to receive, by way of the error receiving module, run-time error messages and software manifests from the software monitoring agent.

10. A method for monitoring software run-time errors on a plurality of client devices comprising:
    receiving a software monitoring agent on the plurality of client devices;
    configuring the software agent to detect at least one type of run-time error occurring on each of the plurality of client devices;
    monitoring the plurality of client devices for an occurrence of the at least one type of run-time error;
    providing at least one error message associated with the occurrence and a software manifest to a route manager, the software manifest listing a plurality of software files residing on the plurality of client devices, the route manager configured to modify a confidence factor associated with at least one software installation route defined by the route manager and the confidence factor based at least on a plurality of successful prior installations involving the at least one software installation route on the plurality of client devices; and
    receiving a confirmation from the route manager that the confidence factor of the at least one software installation route associated with the at least one error message has been updated to reflect the occurrence of the run-time error on the client device.

11. The method of claim 10 wherein monitoring the plurality of client devices further comprises monitoring at least one error log file residing on the plurality of client devices.

12. The method of claim 11 wherein the software agent is configured to conduct at least one of the following a) simple network management protocol ("SNMP") sniffing; b) core image dumps; c) memory image dumps; d) Java stack detections; and e) kernel level system interrupts.

13. The method of claim 11 wherein the at least one error log is one of at least a system error log and an application specific error log.

14. The method of claim 10 wherein providing at least one error message to a route manager is performed by the software monitoring agent.

15. The method of claim 10 wherein configuring the software agent to detect at least one type of run-time error further comprises:

configuring a first software error detection module to detect run-time errors associated with a first software functionality residing on the plurality of client devices.

16. The method of claim 15 wherein configuring the software agent to detect at least one type of run-time error further comprises:
configuring the first software error detection module to detect run-time errors associated with a second software functionality residing on the plurality of client devices.

17. The method of claim 15 wherein configuring the software agent to detect at least one type of run-time error further comprises:
configuring a second software error detection module to detect run-time errors associated with a second software functionality residing on the plurality of client devices.

18. The method of claim 10 wherein configuring the software agent to detect at least one type of run-time error occurring on the plurality of client devices is performed by a system administrator.

* * * * *

UNITED STATES PATENT AND TRADEMARK OFFICE
CERTIFICATE OF CORRECTION

| | |
|---|---|
| PATENT NO. | : 8,719,814 B2 |
| APPLICATION NO. | : 13/154123 |
| DATED | : May 6, 2014 |
| INVENTOR(S) | : Michael J. Wookey |

Page 1 of 1

It is certified that error appears in the above-identified patent and that said Letters Patent is hereby corrected as shown below:

IN THE CLAIMS:

Col. 49, Claim 1, line 32, change "service device" to --server device--
Col. 49, Claim 1, line 40, change "service device" to --server device--
Col. 50, Claim 14, line 63, change "a route manager" to --the route manager--

Signed and Sealed this
Eighth Day of July, 2014

Michelle K. Lee
*Deputy Director of the United States Patent and Trademark Office*